(12) United States Patent
Press et al.

(10) Patent No.: US 11,254,492 B2
(45) Date of Patent: Feb. 22, 2022

(54) COLLAPSIBLE INTERMODAL CONTAINER STACKER AND A STACKING SYSTEM

(71) Applicant: CEC Systems Pty Ltd, Sydney (AU)

(72) Inventors: Nicholas Oliver Press, Woollahra (AU); Robert Bruce Tiller, Rozelle (AU); Stephen Richard Hill, Rozelle (AU); Daniel Graham Salmon, Waterloo (AU); Lior Hershkovitz, Vaucluse (AU)

(73) Assignee: SPECTAINER PTY LIMITED, Sydney (AU)

( * ) Notice: Subject to any disclaimer, the term of this patent is extended or adjusted under 35 U.S.C. 154(b) by 0 days.

(21) Appl. No.: 17/175,930

(22) Filed: Feb. 15, 2021

(65) Prior Publication Data

US 2021/0171279 A1    Jun. 10, 2021

Related U.S. Application Data

(63) Continuation of application No. 16/485,159, filed as application No. PCT/AU2017/000285 on Dec. 20, 2017, now abandoned.

(30) Foreign Application Priority Data

Apr. 28, 2017 (AU) ............................... 2017901541

(51) Int. Cl.
  *B65D 88/52* (2006.01)
  *B65G 69/00* (2006.01)
(52) U.S. Cl.
  CPC ........... *B65D 88/522* (2013.01); *B65G 69/00* (2013.01)
(58) Field of Classification Search
  CPC ........ B65G 69/00; B65D 88/121; B65D 7/26; B65D 9/14; B65D 88/522; B65D 88/524;
  (Continued)

(56) References Cited

U.S. PATENT DOCUMENTS

| 3,799,384 A * | 3/1974 | Hurkamp ............. B65D 88/522 |
| | | 220/6 |
| 9,643,775 B2 * | 5/2017 | Kraft .................... B65D 88/522 |

(Continued)

FOREIGN PATENT DOCUMENTS

| DE | 10 2009 002 256 A1 | 10/2010 |
| GB | 1 159 908 A | 7/1969 |
| WO | WO 2009/109514 A1 | 9/2009 |

OTHER PUBLICATIONS

PCT Search Report, dated Feb. 6, 2018.

*Primary Examiner* — Lynn E Schwenning
(74) *Attorney, Agent, or Firm* — Dority & Manning, P.A.

(57) ABSTRACT

The present invention provides a collapsible intermodal container stacker, comprising: a stationary section and a movable section disposed adjacent the stationary section. The stationary section comprises: a substantially upright planar face part; and a side wall securing device configured to operatively connect to a first side wall of a collapsible intermodal container and to secure the first side wall in use against or with respect to the planar face part. The movable section comprises: a track extending substantially perpendicular to the planar face part; a carriage engaged with and movable along the track, the carriage being configured to attach to a second side wall of the collapsible intermodal container in use; and a lower wall moving device configured to operatively connect to a lower wall of the collapsible intermodal container and to move the lower wall in use such that the lower wall pivots upwards. In use, the pivotal movement of the lower wall causes the second side wall to move towards the first side wall and thereby the carriage to move towards the stationary section. The present invention also provides a stacking system comprising: a collapsible intermodal container stacker according to the present invention; and a collapsible intermodal container comprising: first (Continued)

and second side walls, a lower wall hingedly attached to a lower end of the second side wall; and a link member hingedly attached to the lower wall and a lower end of the first side wall such that, when the lower wall pivots towards the second side wall, the link member causes the first and second side walls to move towards each other.

12 Claims, 41 Drawing Sheets

(58) Field of Classification Search
CPC .... B65D 88/52; B65D 88/526; B65D 88/528; E04B 1/3445; E04B 1/348
See application file for complete search history.

(56) References Cited

U.S. PATENT DOCUMENTS

| 10,344,436 B2* | 7/2019 | Guven ................ E01D 15/124 |
| 10,507,973 B2* | 12/2019 | Park ...................... B65D 88/52 |
| 2008/0029508 A1* | 2/2008 | Kochanowski .... B65D 21/0215 |
| | | 220/1.5 |
| 2014/0299596 A1* | 10/2014 | Kochanowski ...... B65D 90/008 |
| | | 220/1.5 |
| 2016/0083176 A1 | 3/2016 | Kraft |

* cited by examiner

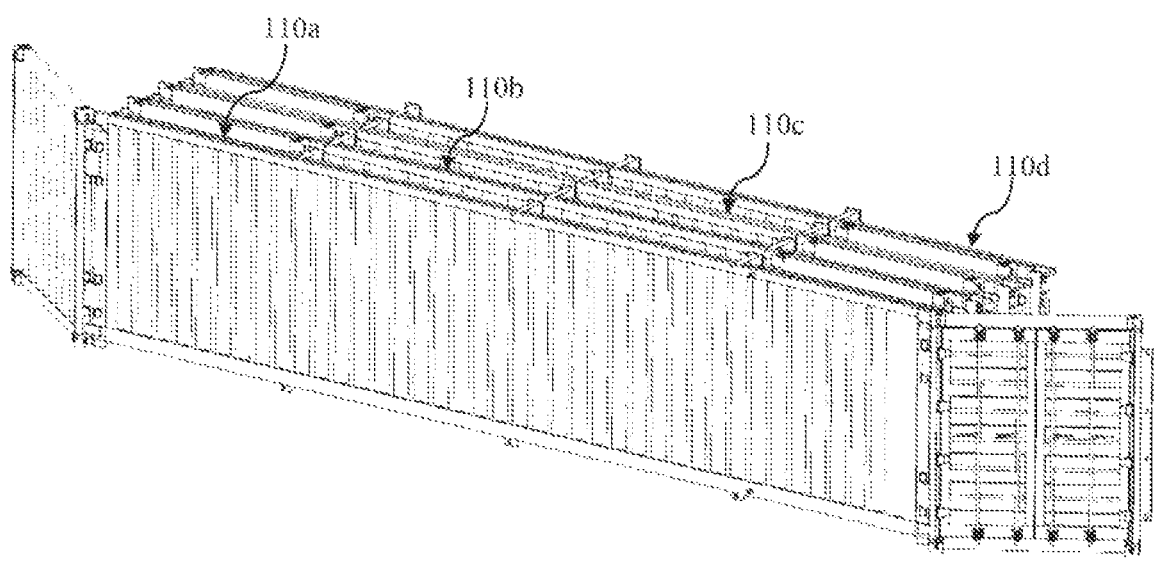
Fig. 30
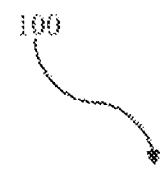
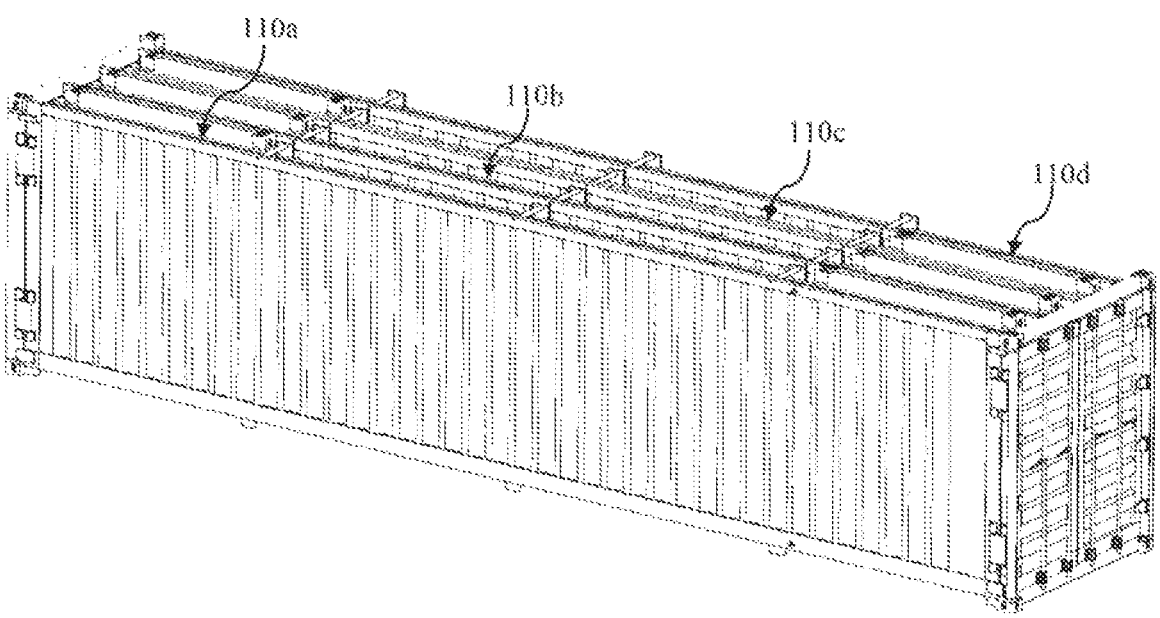
Fig. 31

COLLAPSIBLE INTERMODAL CONTAINER STACKER AND A STACKING SYSTEM

RELATED APPLICATIONS

The present application is a Continuation Application of U.S. application Ser. No. 16/485,159, filed Aug. 10, 2019, which is a 371 Application of International Application No. PCT/AU2017/000285, filed Dec. 20, 2017, which claims priority to Australian Application No. 2017901541, filed Apr. 28, 2017.

FIELD

The present invention relates to a collapsible intermodal container stacker and a stacking system.

BACKGROUND

Intermodal containers, also known as ISO containers or shipping containers, are used to store a wide range of goods for transportation. In general, an intermodal container is a rectangular steel box with doors on either end to provide access to the interior in which goods are stored. The intermodal container also has a casting on each corner for engagement with twistlocks and/or bridge clamps to lock the intermodal container into place or interlock with other intermodal containers when stacked together.

In international trade, there is usually a trade imbalance between an exporting country and an importing country. Typically, intermodal containers are loaded with goods at the exporting country and then transported to the importing country. However, once the intermodal containers arrive at the importing country and the goods are unloaded, the intermodal containers are transported back to the exporting country in an empty state for reuse due to the trade imbalance. The transportation of empty intermodal containers is highly inefficient and involves significant costs, especially in relation to fuel, handling, and storage. In certain circumstances, it can become more cost effective to simply store and/or discard the empty intermodal containers at the importing country rather than transporting them back for reuse.

Also, in domestic logistics activities, similar imbalances and thereby similar disadvantages can occur. For example, the transportation of empty intermodal containers to the manufacturer for loading of goods prior to exportation.

Object of Invention

It is an object of the present invention to substantially overcome or ameliorate one or more of the above disadvantages, or at least provide a useful alternative.

SUMMARY OF INVENTION

In accordance with an aspect of the present invention, there is provided a collapsible intermodal container stacker, comprising:
a stationary section comprising:
a substantially upright planar face part; and
a side wall securing device configured to operatively connect to a first side wall of a collapsible intermodal container and to secure the first side wall in use against or with respect to the planar face part; and
a movable section disposed adjacent the stationary section, the movable section comprising:
a track extending substantially perpendicular to the planar face part;
a carriage engaged with and movable along the track, the carriage being configured to attach to a second side wall of the collapsible intermodal container in use; and
a lower wall moving device configured to operatively engage with or connect to a lower wall of the collapsible intermodal container and to move the lower wall in use such that the lower wall pivots upwards, e.g. towards either the first side wall or the second side wall,
wherein, in use, the pivotal movement of the lower wall causes the second side wall to move towards the first side wall and thereby the carriage to move towards the stationary section. In this way, the collapsible intermodal container is able to be configured by the stacker from an erected configuration to a collapsed configuration.

In a preferred embodiment, the side wall securing device includes, or is comprised of, a side wall pulling device which is fixed in relation to the planar face part. The side wall pulling device is configured to operatively engage with or connect to the first side wall of the container and to pull the first side wall in use such that the first side wall abuts with the planar face part.

In a preferred embodiment, the lower wall moving device includes, or is comprised of, a lower wall pulling device which is mounted to the carriage. The lower wall pulling device is configured to operatively connect to the lower wall of the collapsible intermodal container and to pull the lower wall in use such that the lower wall pivots towards the second side wall.

The carriage may comprise:
a carriage frame with one or more rollers engaged with the track; and
an elongate locking member movably attached to the carriage frame, the locking member having an engaging end with a recess, the locking member being movable relative to the carriage frame to receive an end portion of the first side wall of the collapsible intermodal container in the recess for attachment.

The carriage may comprise two of said locking members, said locking members being substantially parallel and spaced apart from each other such that a first of said locking members is disposed upward of a second of said locking members.

The lower wall pulling device may comprise: a winch drum;
a motor configured to rotate the winch drum; and
a cable spooled onto the winch drum, the cable having an end configured to attach to the second side wall in use.

The carriage may further comprise a pulley system through which the cable is threaded, the pulley system being mounted to the carriage frame such that the pulley system is disposed upward of an attachment point between the cable and the lower wall of the collapsible intermodal container in use.

The winch drum of the lower wall pulling device may rotate about a substantially horizontal axis.

The collapsible intermodal container stacker may comprise two of said movable sections, wherein the stationary section is disposed between the movable sections such that a first of the movable sections is located adjacent a front end of the collapsible intermodal container in use and a second of the movable sections is located adjacent a rear end of the collapsible intermodal container in use.

The collapsible intermodal container stacker may further comprise a platform for supporting the collapsible intermodal container in use, the platform being disposed between the first of the movable sections and the second of the movable sections.

The platform may comprise a pair of spaced apart beams extending perpendicularly to the planar face part of the stationary section.

The side wall pulling device may comprise: a winch drum;
a motor configured to rotate the winch drum; and
a cable spooled onto the winch drum, the cable having an end configured to attach to the first side wall in use.

The winch drum of the side wall pulling device may rotate about a substantially vertical axis.

The stationary section may comprise two of said side wall pulling devices.

In accordance with another aspect of the present invention, there is provided a stacking system, comprising:
a collapsible intermodal container stacker according to any one of the embodiments of the invention described above; and
a collapsible intermodal container comprising: first and second side walls;
a lower wall hingedly attached to a lower end of the second side wall; and
a link member hingedly attached to the lower wall and a lower end of the first side wall such that, when the lower wall pivots towards the second side wall, the link member causes the first and second side walls to move towards each other.

In accordance with another aspect of the present invention, there is provided a collapsible intermodal container stacker for a collapsible intermodal containing having first and second side walls, a lower wall hingedly attached to a lower end of the second side wall, and a link member hingedly attached to the lower wall and a lower end of the first side wall such that, when the lower wall pivots towards the second side wall, the link member causes the first and second side walls to move towards each other, the collapsible intermodal container stacker comprising:
a stationary structure defining a substantially upright planar face;
a side wall securing device configured to operatively connect to the first side wall and to secure the first side wall in use against or with respect to the planar face of the stationary structure;
a carriage movable relative to the stationary structure along a path extending substantially perpendicular to the planar face, the carriage being configured to attach to the second side wall in use; and
a lower wall moving device configured to operatively engage with or connect to the lower wall and to move the lower wall in use such that the lower wall pivots upwards, wherein, in use, the carriage moves towards the stationary structure along the path.

In a preferred embodiment, the side wall securing device includes, or is comprised of, a side wall pulling device which mounted on the stationary structure. The side wall pulling device is configured to operatively engage with or connect to the first side wall of the container and to pull the first side wall in use such that the first side wall abuts with the upright planar face of the stationary structure.

In a preferred embodiment, the lower wall moving device includes, or is comprised of, a lower wall pulling device which is mounted to the carriage. The lower wall pulling device is configured to operatively connect to the lower wall of the collapsible intermodal container and to pull the lower wall in use such that the lower wall pivots towards the second side wall.

BRIEF DESCRIPTION OF DRAWINGS

Preferred embodiments of the invention will be described hereinafter, by way of example only, with reference to the accompanying drawings, wherein:

FIG. 1a is an enlarged partial view of a corner of the intermodal container of FIG. 1.

FIG. 30 is a perspective view of the collapsible intermodal containers of FIG. 26, as one of the collapsible intermodal containers is in the collapsed configuration with door assemblies moving from the open positions to the closed positions and the remaining collapsible intermodal containers are in the collapsed configurations with door assemblies in the open positions;

FIG. 31 is a perspective view of the collapsible intermodal container assembly formed by the collapsible intermodal containers of FIG. 26;

DESCRIPTION OF EMBODIMENTS

Figure 1:
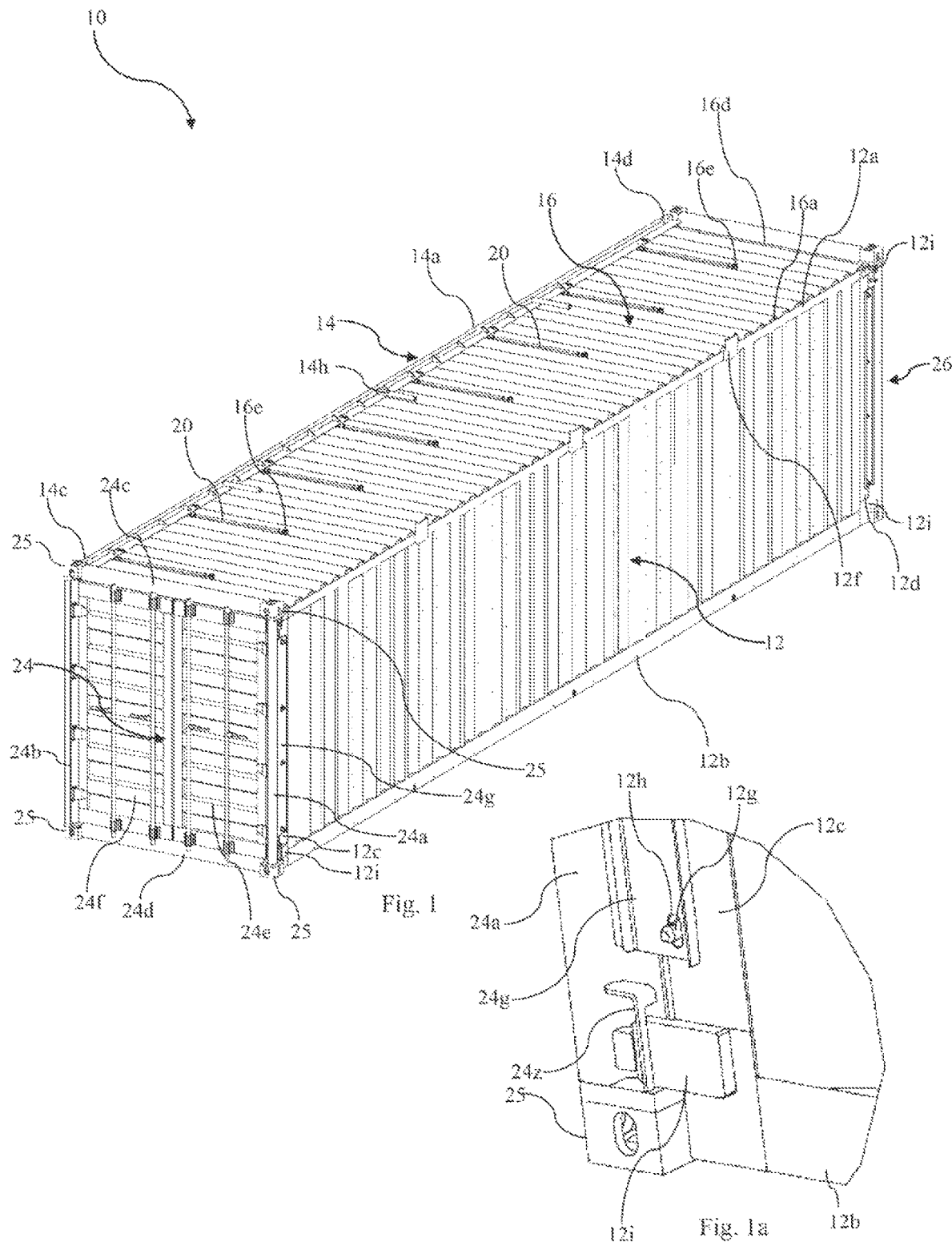
FIG. 1 is a perspective view of a first embodiment of a collapsible intermodal container in the erected configuration with end assemblies or door assemblies in the closed position.
Figure 2:
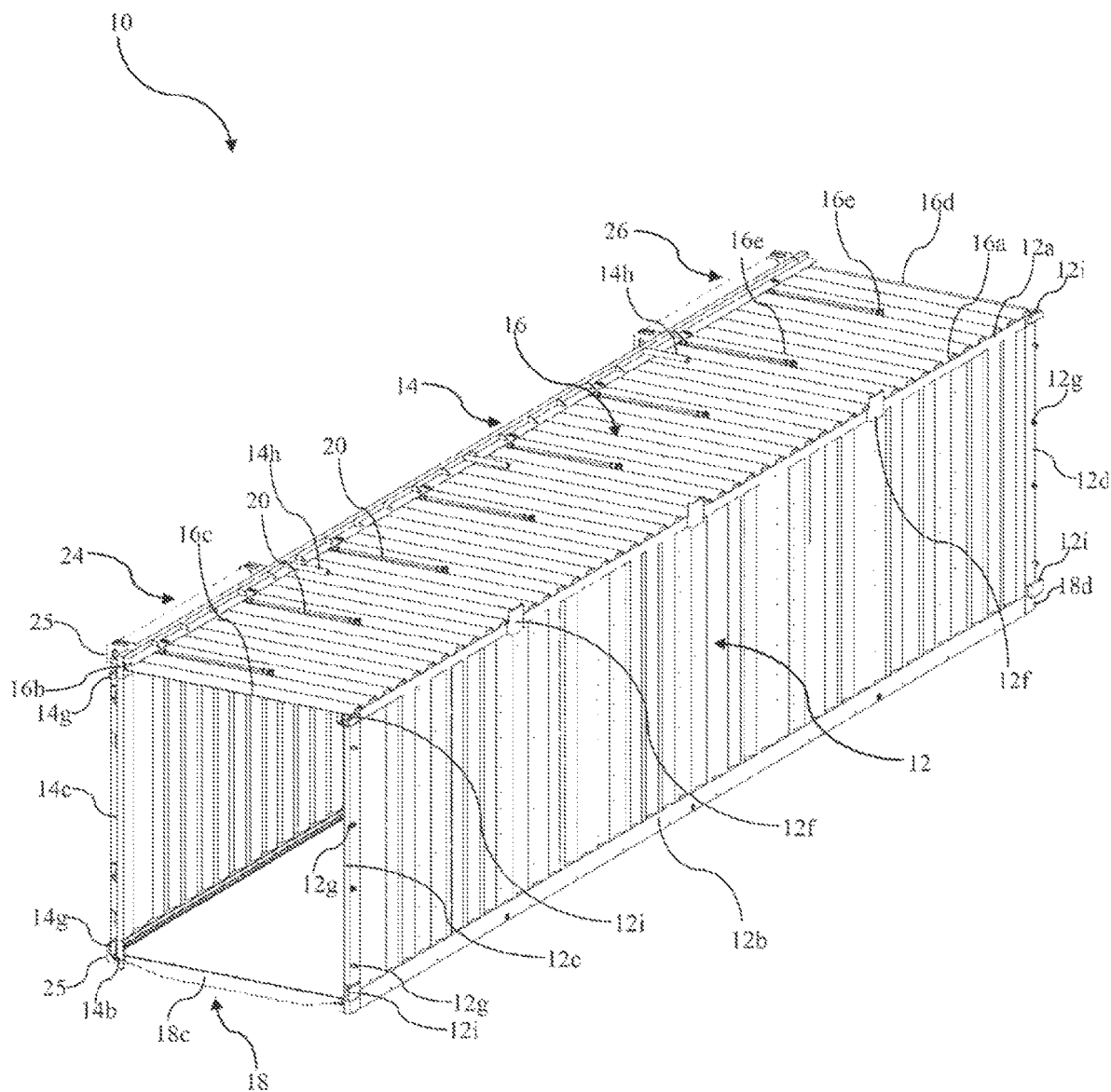
FIG. 2 is a perspective view of the collapsible intermodal container of FIG. 1 with the end assemblies or door assemblies in the open position.
Figure 3:
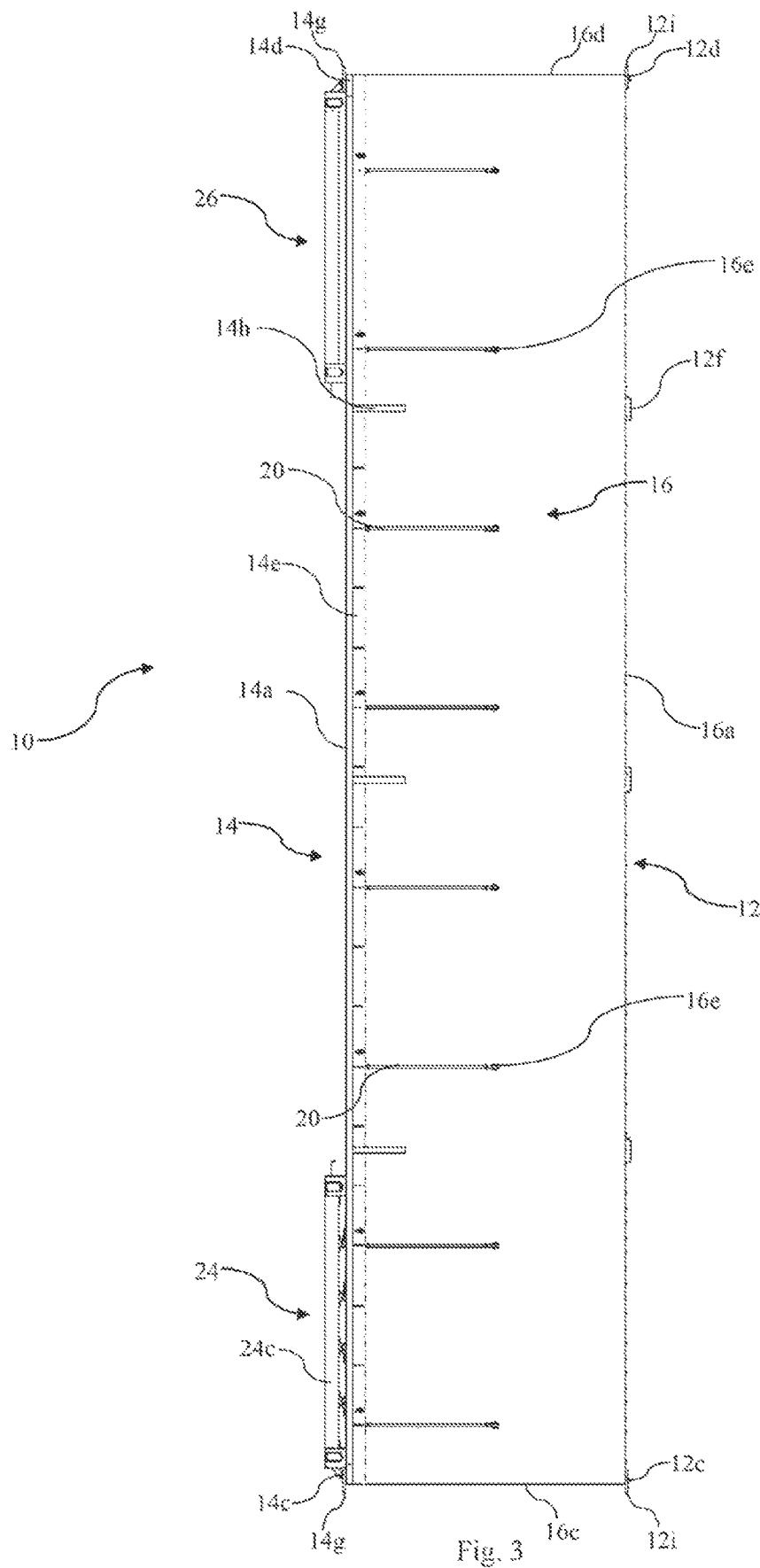
FIG. 3 is a top view of the collapsible intermodal container of FIG. 2.

FIGS. 1 to 12 of the accompanying drawings show a first embodiment of a collapsible intermodal container 10. The container 10 comprises a right side wall 12 and a left side wall 14. The side walls 12, 14 oppose each other and are substantially parallel to each other. Each of the side walls 12, 14 is formed from a rectangular corrugated steel panel which is surrounded by a rectangular steel frame. The right side wall 12 is defined by an upper longitudinal end 12a, a lower longitudinal end 12b, a front end 12c and a rear end 12d. The left side wall 14 is defined by an upper longitudinal end 14a, a lower longitudinal end 14b, a front end 14c and a rear end 14d.

Figure 4:
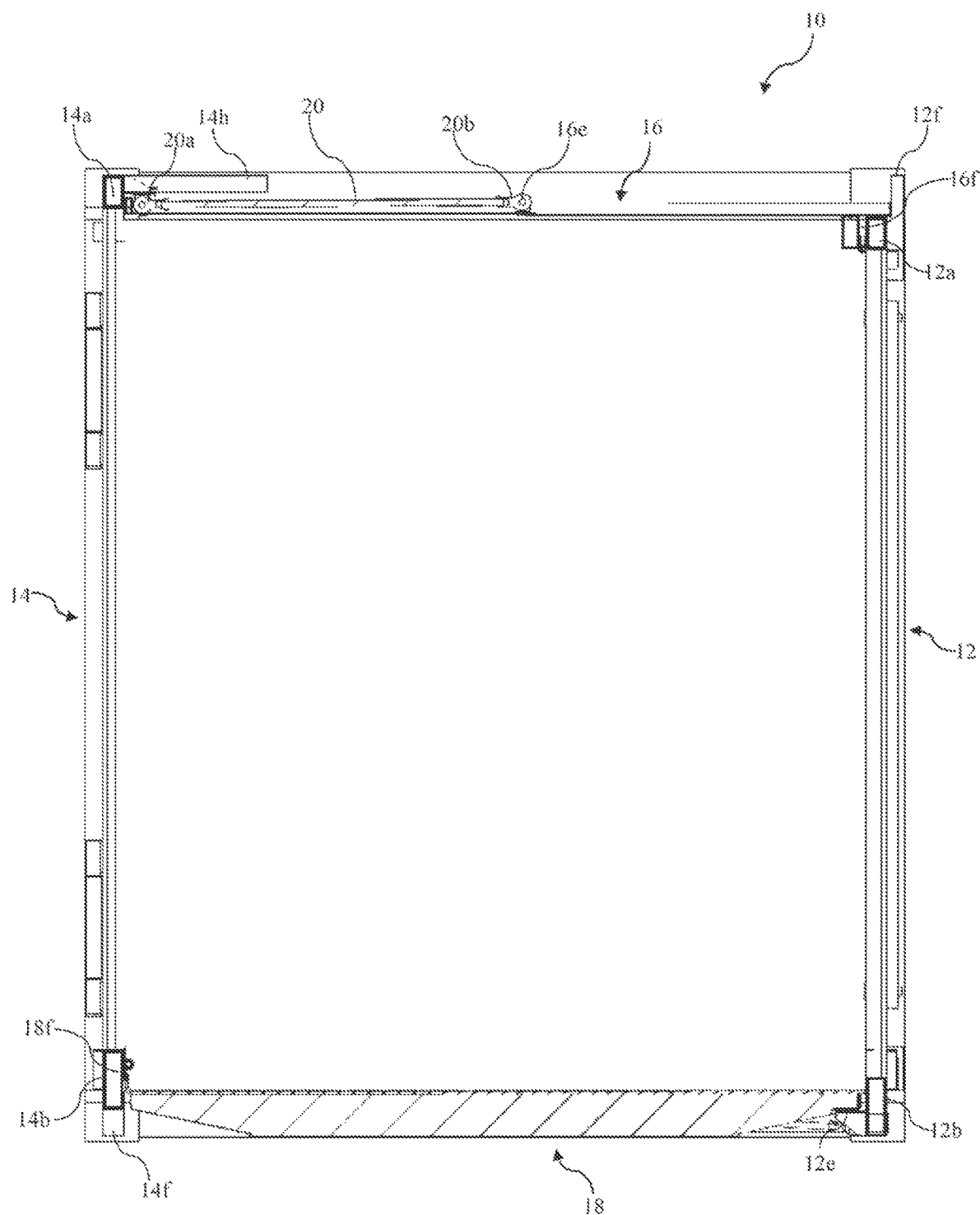
FIG. 4 is a first cross-sectional view of the collapsible intermodal container of FIG. 1.
Figure 9:
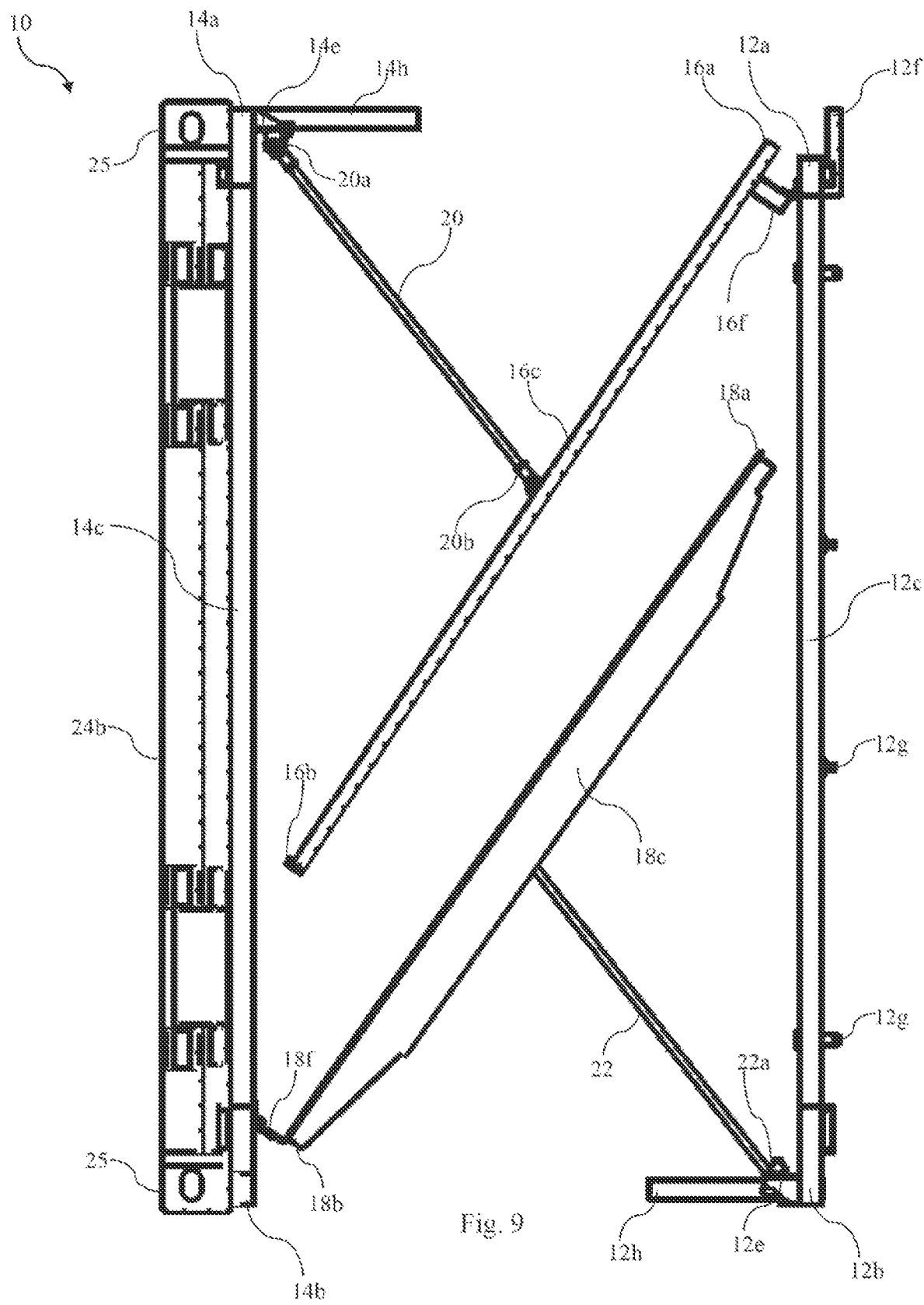
FIG. 9 is an enlarged front view of the collapsible intermodal container of FIG. 7.

As seen in FIG. 4, the right side wall 12 has a lower flange 12e which is disposed at the lower longitudinal end 12b and extends towards the lower longitudinal end 14b of the left side wall 14. The right side wall 12 further has three stop members 12f that are disposed at the upper longitudinal end 12a and are evenly spaced apart between the front end 12c and the rear end 12d. Each of the stop members 12f is formed from a steel channel and extends in an upward direction. The right side wall 12 further has eight pin-like protrusions 12g. Four of the protrusions 12g are disposed at the front end 12c and are evenly spaced apart between the longitudinal ends 12a, 12b. The other four protrusions 12g are disposed at the rear end 12d and are evenly spaced apart between the longitudinal ends 12a, 12b. Each of the protrusions 12g extends in a rightward (i.e. an outward) direction. As best seen in FIG. 9, the right side wall 12 further includes three round steel rods 12h disposed at the lower longitudinal end 12b and evenly spaced apart between the front end 12c and the rear end 12d. Each of the rods 12h extends substantially horizontally in a leftward direction towards the lower longitudinal end 14b of the left side wall 14. The right side wall 12 further has four engagement members in the form of four steel corner plates 12i. Two corner plates 12i are disposed at the front end 12c and extend in a forward direction. The other two plates 12i are disposed at the rear end 12d and extend in a rearward direction.

The left side wall 14 has an upper flange 14e which is disposed at the upper longitudinal end 14a and extends towards the upper longitudinal end 12a of the right side wall 12. The left side wall 14 further includes three stop members 14f that are disposed at the lower longitudinal end 14b and evenly spaced apart between the front end 14c and the rear end 14d. Each of the stop members 14f is formed from a steel channel and extends in a downward direction. The left side wall 14 further has three round steel rods 14h that are disposed at the upper longitudinal end 14a and slightly above the upper flange 14e. The rods 14h are evenly spaced apart between the front end 14c and the rear end 14d. Each of the steel rods 14h extends substantially horizontally in a rightward direction towards the lower longitudinal end 12b. The left side wall 14 further has four engagement members in the form of four steel corner plates 14g. Two corner plates 14g are disposed at the front end 14c and extend in a forward direction. The other two plates 14g are disposed at the rear end 14d and extend in a rearward direction.

Figure 5:
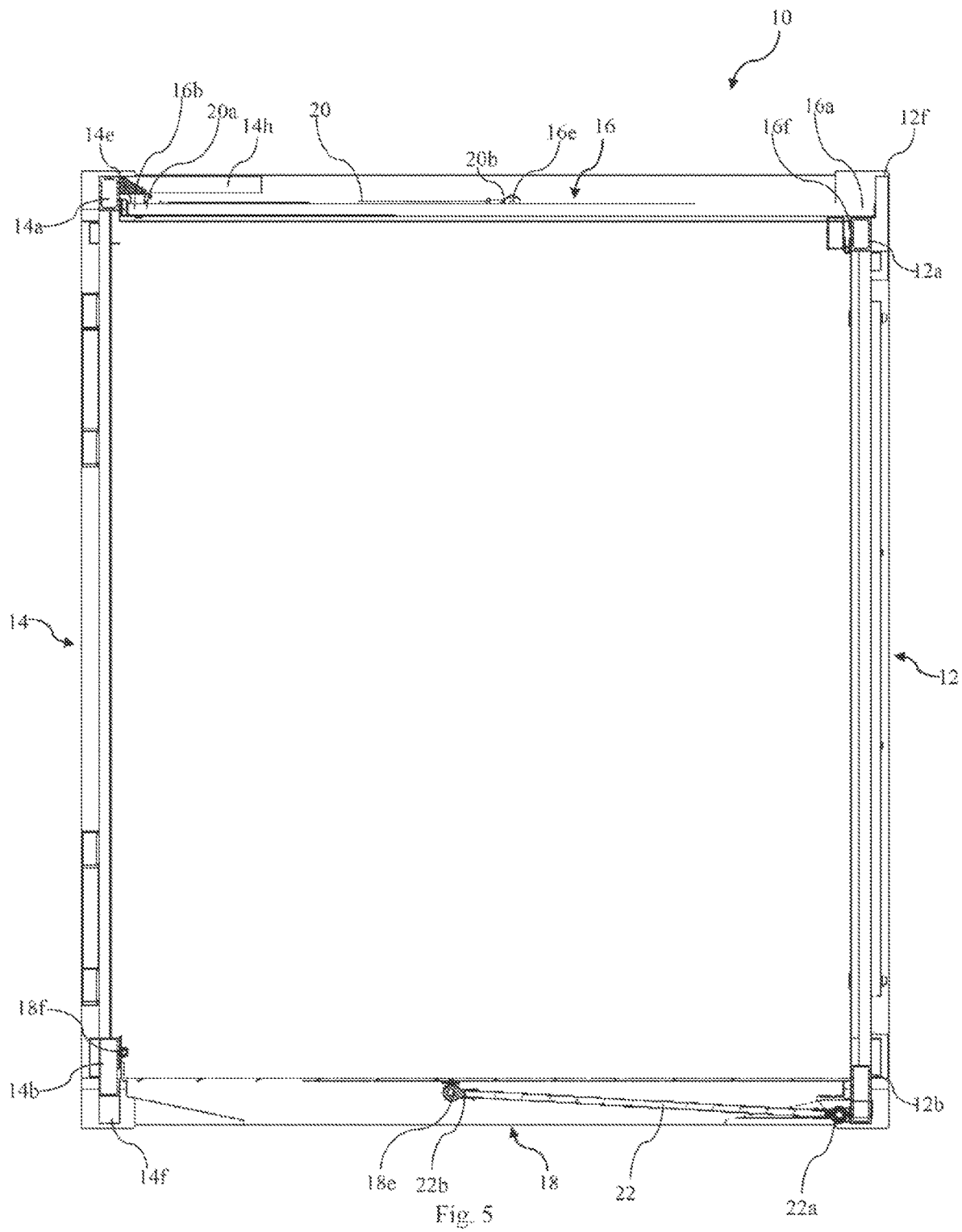
FIG. 5 is a second cross-sectional view of the collapsible intermodal container of FIG. 1.
Figure 6:
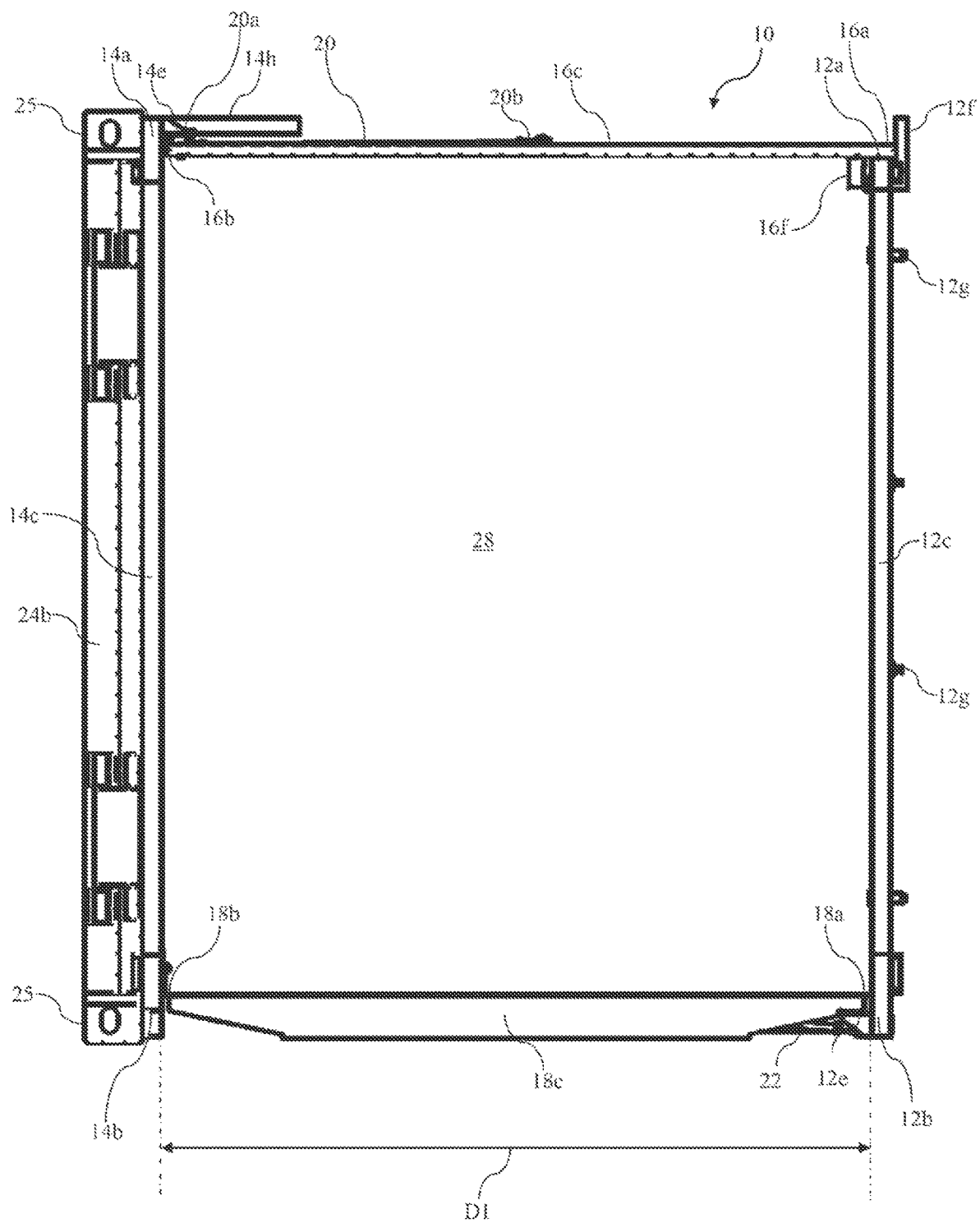
FIG. 6 is an enlarged front view of the collapsible intermodal container of FIG. 2.
Figure 7:
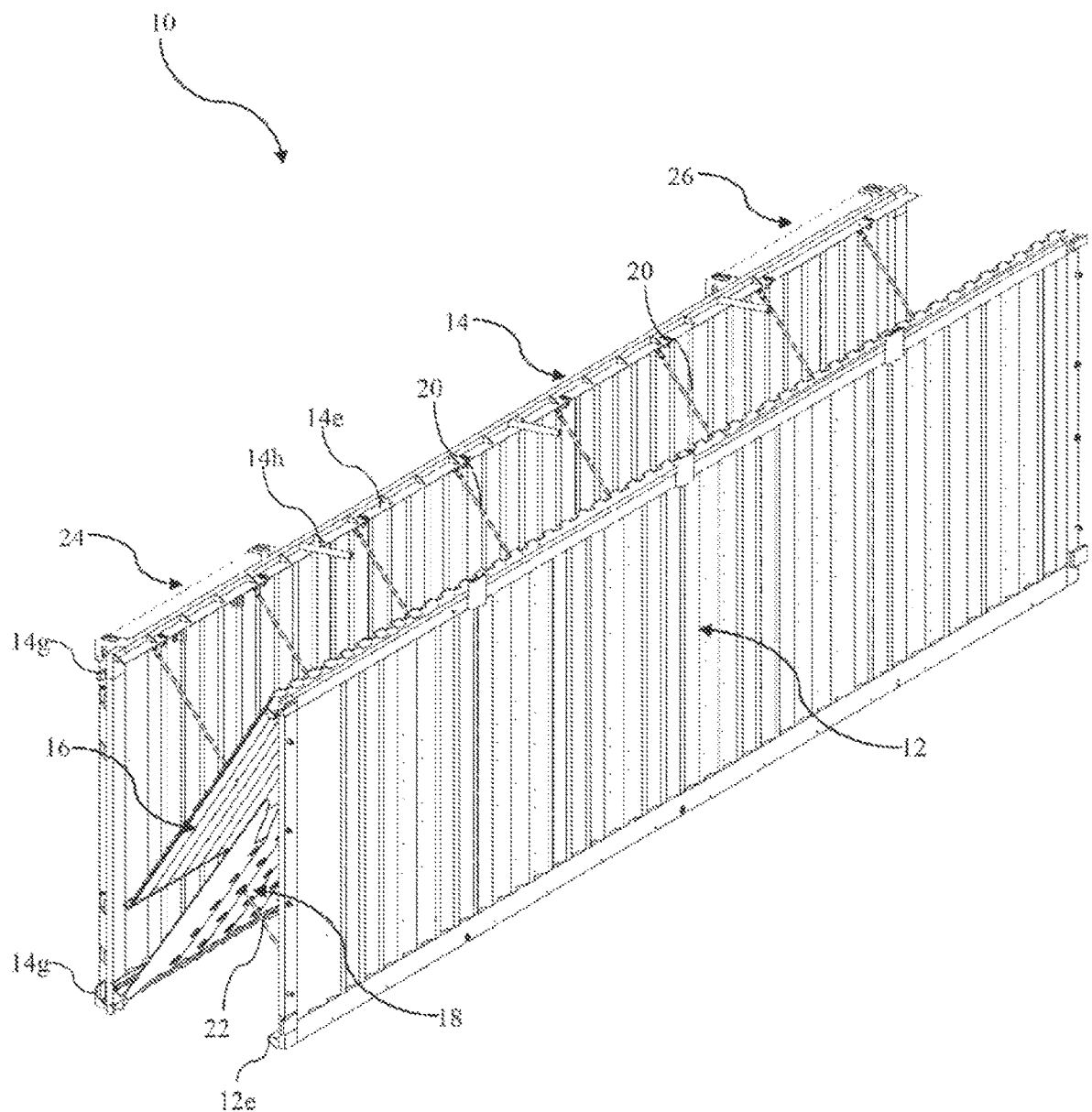
FIG. 7 is a perspective view of the collapsible intermodal container of FIG. 2 configuring from the erected configuration to the collapsed configuration.
Figure 8:
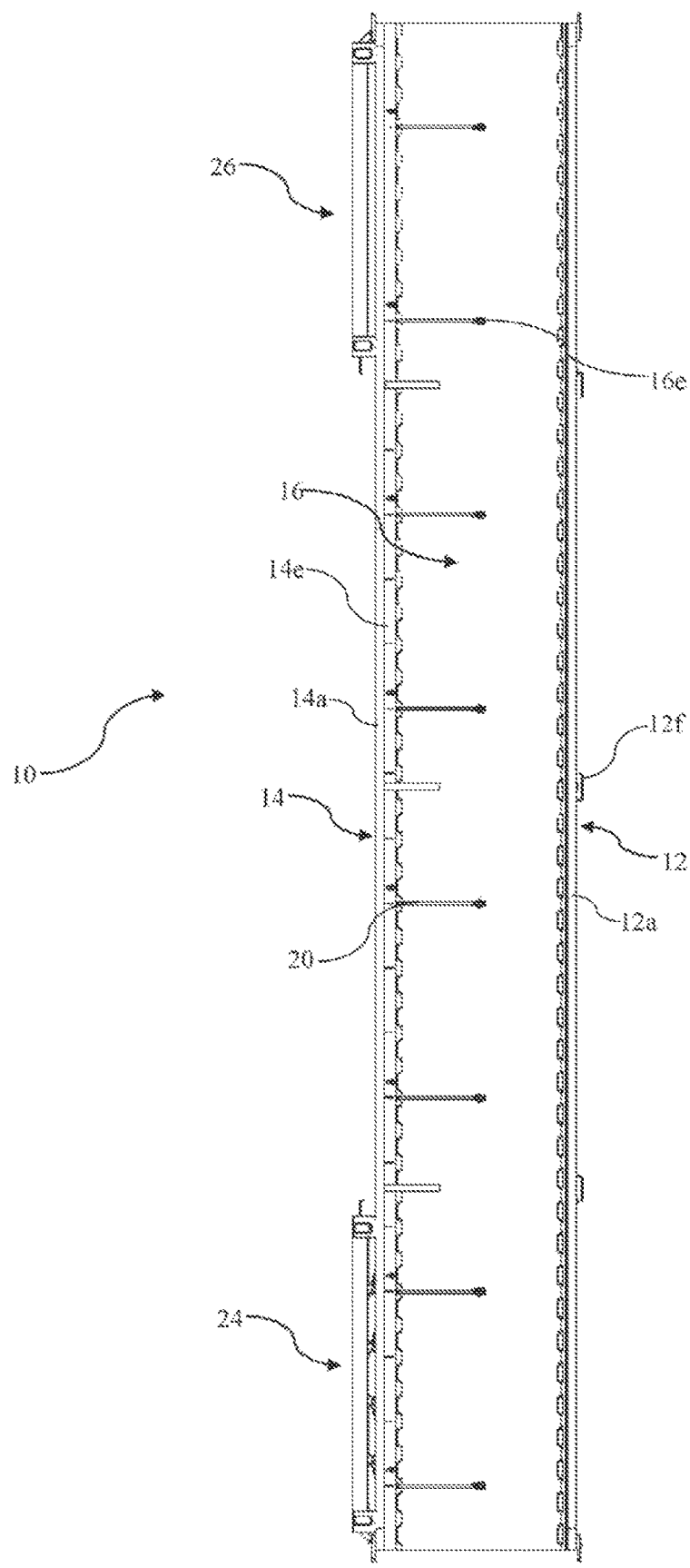
FIG. 8 is a top view of the collapsible intermodal container of FIG. 7.
Figure 12:
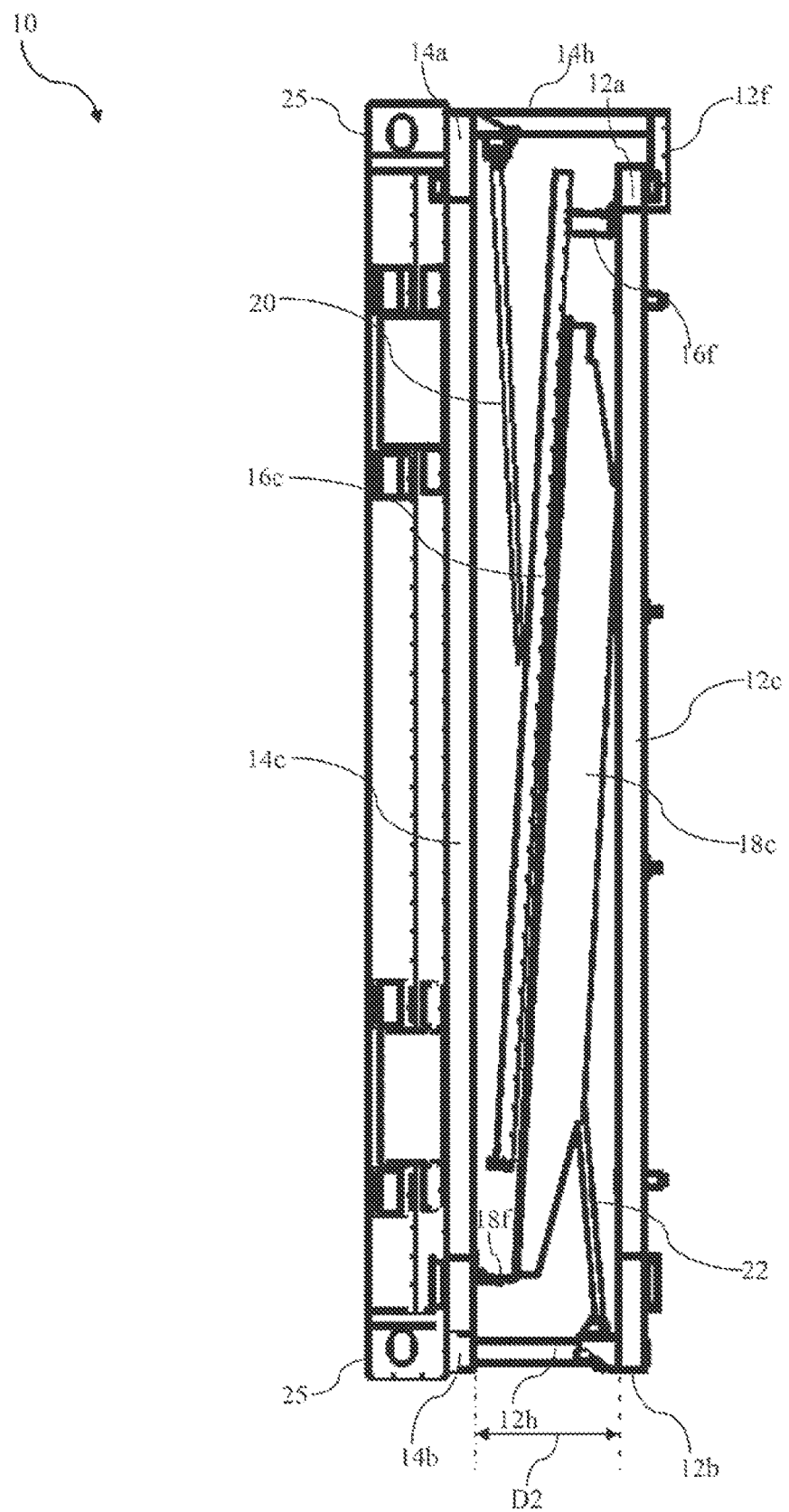
FIG. 12 is an enlarged front view of the collapsible intermodal container of FIG. 10.

The container 10 further comprises an upper wall 16 located between the right side wall 12 and the left side wall 14. The upper wall 16 is fabricated from a rectangular corrugated steel panel. The upper wall 16 is defined by a right longitudinal end 16a, a left longitudinal end 16b, a front end 16c and a rear end 16d. The left longitudinal end 16b is engageable with the upper flange 14e of the left side wall 14 for removable attachment (e.g., by screws and/or bolts). The upper wall 16 has eight lugs 16e disposed on the upper surface of the upper wall 16. The lugs 16e are evenly spaced apart between the front end 16c and the rear end 16d, and each lug 16e extends upwardly from the upper surface of the upper wall 16. As best seen in FIGS. 5 and 6, the upper wall 16 further has a right flange 16f disposed at the right longitudinal end 16a. The right flange 16f is hingedly attached to the upper longitudinal end 12a of the right side wall 12 such that the upper wall 16 is able to pivot in relation to the right side wall 12 via that hinged connection. As best shown in FIGS. 6, 9 and 12, given that the right longitudinal end 16a of the upper wall 16 will abut with the upper longitudinal end 12a of the right side wall 12 as the upper wall 16 pivots to a substantially horizontal posture, it will be appreciated that the pivotal motion of the upper wall 16 is limited to about 90 degrees in relation to the right side wall 12.

The container 10 further comprises a lower wall 18 located between the right side wall 12 and the left side wall 14. The lower wall 18 is fabricated from steel and is substantially rectangular in shape. The lower wall 18 is defined by a right longitudinal end 18a, a left longitudinal end 18b, a front end 18c and a rear end 18d. The right longitudinal end 18a is engageable with the lower flange 12e of the right side wall 12 for removable attachment (e.g., by screws and/or bolts). The lower wall 18 has eight lugs 18e disposed on the lower surface of the lower wall 18. The lugs 18e are evenly spaced apart between the front end 18c and the rear end 18d, and each lug 18e extends downwardly from the lower surface of the lower wall 18.

As best seen in FIGS. 4 and 5, in the depicted embodiment, the left longitudinal end 18b has a left flange 18f hingedly attached to the lower longitudinal end 14b of the left side wall 14 such that the lower wall 18 is able to pivot in relation to the left side wall 14 via that hinged connection. As best shown in FIGS. 6, 9 and 12, given that the left longitudinal end 18b of the lower wall 18 will abut with the lower longitudinal end 14b of the left side wall 14 as the lower wall 18 pivots to a substantially horizontal posture, it will be appreciated that the pivotal motion of the lower wall 18 is limited to about 90 degrees in relation to the left side wall 14.

The container 10 further comprises eight upper link members 20 and eight lower link members 22. Each of the upper and lower link members 20, 22 is elongate and formed from steel. Each upper link member 20 has a first end 20a hingedly attached to the upper flange 14e and a second end 20b hingedly attached to a respective lug 16e of the upper wall 16 such that the upper link members 20 are able to pivot in relation to the left side wall 14. Each lower link member 22 has a first end 22a hingedly attached to the lower flange 12e and a second end 22b hingedly attached to a respective lug 18e of the lower wall 18 such that the lower link members 22 are able to pivot in relation to the right side wall 12.

The container 10 further comprises a front end assembly 24 and a rear end assembly 26, the front and rear end assemblies 24, 26 being designed for closing the front and rear ends of the container 10 in the erected configuration and for controlling access to the interior of the container 10. In this embodiment, the end assemblies 24, 26 include door panels for accessing the interior of the container 10 in the erected configuration. As such, the front and rear end assemblies 24, 26 are also referred to herein as front and rear door assemblies 24, 26. An end assembly of the collapsible intermodal container 10 not having any door will typically simply include an end wall supported within a peripheral rigid frame.

The front door assembly 24 comprises a rectangular peripheral rigid frame which is formed from steel and defines a doorway. The rigid frame of the front door assembly 24 has a right upright member 24a, a left upright member 24b, an upper cross-bar member 24c and a lower cross-bar member 24d. At each corner of the rigid frame of the front door assembly 24, there is disposed a corner casting 25 for engagement with twistlocks and/or bridge clamps. In the depicted embodiment, the left member 24b is hingedly attached to the front end 14c of the left side wall 14 such that the front door assembly 24 is able to pivot in relation to the left side wall 14. Specifically, the front door assembly 24 is able to pivot from a closed position in which the front door assembly 24 extends substantially perpendicularly from the left side wall 14 (see FIG. 1) and an open position in which the front door assembly 24 extends substantially parallel and adjacent the left side wall 14 (see FIG. 2). The front door assembly 24 further comprises a right door panel 24e hingedly attached to the right member 24a and a left door panel 24f hingedly attached to the left member 24b such that the door panels 24e, 24f are able to open and close the doorway in a similar manner to French doors.

With reference to FIGS. 1 and 1a, the front door assembly 24 further comprises a flap member 24g in the form of an elongate planar steel piece. The flap member 24g is hingedly attached to the right member 24a along one of its longitudinal sides such that flap member 24g is able to pivot in relation to the right member 24a. The flap member 24g has four openings 24h that are evenly spaced apart along its length and each opening 24h is adapted to receive a respective protrusion 12g on the front end 12c for removable attachment of the right member 24a of the front door assembly 24 to the front end 12c of the right side wall 12. The front door assembly 24 further comprises four corner brackets 24z disposed at each corner. As best seen in FIG. 1a, each corner bracket 24z defines an opening for slidingly receiving a respective corner plate 12i, 14g on the front ends 12c, 14c such that the respective corner plate 12i, 14g abuts with an adjacent corner casting 25 when received.

Given that, in this depicted embodiment, the front door assembly 24 and the rear door assembly 26 are substantially identical, only the front door assembly 24 is described above in detail. A person skilled in the art will understand that the rear door assembly 26 operates in substantially the same manner and comprises substantially identical components to those described above. However, in the rear door assembly 26, it will be appreciated that the left member is hingedly attached to the rear end 14d of the left side wall 14 and the openings of the flap member of the rear door assembly 26 are adapted to respectively receive the protrusions 12g on the rear end 12d for removable attachment of the right member of the rear door assembly 26 to the rear end 12d of the right side wall 12. Further, in the rear door assembly 26, the openings defined by the corner brackets are adapted to respectively receive the corner plates 12i, 14g on the rear ends 12d, 14d.

The container 10 is configurable between an erected configuration and a collapsed configuration.

As best shown in FIGS. 1 to 6, in the erected configuration, the upper wall 16 extends from the upper longitudinal end 12a of the right side wall 12 to the upper longitudinal end 14a of the left side wall 14 such that the upper wall 16 is substantially perpendicular to the right and left side walls 12, 14. The left longitudinal end 16b abuts and engages the upper flange 14e of the left side wall 14. The upper link members 20 are located above the upper wall 16. Additionally, in the erected configuration, the lower wall 18 extends from the lower longitudinal end 14b of the left side wall 14 to the lower longitudinal end 12b of the right side wall 12 such that the lower wall 18 is substantially perpendicular to the right and left side walls 12, 14. The right longitudinal end 18a abuts and engages the lower flange 12e of the right side wall 12. The lower link members 22 are below the lower wall 18.

In the erected configuration, the upper wall 16 is spaced apart from the lower wall 18 and the upper wall 16 extends parallel to the lower wall 18 such that an inner surface of the upper wall 16 is generally parallel to an inner surface of the lower wall 18. Accordingly, as best shown in FIG. 6, the right side wall 12 and the left side wall 14 are spaced apart by a first normal distance D1 of about 221 centimetres to define an interior 28 for storing goods. The first normal distance D1 (i.e., the width of the interior 28) is in accordance with requirements outlined by the International Standard Organization (ISO) in relation to standardised intermodal containers.

It will be appreciated that, in other embodiments, the first normal distance D1 may be between 201 centimetres to 226 centimetres.

Referring specifically to FIGS. 1 and 1a, when the container 10 is in the erected configuration, the door assemblies 24, 26 are in the closed position with the rigid frame of the front door assembly 24 abutting the front ends 12c, 14c, 16c, 18c and the rigid frame of the rear door assembly 26 abutting with the rear ends 12d, 14d, 16d, 18d to enclose the interior 28. In addition, the openings of the flap members of the door assemblies 24, 26 receive the respective protrusions 12g for removable attachment. It will be appreciated that, once received, the protrusions 12g may be fixed to the flap members of the door assembles 24, 26 by bolting or any other means. Furthermore, the openings defined by the corner brackets of the door assemblies 24, 26 receive the corner plates 12i, 14g such that the corner plates 12i, 14g abut with respective adjacent corner castings 25. This locates the front and rear door assemblies 24, 26 with respect to the side walls 12, 14 in the erected configuration and allows the walls 12, 14, 16, 18 to be supported by the rigid frames of the door assemblies 24, 26 such that the weight of the walls 12, 14, 16, 18 is transferred to the door assemblies 24, 26. This also allows the rigid frames of the door assemblies 24, 26 to lock the container 10 in the erected configuration by limiting movement between the right and left side walls 12, 14 and to provide the container 10 in the erected configuration with sufficient structural strength and rigidity. In the depicted embodiment, the structural strength of the container 10 in the erected configuration meets the requirements outlined by ISO in relation to standardised intermodal containers. It will be appreciated that access to the interior 28 can be controlled by opening and closing the door panels of each door assembly 24, 26.

To configure the container 10 from the erected configuration to the collapsed configuration, the protrusions 12g are removed from the openings of the flaps of the door assemblies 24, 26 by pivoting the flaps of the door assemblies 24, 26 away from the right wall 12. The corner plates 12i, 14g are then slidingly removed from the openings defined by the brackets of the door assemblies 24, 26 as the door assemblies 24, 26 are pivoted to the open positions (see FIGS. 2, 3 and 6). Then, as the container 10 configures from the erected configuration to the collapsed configuration (see FIGS. 7 to 9), the upper wall 16 pivots towards the right side wall 12 and the lower wall 18 pivots towards the left side wall 14. Consequently, the upper link members 20 pivots towards the left side wall 14 and the lower link members 22 pivots towards the right side wall 12. These rotations allow the right side wall 12 to move closer to the left side wall 14. In the depicted embodiment, as the container 10 configures from the erected configuration to the collapsed configuration, the upper wall 16 will still remain extending substantially parallel to the lower wall 18 as best shown in FIG. 9.

Figure 10:
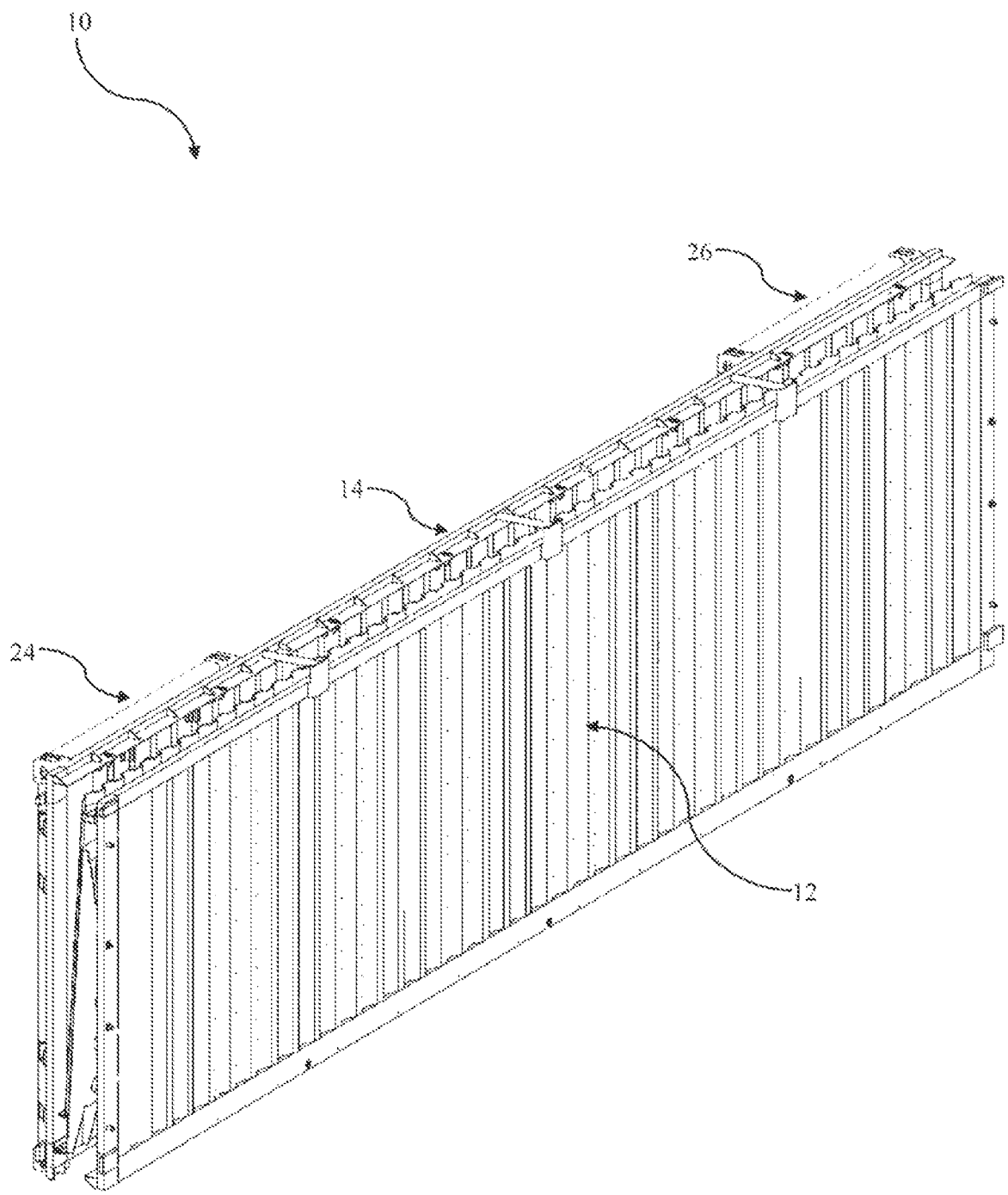
FIG. 10 is a perspective view of the collapsible intermodal container of FIG. 2 in the collapsed configuration.
Figure 11:
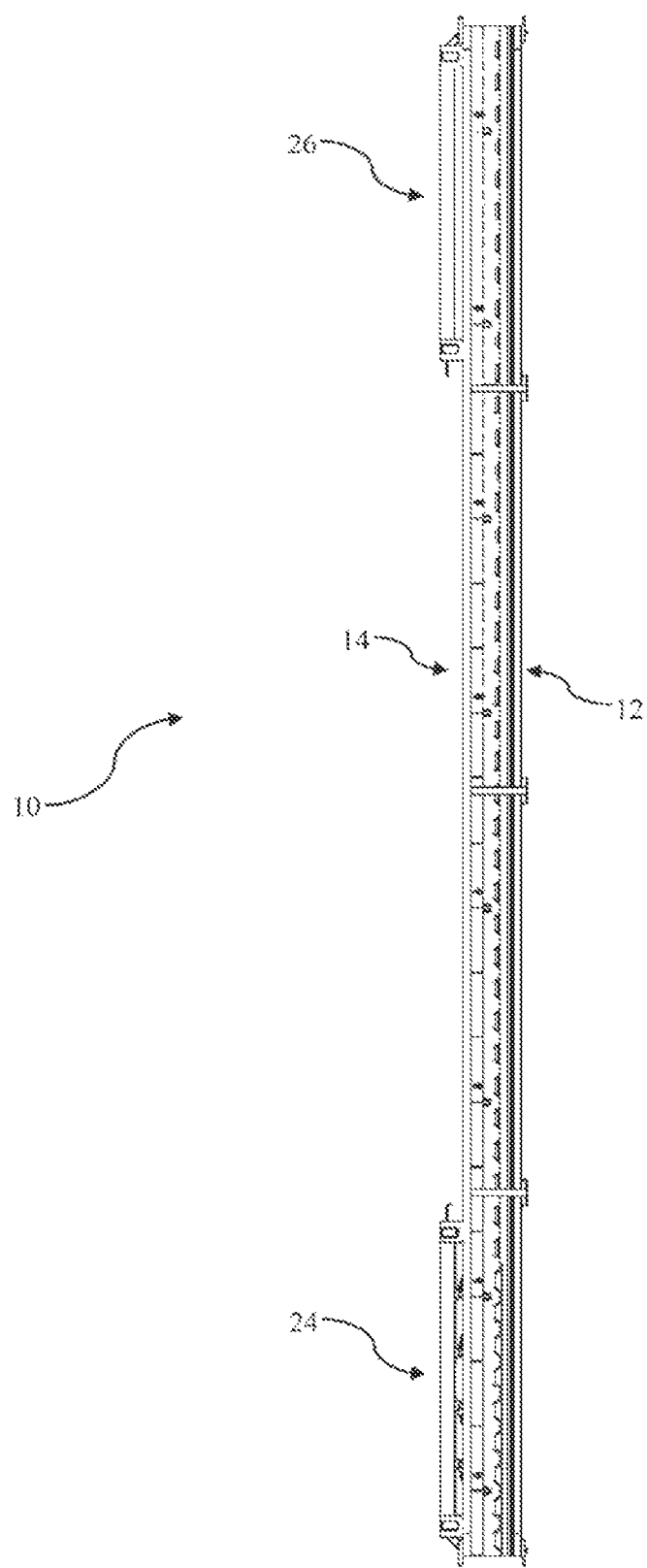
FIG. 11 is top view of the collapsible intermodal container of FIG. 10.

As best shown in FIGS. 10 to 12, once the steel rods 14h abut with the stop members 12f and the steel rods 12h abut with the stop members 14f of the left side wall 14, the right side wall 12 will be prevented from further moving towards the left side wall 14 and the container 10 will be in the collapsed configuration. In this configuration, the upper wall 16 extends downwardly from the upper longitudinal end 12a of the right side wall 12. The upper link members 20 extend downwardly from the upper flange 14e and are located between the left side wall 14 and the upper wall 16. Additionally, in the collapsed configuration, the lower wall 18 extends upwardly from the lower longitudinal end 14b of the left side wall 14. The lower link members 22 extend upwardly from the lower flange 12e of the right side wall 12 and are located between the right side wall 12 and the lower wall 18.

In the collapsed configuration, the upper wall 16 is adjacent to, or abutted with, the lower wall 18. The upper wall 16 extends substantially parallel to the lower wall 18 such that the inner surface of the upper wall 16 is substantially parallel to the inner surface of the lower wall 18. Accordingly, the right side wall 12 and the left side wall 14 are spaced apart by a second normal distance D2 of about 33 centimetres, which is less than the first normal distance D1.

It will be appreciated, in other embodiments, the second normal distance D2 may be between 23 centimetres and 98 centimetres.

In an exemplary method, the container 10 is configured from the erected configuration to the collapsed configuration by manually moving the door assemblies 24, 26 to the open positions. Then, the right wall 12 is fixed relative to a stationary structure and the left wall 14 is moved towards the right wall 12 by an actuator, such as a hydraulic actuator, until the steel rods 14h abut with the stopping members 12f and the steel rods 12h abut with the stop members 14f of the left side wall 14. To reverse this process (i.e., configure the container 10 from the collapsed configuration to the erected configuration), the right wall 12 is again fixed to the stationary structure and the left wall 14 is moved from the right wall 12 by the actuator until the link members 20, 22 prevent further movement of the left wall 14.

According to the depicted embodiment, the container 10 in the erected configuration meets the specifications required by ISO, specifically ISO 1496-1:2013—Series 1 Freight Containers, and therefore can be readily used with existing transportation infrastructure. Further, when the container 10 configures from the erected configuration to the collapsed configuration, the container 10 is able to significantly reduce its width. This allows a greater number of empty containers 10 to be transported in a single shipment compared to standard intermodal containers. Also, this allows a greater number of containers 10 to be stored in a defined area compared to standard containers. Furthermore, the container 10 can be readily configured between the erected configuration and the collapsed configuration without the need for assembly and/or removal of parts.

FIGS. 13 to 21 of the accompanying drawings show a second embodiment of a collapsible intermodal container 10'. Features of the collapsible intermodal container 10' that are substantially identical or similar to those of the collapsible intermodal container 10 are provided with the same reference numerals.

Figure 13:
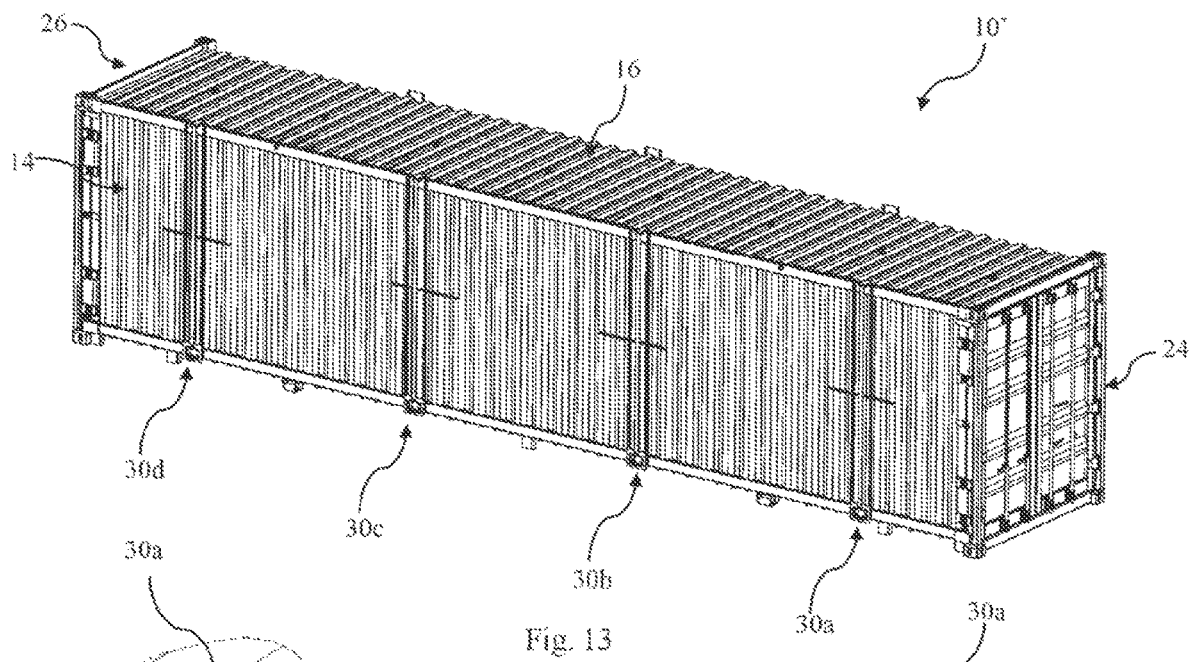
FIG. 13 is a perspective view of a second embodiment of a collapsible intermodal container in the erected configuration with end assemblies or door assemblies in the closed position.
Figure 14:
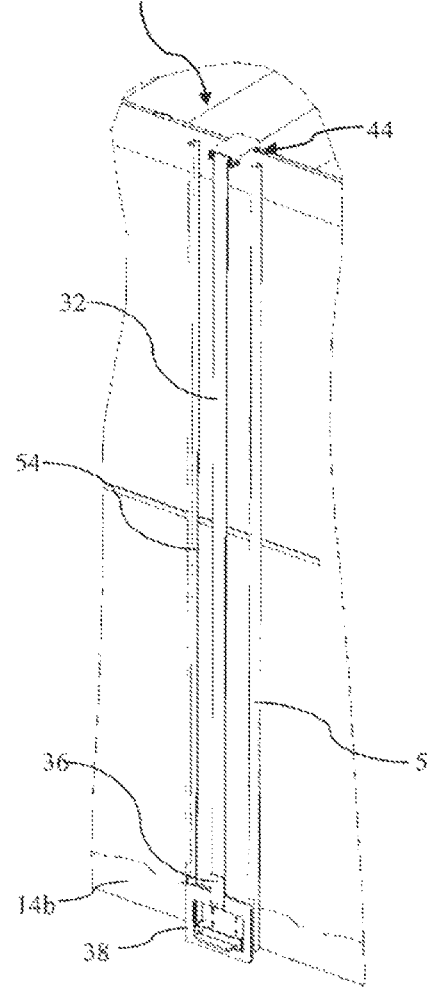
FIG. 14 is an enlarged partial view of a lifting system or strap system of the collapsible intermodal container of FIG. 13.

The collapsible intermodal container 10' is substantially identical to the collapsible intermodal container 10. However, as best seen in FIG. 13, the collapsible intermodal container 10' further comprises four lifting systems 30a, 30b, 30c, 30d for use in configuring the container 10' to the erected configuration. Each of the lifting systems 30a, 30b, 30c, 30d includes an elongate flexible strap 32 for use in lifting the upper wall 16 into position when configuring the container 10' to the erected configuration. For this reason, the lifting systems 30a, 30b, 30c, 30d are also referred to herein as strap systems 30a, 30b, 30c, 30d, and one of these strap systems 30a will now be described in greater detail.

Figure 19:
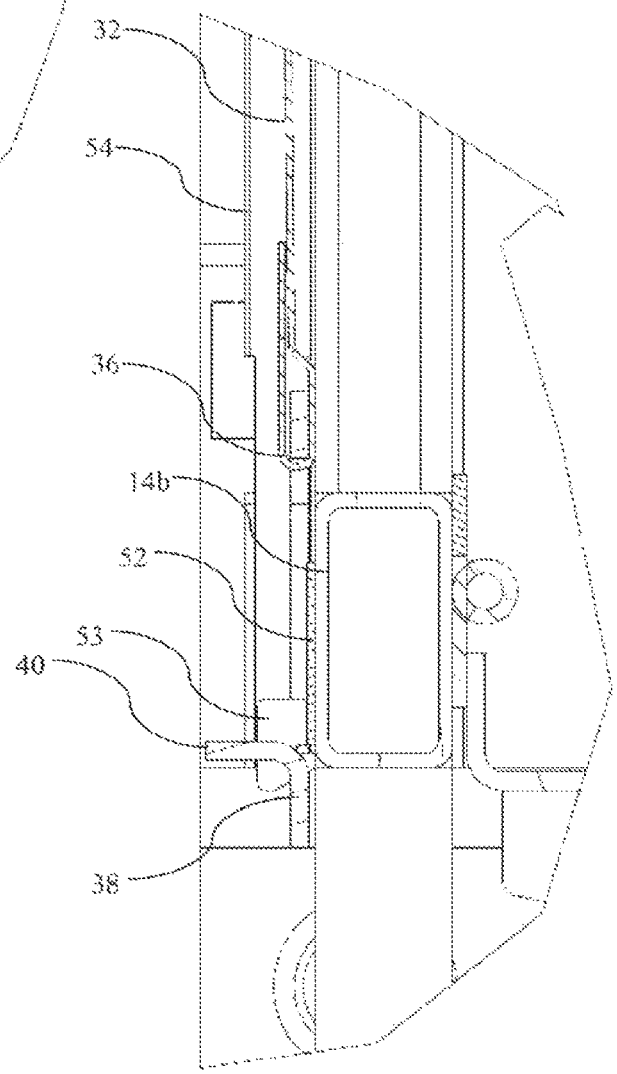
FIG. 19 is an enlarged view of Detail B of FIG. 17.

The strap system 30a comprises a strap 32 with one end 34 attached to the left longitudinal end 16b of the upper wall 16 (see FIG. 18) and another end 36 attached to a foot hold 38 (see FIG. 19). The foot hold 38 is in the form of a steel frame with a shoulder portion 40 and an aperture 42. The strap system 30a further comprises a roller mechanism 44 having a body 46 attached to the upper longitudinal end 14a and a pair of opposing rollers 48, 50 rotatably attached to the body 46 such that the roller 48 is located on the outside of the left wall 14 and the roller 50 is located on the inside of the left wall 14. The strap 32 is threaded through the body 46 of the roller mechanism 44 and engaged with the rollers 48, 50 such that upward or downward movement of one of the ends 34, 36 of the strap 32 causes an opposite movement at the other end 34, 36. The strap system 30a further comprises a bracket 52 attached to the outside of the left wall 14 at or near the lower longitudinal end 14b. The bracket 52 has a pair of protruding members 53. Each of the protruding members 53 has an upwardly extending recess to receive a portion of the foot hold 38 for securement therewith. The strap system 30a further comprises a pair of guide rails 54 attached to the outside of the left wall 14. The guide rails 54 extend from the upper longitudinal end 14a to the bracket 52. Each guide rail 54 defines a channel which receives a portion of the foot hold 38 such that the foot hold 38 is able to slide upwardly and downwardly along the guide rails 54. It will be appreciated, however, that the guide rails 54 limit the sideward movement of the foot hold 38.

Figure 15:
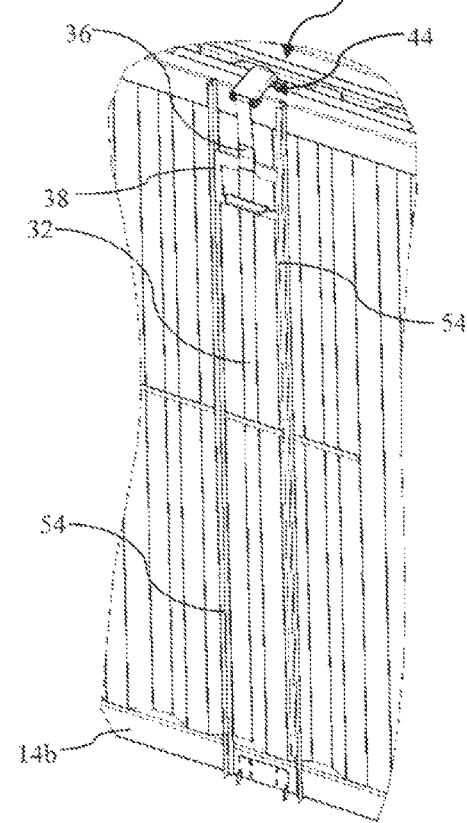
FIG. 15 is an enlarged partial view of the lifting system or strap system of FIG. 14 with the collapsible intermodal container in the collapsed configuration.
Figure 16:
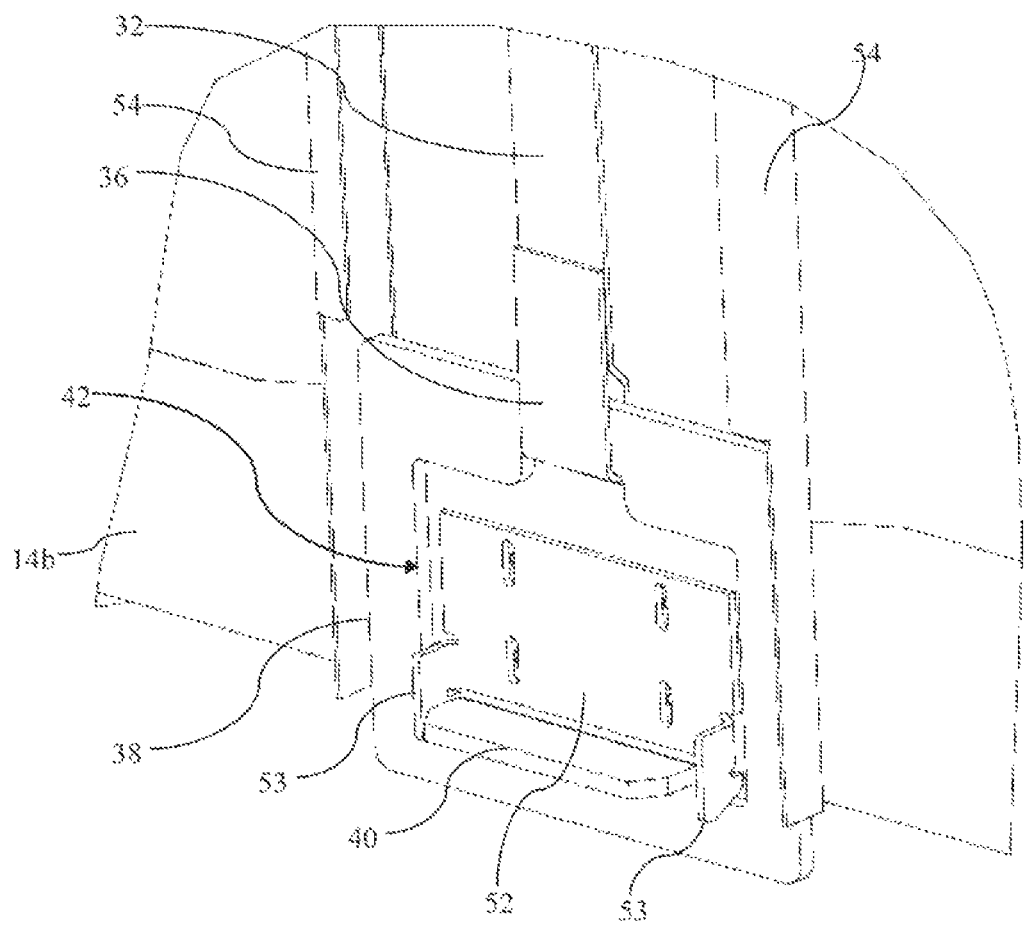
FIG. 16 is an enlarged partial view of a foot hold and a bracket of the lifting system or strap system of FIG. 14.
Figure 17:
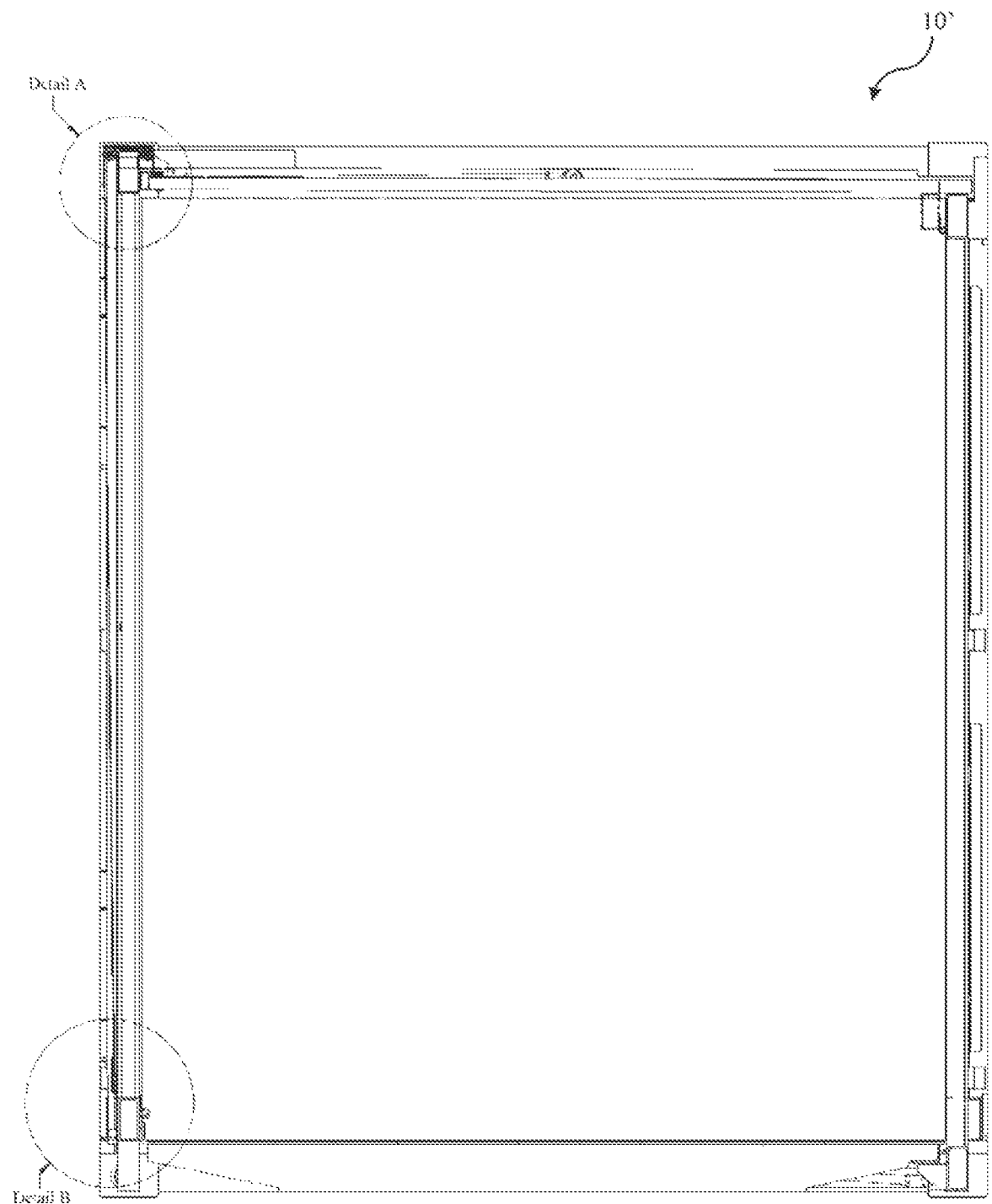
FIG. 17 is a front view of the collapsible intermodal container of FIG. 13 with the end assemblies or door assemblies in the open position.
Figure 18:
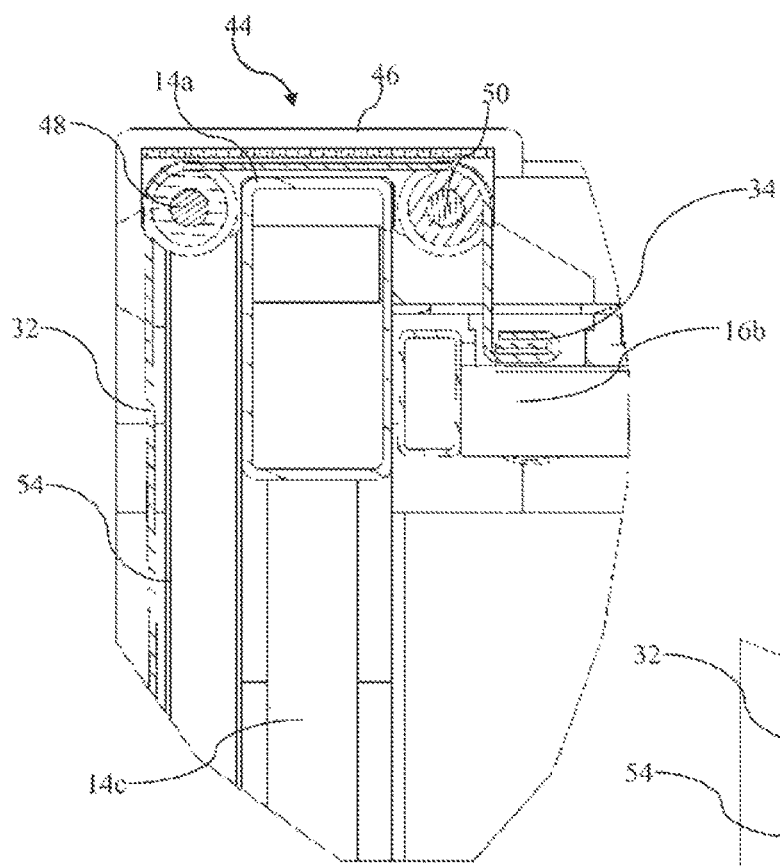
FIG. 18 is an enlarged view of Detail A of FIG. 17.
Figure 21:
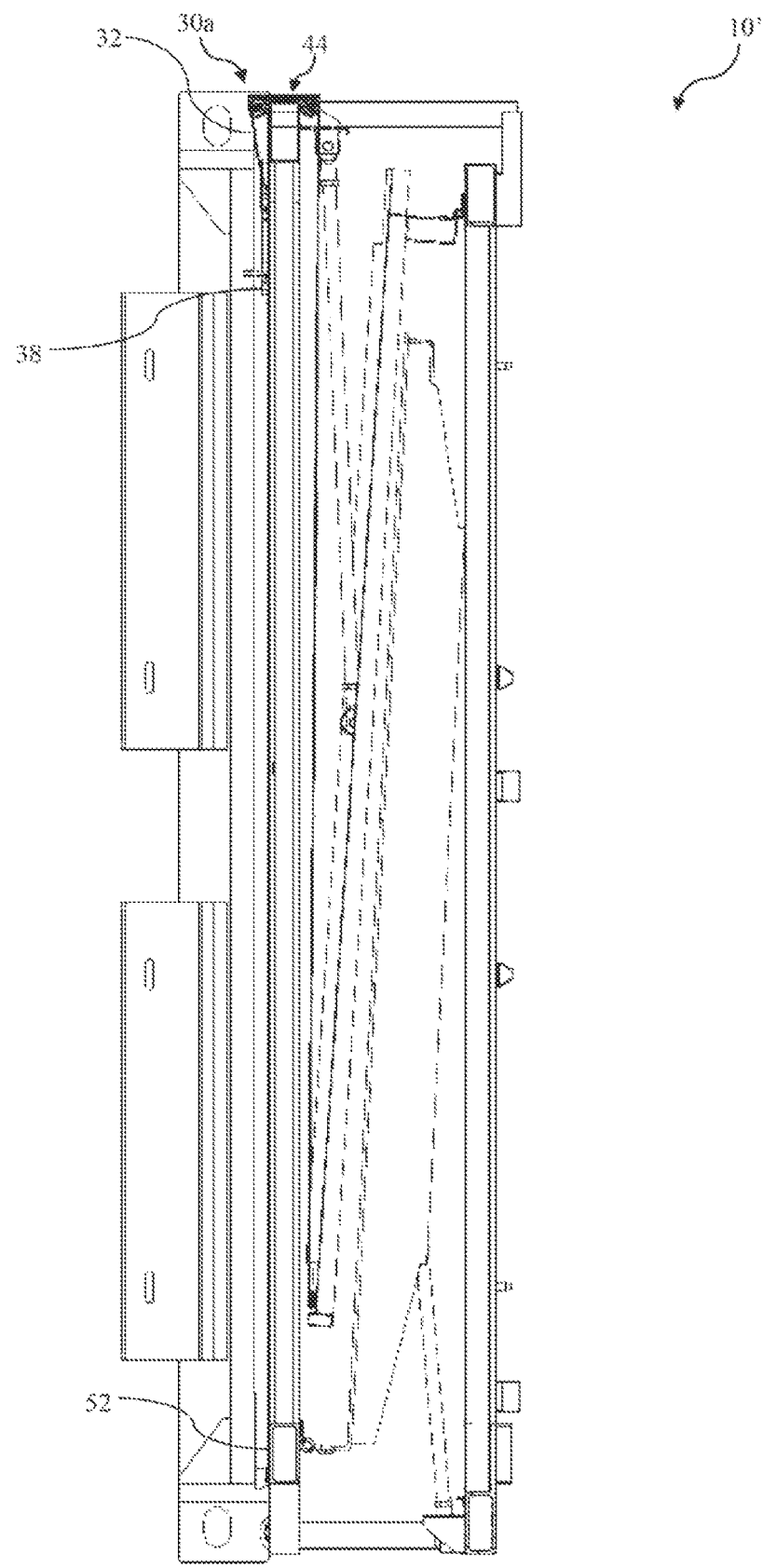
FIG. 21 is a front view of the collapsible intermodal container of FIG. 17 in the collapsed configuration.

As best seen in FIGS. 15 and 21, the container 10' is configured to the collapsed configuration. In this configuration, as the left longitudinal end 16b of the upper wall 16 is located towards the lower longitudinal end 14b of the left wall 14, the strap 32 causes the foot hold 38 to be located near the upper longitudinal end 14a of the left wall 14.

Figure 20:
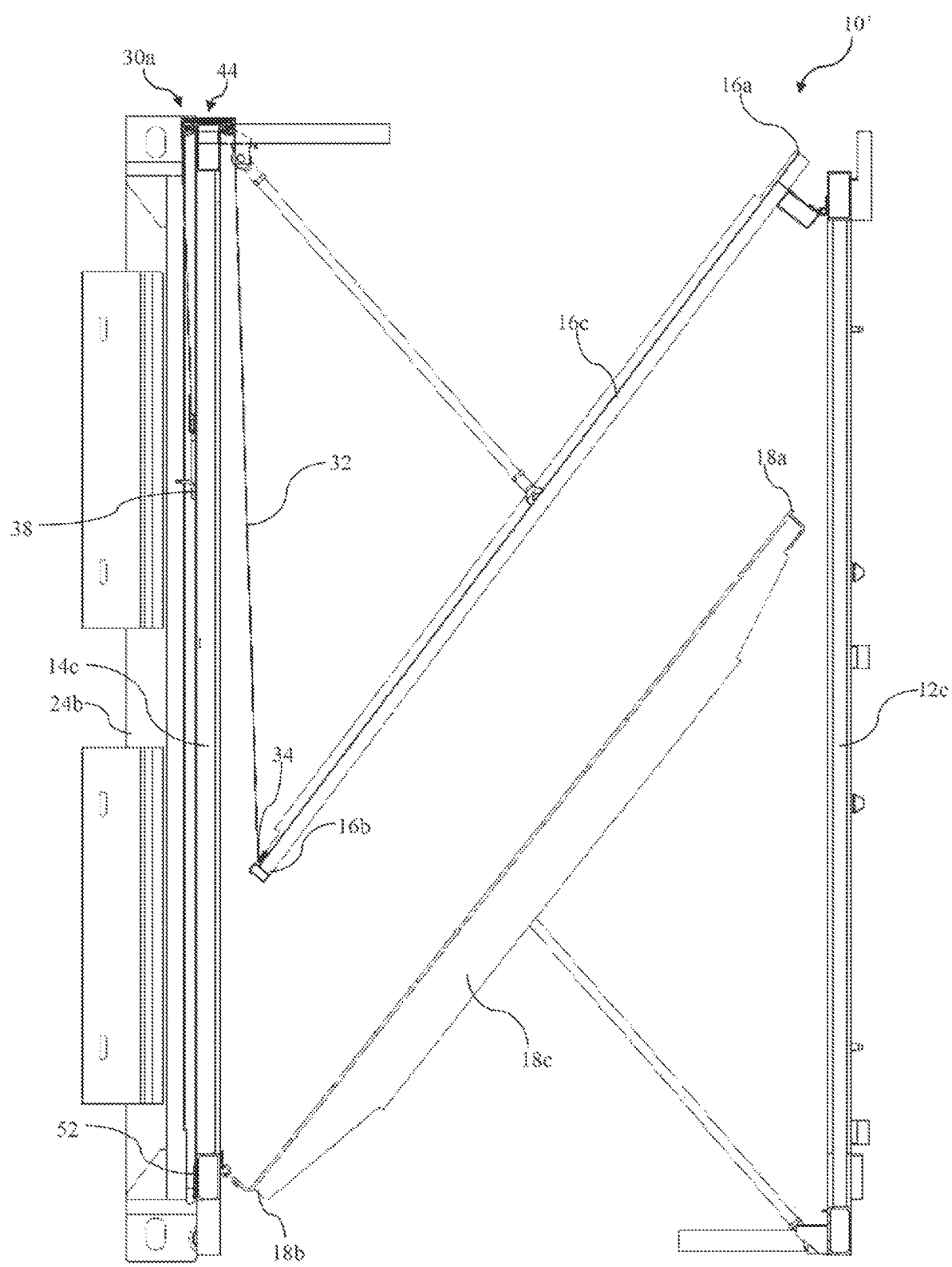
FIG. 20 is a front view of the collapsible intermodal container of FIG. 17 configuring from the collapsed configuration to the erected configuration.

To configure the container 10' to the erected configuration, the foot hold 38 is slidingly moved downwards along the guide rails 54 by a user. This causes the strap 32 to pull the left longitudinal end 16b in an upward direction as best seen in FIG. 20. When the foot hold 38 is near the bracket 52, the user stands on the shoulder portion 40 of the foot hold 38 to force the container 10' into the erected configuration. Then, as best seen in FIGS. 13, 14, and 16 to 19, the foot hold 38 is manipulated such that the pair of protruding members 53 extend through the aperture 42 of the foot hold 38 such that the recesses of the protruding members 53 receive portions of the foot hold 38. This effectively locks the container 10' in the erected configuration.

It will be appreciated that, in order to unlock the container 10' from the erected configuration, the user will stand on the shoulder portion 40 of the foot hold 38 to remove portions of the foot hold 38 from the recesses of the protruding members 53. Then, the user will manipulate the foot hold 38 so that the protruding member 53 are removed from the aperture 42 and the foot hold 38 is free to slide upwardly along the guide rails 54. This will allow the container 10' to configure to the collapsed configuration.

Given that, in this depicted embodiment, each of the strap system 30a, 30b, 30c, 30d are substantially identical, only the strap system 30a is described above in detail. A person skilled in the art will understand that the other strap systems 30b, 30c, 30d operate in substantially the same manner and comprises substantially identical components to those described above.

FIGS. 22 to 25 of the accompanying drawings show a third embodiment of a collapsible intermodal container 10". The features of the collapsible intermodal container 10" that are substantially identical or correspond to those of the collapsible intermodal containers 10, 10' of the first and second embodiments are provided with the same reference numerals and will not be described further.

Figure 22:
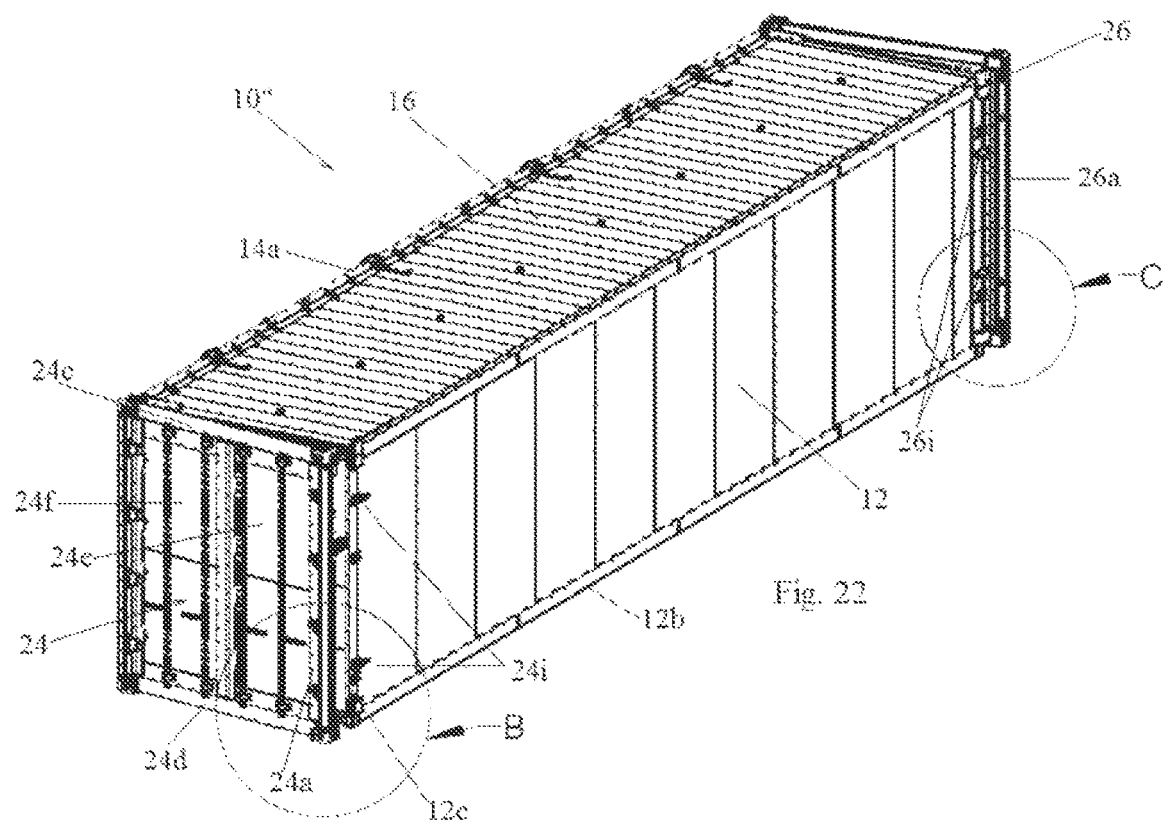
FIG. 22 is a perspective view of a collapsible intermodal container according to a third embodiment in the erected configuration the with end assemblies or door assemblies moved towards the closed position but not yet fully in the closed position.
Figure 23:
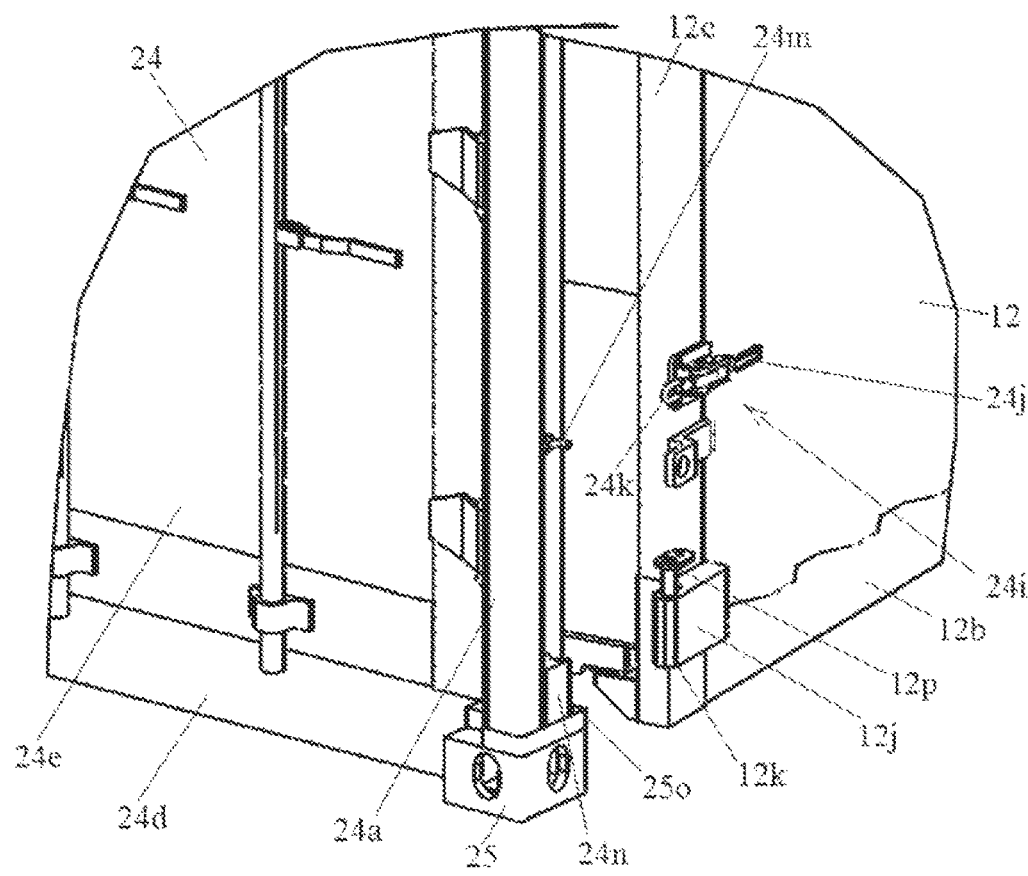
FIG. 23 is an enlarged, more detailed perspective view in the region designated "B" of the collapsible intermodal container shown in FIG. 22.

As can be seen in FIGS. 22 and 23, this third embodiment of a collapsible intermodal container 10" differs in relation to the closure mechanism for locating and securing the front and rear door assemblies 24, 26 in the closed position when the collapsible intermodal container 10" is being configured to the erected configuration. In this embodiment, instead of a closure mechanism comprising a flap member 24g hingedly attached to the right upright member 24a of the front door assembly 24, with openings 24h adapted to receive respective protrusions 12g on the front end 12c of the right side wall 12, the closure mechanism comprises two closure levers 24i fixed to the front end 12c of the right side wall 12, spaced apart as upper and lower closure levers 24i. Each closure lever 24i has a handle 24j that is operable to extend a latch arm 24k for engaging a catch 24m that is fixed to the upright member 24a of the front door assembly 24 and aligned with the latch arm 24k. The handle 24j is further operable to retract the latch arm 24k as it engages the catch 24m to draw the front door assembly 24 into the closed position. An inner side of the door frame members 24a, 24b, 24c, 24d may include a flexible seal or gasket, such as a rubber bead, to cushion and seal the front door assembly 24 against the front ends of the walls 12, 14. 16, 18 in the closed position shown in FIG. 25.

Figure 24:
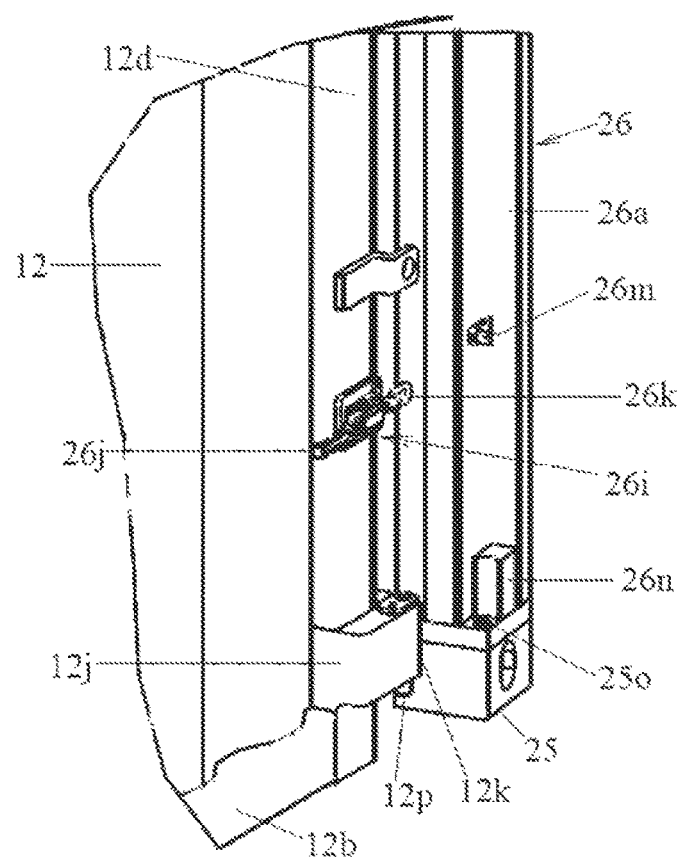
FIG. 24 is an enlarged, more detailed perspective view in the region designated "C" of the collapsible intermodal container shown in FIG. 22.
Figure 25:
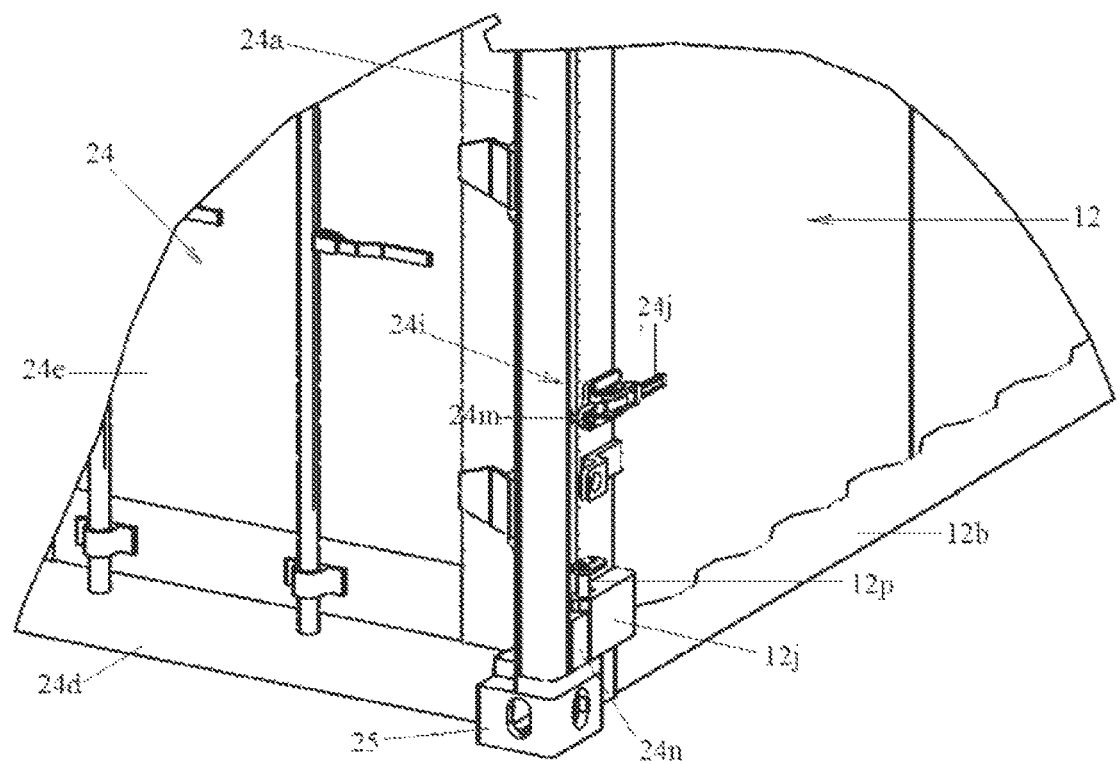
FIG. 25 is a perspective view corresponding to the view shown in FIG. 23, but with the end assembly or door assembly of the collapsible intermodal container in the closed position.

It will be apparent from FIG. 24 that the rear door assembly 26 also has such a closure mechanism with two closure levers 26i fixed to the rear end 12d of side wall 12, spaced apart as upper and lower closure levers 26i. Again, each closure lever 26i has a handle 26j that operates to extend a latch arm 26k to engage a catch 26m that is fixed to the upright 26a of the rear door assembly 26 and aligned with the latch arm 26k. The handle 26j is operable to retract the latch arm 26k when it engages the catch 26m to draw the rear door assembly 26 into the closed position.

Referring to FIGS. 23 and 24, the intermodal container 10" of this embodiment includes engagement members formed as forwardly and rearwardly extending corner block members 12j that present a tapered end face 12k to matingly engage with or be received by complementary corner elements 24n, 26n of the front and rear door assemblies, respectively. In this way, the respective corner block members 12j cooperate with the corner elements 24n, 26n to locate the door assemblies 24, 26 correctly with respect to the side wall 12 as the door assemblies 24, 26 are moved into the closed position. Furthermore, the corner block members 12j abut with an adjacent corner casting 25 and allow the walls 12, 14, 16, 18 to be at least partly supported by the rigid frames of the door assemblies 24, 26. In this way, the weight of the walls 12, 14, 16, 18 is partly transferred to the door assemblies 24, 26. The corner block members 12j and corner elements 24n, 26n thus replace the corner plates 12i, 14g and the brackets 24z, 26z of the first embodiment. In this case, the forwardly and rearwardly extending corner block members 12j include a steel pin 12p that is captured but movable within a bore through those block members 12j. When each door assembly 24, 26 is in the closed position, the pin 12p may be driven (e.g. with a hammer) through the block 12j to project into a corresponding hole 25o provided in the corner casting 25. Accordingly, in addition to the closure levers 24i, 26i, the pins 12p operate to fix and lock the front and rear door assemblies 24, 26 in their closed positions.

Figure 32:
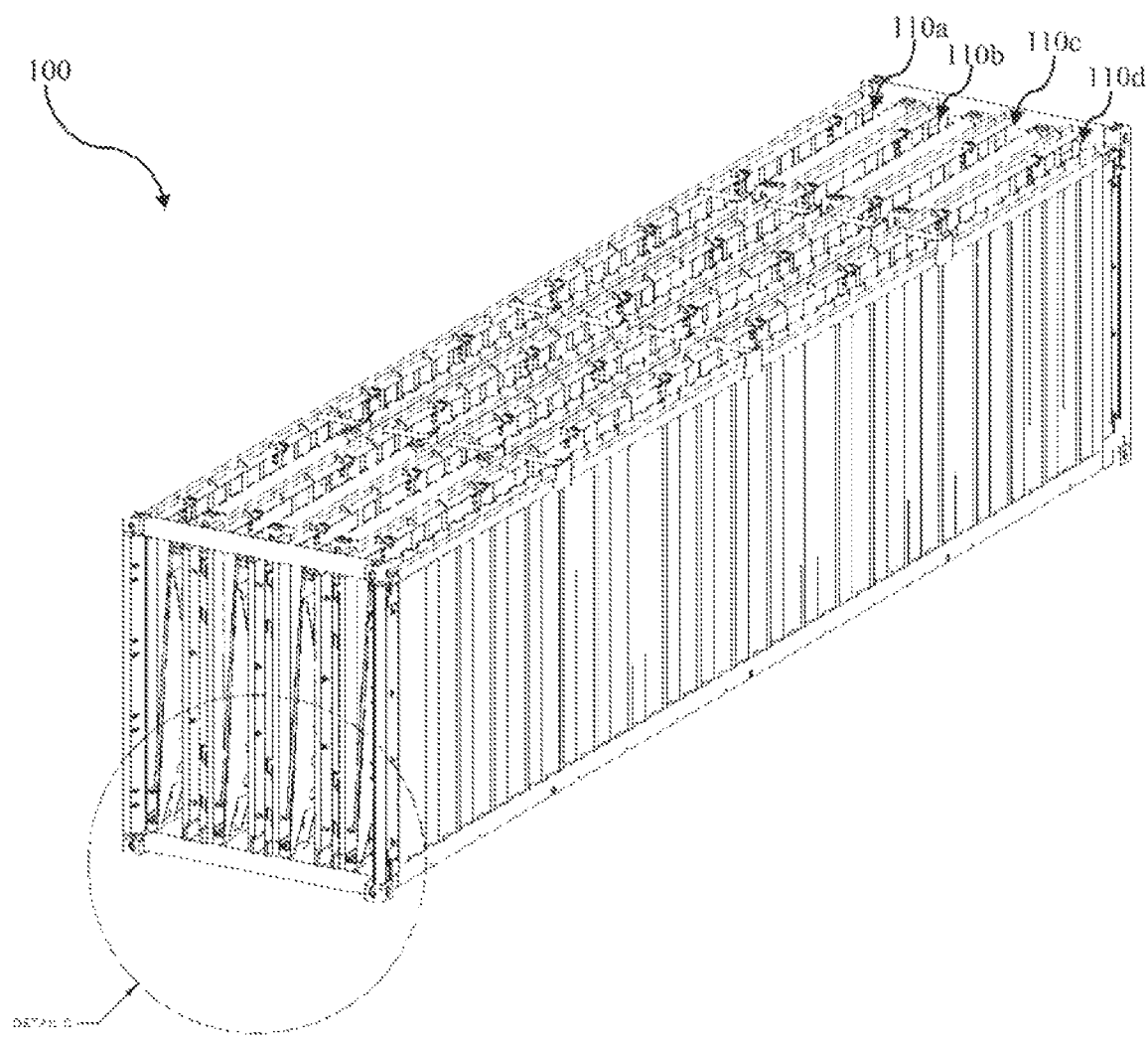
FIG. 32 is another perspective view of the collapsible intermodal container assembly of FIG. 31 with door panels removed.
Figure 33:
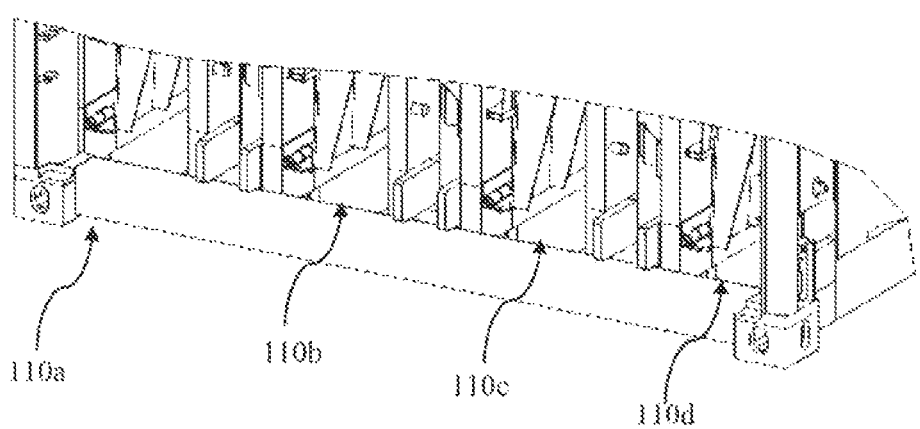
FIG. 33 is an enlarged view of Detail C of FIG. 32.

FIGS. 26 to 33 of the accompanying drawings show four collapsible intermodal containers 110a, 110b, 110c, 110d assembling together to form an embodiment of a collapsible intermodal container assembly 100 as shown in FIGS. 31 to 33. In the depicted embodiment, each of the four collapsible intermodal containers 110a, 110b, 110c, 110d is identical to the collapsible intermodal container 10 described above. Accordingly, features of the collapsible intermodal containers 110a, 110b, 110c, 110d that are identical to those of the collapsible intermodal container 10 are provided with the same reference numerals.

In the depicted embodiment, when all the containers 110a, 110b, 110c, 110d are initially in the erected configurations and separated from each other, the sequential steps set out below are taken to form the collapsible intermodal container assembly 100.

In a first step, the door assemblies 24, 26 of the container 110d are moved to the open positions. The right wall 12 of the container 110d is then fixed relative to a stationary structure (not shown) and the left wall 14 of the container 110d is moved towards the right wall 12 of the container 110d until the container 110d is configured to the collapsed configuration.

In a second step, the right wall 12 of the container 110c is abutted against the door assemblies 24, 26 of the container 110d. The door assemblies 24, 26 of the container 110c are moved to the open positions. As the right wall 12 of the container 110d remains fixed relative to the stationary structure, the left wall 14 of the container 110c is moved towards the right wall 12 of the container 110c until the container 110c is configured to the collapsed configuration.

In a third step, the right wall 12 of the container 110b is abutted against the door assemblies 24, 26 of the container 110c. The door assemblies 24, 26 of the container 110b are moved to the open positions. As the right wall 12 of the container 110d remains fixed relative to the stationary structure, the left wall 14 of the container 110b is moved towards the right wall 12 of the container 110b until the container 110b is configured to the collapsed configuration.

Figure 26:
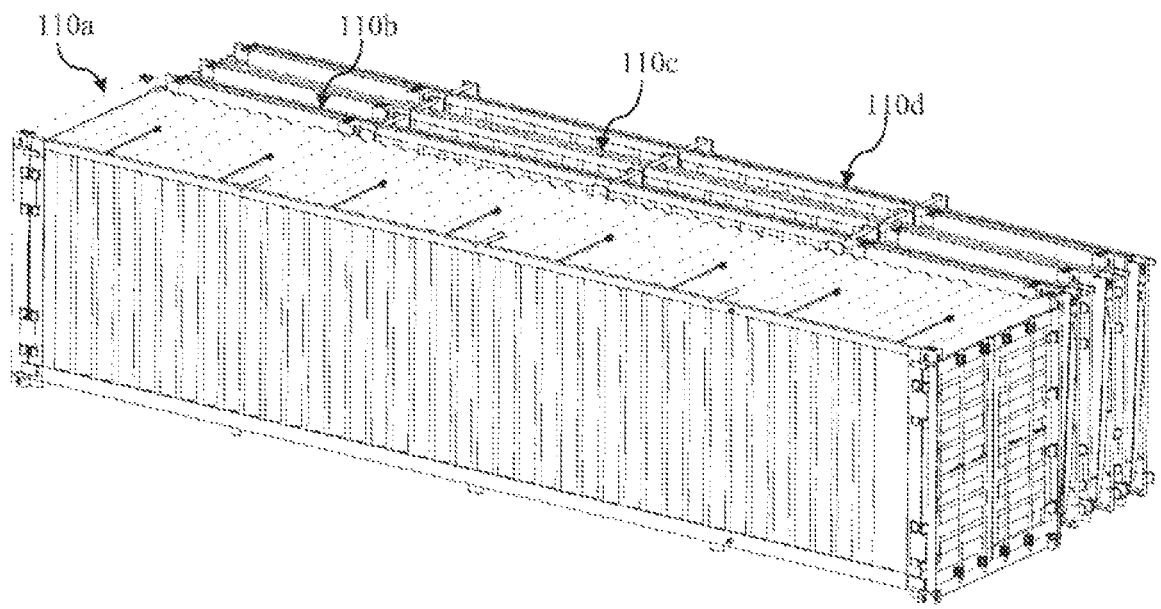
FIG. 26 is a perspective view of four collapsible intermodal containers of FIG. 1 assembling to form an embodiment of a collapsible intermodal container assembly, as one of the collapsible intermodal containers is in the erected configuration with door assemblies in the closed positions and the remaining collapsible intermodal containers are in the collapsed configurations with door assemblies in the open positions.
Figure 27:
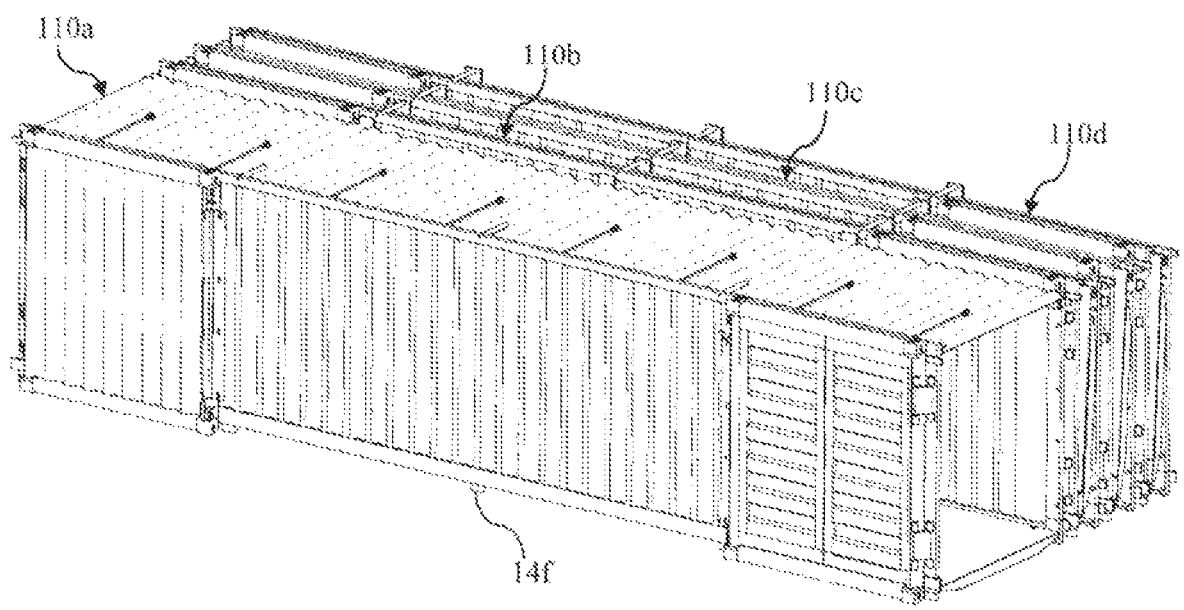
FIG. 27 is a perspective view of the collapsible intermodal containers of FIG. 26, as one of the collapsible intermodal containers are in the erected configuration with door assemblies in the open positions and the remaining collapsible intermodal containers are in the collapsed configurations with door assemblies in the open position.
Figure 28:
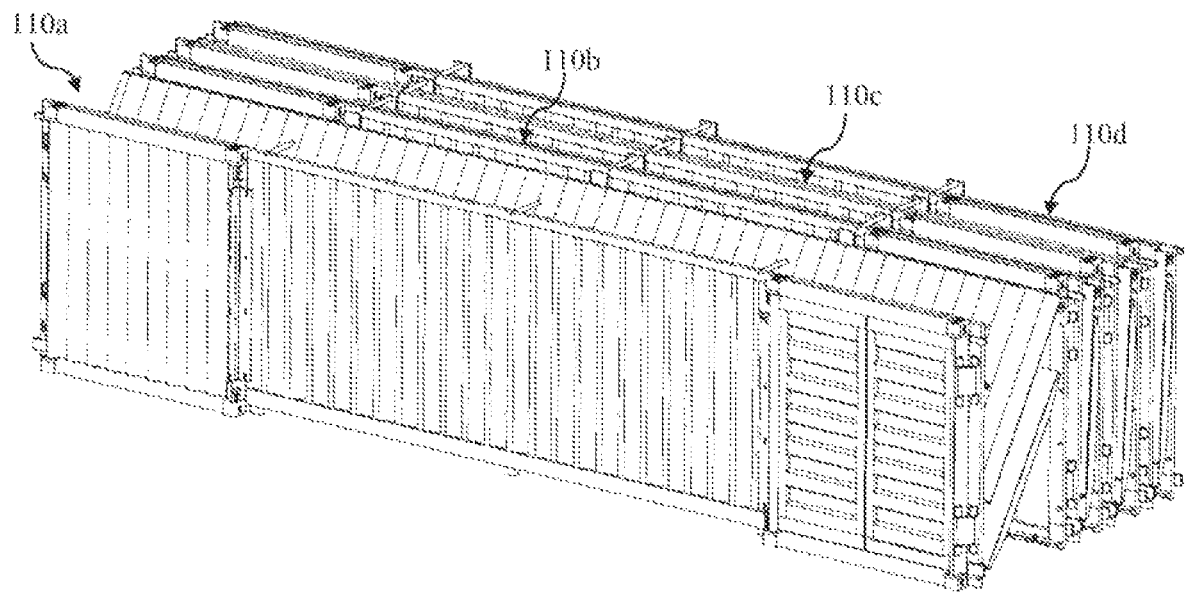
FIG. 28 is a perspective view of the collapsible intermodal containers of FIG. 26, as one of the collapsible intermodal containers is configuring from the erected configuration to the collapsed configuration with door assemblies in the open positions and the remaining collapsible intermodal containers are in the collapsed configurations with door assemblies in the open positions.
Figure 29:
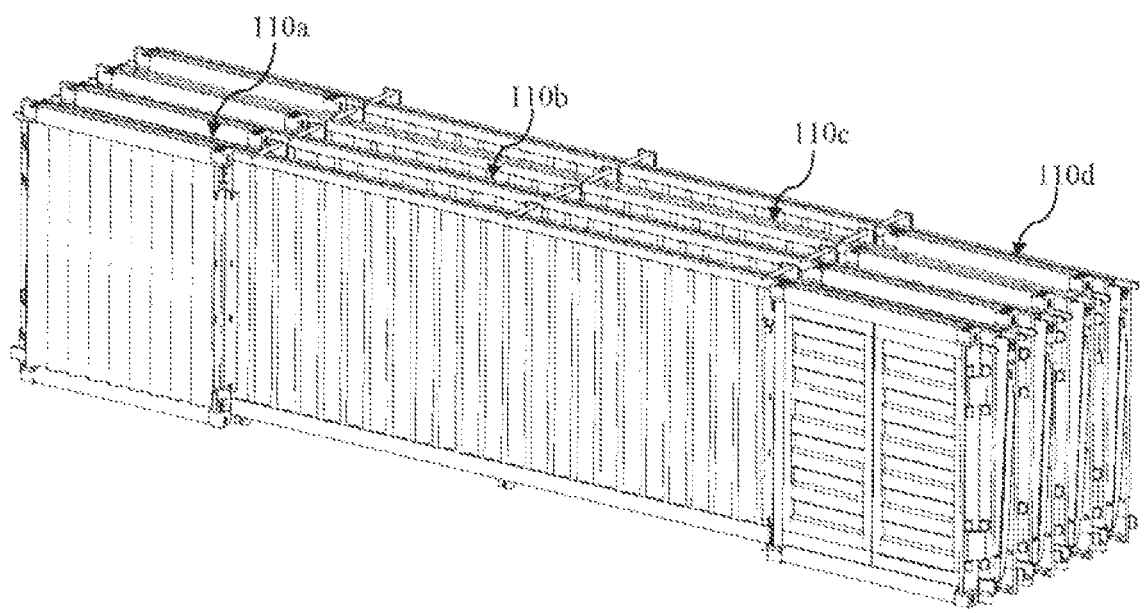
FIG. 29 is a perspective view of the collapsible intermodal containers of FIG. 26, as all of the collapsible intermodal containers are in the collapsed configurations with door assemblies in the open positions.

In a fourth step, as best seen in FIG. 26, the right wall 12 of the container 110a is abutted against the door assemblies 24, 26 of the container 110b. As best seen in FIG. 27, the door assemblies 24, 26 of the container 110a are moved to the open positions. As the right wall 12 of the container 110d remains fixed relative to the stationary structure, as best seen in FIGS. 28 and 29, the left wall 14 of the container 110a is moved towards the right wall 12 of the container 110a until the container is configured to the collapsed configuration. As best seen in FIG. 29, the containers 110a, 110b, 110c, 110d are now in a sidewardly stacked formation.

In a fifth step, as best seen in FIGS. 30 to 33, the door assemblies 24, 26 of the container 110a are moved to the closed positions such that at least the front ends 12c, 14c of the containers 110a, 110b, 110c, 110d abut with the rigid frame of the front door assembly 24 of the container 110a and the rear ends 12d, 14d of the containers 110a, 110b, 110c, 110d abut with the rigid frame of the rear door assembly 26 of the container 110a. It will be appreciated that the door assemblies 24, 26 of the container 110a in the closed positions will substantially limit forward and rearward movement of the containers 110a, 110b, 110c, 110. Further, as best seen in FIGS. 32 and 33, the openings defined by the corner brackets of the door assemblies 24, 26 of the container 110a receive the corner plates 14g of the container 110a and the corner plates 12i of the container 110d such that the corner plates 14g of the container 110a and the corner plates 12i of the container 110d abut with respective adjacent corner castings 25 of the door assemblies 24, 26 of the container 110a. This secures the left wall 14 of the container 110a with respect to the right wall 12 of the container 110d. Furthermore, the openings of the flap members of the door assemblies 24, 26 of the container 110a receive the protrusions 12g of the container 110d for removable attachment such that the door assemblies 24, 26 of the container 110a are locked in the closed positions. As best seen in FIGS. 32 and 33, the corner plates 12i of the container 110a and the corner plates 14g of the container 110d abut with the upper and lower members of the rigid frames of the door assemblies 24, 26 such that the right wall 12 of the container 110a and the left wall 14 of the container 110d are located between the door assemblies 24, 26 of the container 110a and limited in relative vertical movement. Also, the corner plates 12i, 14g of the containers 110b, 110c abut with the upper and lower members of the rigid frames of the door assemblies 24, 26 of the container 110a such that the containers 110b, 110c are located between the door assemblies 24, 26 of the container 110a and limited in relative vertical movement.

The above five steps form the collapsible intermodal container assembly 100 as best seen in FIG. 31. It will be appreciated that all components of the containers 110b, 110c, 110d and the walls 12, 14, 16, 18 of the container 110a are substantially supported by the rigid frames of the door assemblies 24, 26 of the container 110a. In the depicted embodiment, the assembly 100 has the same periphery as the container 10 in the erected configuration and the structural strength of the assembly 100 meets the requirements outlined by ISO in relation to a standardised intermodal container. Also, it will be appreciated that left wall 14 of the container 110a and the right wall 12 of the container 110d are spaced apart by an assembled distance which is the same as the first normal distance D1 of the container 10 described above.

According to the depicted embodiment, the assembly 100 meets the specifications required by ISO, specifically ISO 1496-1:2013—Series 1 Freight Containers, and therefore can be readily used with existing transportation infrastructure. Further, the assembly 100 allows up to four empty containers 110a, 110b, 110c, 110d to be transported in the same periphery as a single container.

FIGS. 34 to 65 of the accompanying drawings show an embodiment of a collapsible intermodal stacker 200. The stacker 200 comprises a stationary section comprising two steel structures 202a, 202b. The structure 202a comprises a base 204 fixed to a planar floor. The structure 202a further comprises an upright 206 extending upwardly from the base 204. The upright 206 has an upright planar surface 208 facing in a leftward direction. The structure 202a further comprises two buttress members 210 extending from the base 204 to the upright 206 to provide support for the upright 206. Each of the base 204, upright 206 and buttress members 210 are formed from one or more steel square tubes.

Given that, in this depicted embodiment, each of the structures 202a, 202b are substantially identical, only the structure 202a is described above in detail. A person skilled in the art will understand that the structure 202b operates in substantially the same manner and comprises substantially identical components to those described above.

The structures 202a, 202b are spaced apart from each other and orientated such that the planar surfaces 208 of the structures 202a, 202b are in the same plane to define an upright leftward facing planar face.

The stationary section further comprises two side wall pulling devices 212a, 212b. The side wall pulling device 212a is in the form of an electric winch mounted to one of the buttress members 210 of the structure 202a such that the side wall pulling device 212a is fixed in relation to the planar face defined by the planar surfaces 208 of the structures 202a, 202b. The side wall pulling device 212a comprises a winch drum 214 rotatable about an axis which is substantially vertical. The side wall pulling device 212a further comprises an electrical motor 216 operatively connected to the winch drum 214 and operable to rotate the winch drum 214. The side wall pulling device 212a further comprises a cable spooled onto the winch drum 214 with an end portion split into two free ends 217.

Given that, in this depicted embodiment, each of the side wall pulling devices 212a, 212b are substantially identical, only the side wall pulling device 212a is described above in detail. A person skilled in the art will understand that the side wall pulling device 212a operates in substantially the same manner and comprises substantially identical components to those described above. However, unlike the side wall pulling device 212a, the side wall pulling device 212b is mounted to one of the buttress members 210 of the structure 202b.

The stacker 200 further comprises two movable sections 216a, 216b. The movable section 216a is disposed frontward of and adjacent to the structure 202a. As best seen in FIG. 40a, the movable section 216a comprises a track 218 in the form of a pair of steel C-beams 218a, 218b attached to a planar base 218c. The planar base 218c is fixed on the floor. The C-beams 218a, 218b are spaced apart, parallel to each other and extend substantially perpendicular to the planar face defined by the planar surfaces 208 of the structures 202a, 202b. Each of the C-beams 218a, 218b has a web and two flanges extending from the web to define an open recess. The open recesses of the C-beams 218*a*, 218*b* face each other. The track 218 also comprises a plurality of buttress members 218*d*. Each of the buttress members 218*d* is attached to the floor and the web of a respective C-beam 218*a*, 218*b* to provide support to that C-beam 218*a*, 218*b*.

The movable section 216*a* further comprises a carriage 220 which is engaged with the track 218 such that the carriage 220 is able to move along the track 218. The carriage 220 comprises a steel carriage frame defined by a base 222, an upright frame 224 extending upwardly from the base 222, and a pair of buttress members 223 extending from the base 222 to the upright frame 224 for support. As best seen in FIG. 40*a*, the base 222 has two rollers 222*a* attached to the front of the base 222 and two rollers attached to the rear of the base 222. The rollers 222*a* are received in the open recess of the C-beam 218*a* and the rollers 222*b* are received in the open recess of the C-beam 218*b*. Given that the rollers 222*a*, 222*b* are received in the recesses of the C-beams 218*a*, 218*b*, the carriage 220 is able to move along the length of the C-beams 218*a*, 218*b* while being limited in forward, rearward and upward movement. The carriage 220 further comprises a pair of elongate locking members 226 slidably attached to the upright frame 224 such that the locking members 226 are longitudinally movable along a substantially horizontal axis which is perpendicular to the tracks 218. One of the locking members 226 is spaced apart and disposed upward of the other locking member 226. Each of the locking members 226 has an engaging end 228 with a recess 230 and a non-engaging member 232. In this embodiment, the non-engaging members 232 of each locking member 226 are connected together by a rigid member 235 such that the locking members 226 move together in relation to the upright frame 224.

The movable section 216*a* further comprises a lower wall pulling device 234 in the form of an electric winch mounted to the base 222 of the carriage frame of the carriage 220. The lower wall pulling device 234 comprises a winch drum 236 rotatable about an axis which is substantially horizontal and perpendicular to the tracks 218. The lower wall pulling device 234 further comprises an electric motor 238 operatively connected to the winch drum 236 and operable to rotate the winch drum 236. The lower wall pulling device 234 further comprises a cable spooled onto the winch drum 236 with a free end 237. The carriage 220 further comprises a pulley system 239 mounted to an upper end of the upright frame 224. The cable of the lower wall pulling device 234 is threaded through the pulley system 239 such that the free end 237 of the cable is located lower than the pulley system 239.

Given that, in this depicted embodiment, each of the movable sections 216*a*, 216*b* are substantially identical, only the movable section 216*a* is described above in detail. A person skilled in the art will understand that the movable section 216*b* operates in substantially the same manner and comprises substantially identical components to those described above. However, unlike the movable section 216*a*, the movable section 216*b* is disposed rearward of and adjacent to the structure 202*b* such that the structures 202*a*, 202*b* are located between the movable sections 216*a*, 216*b*.

The stacker 200 further comprises a platform in the form of a pair of steel beams 240. The steel beams 240 are disposed between the movable sections 216*a*, 216*b* and extend parallel to the tracks 218 of the movable sections 216*a*, 216*b*. The steel beams 240 are spaced apart and each steel beam 240 has an upper planar surface.

The stacker 200 further comprises a pair of stoppers 242 disposed between the steel beams 240. Each stopper 242 is defined by a base 244 fixed to the floor and an elongate member 246 hingedly attached to the base 244. The member 246 has a rightward facing planar surface. Each member 246 is able to pivot in relation to the respective base 244 so that the member 246 can be either substantially horizontal or vertical. When the member 246 is horizontal, the member 246 is disposed lower than the upper planar surfaces of the steel beams 240.

Referring to FIGS. 34 to 52, an exemplary use of the stacker 200 to collapse a collapsible intermodal container 300 will now be described. The collapsible intermodal container 300 is identical to the collapsible intermodal container 10' described above. Accordingly, features of the collapsible intermodal container 300 that are identical to those of the collapsible intermodal container 10' are provided with the same reference numerals. However, unlike the collapsible intermodal container 10', the container 300 further comprises a pair of rollers 302 disposed on each of the longitudinal ends 12*b*, 14*b* of the side walls 12, 14. The container 300 further comprises a central plate 304 disposed at the front end 14*c* of the left side wall 14, between the front corner plates 14*g*, and extends in forward direction. The container 300 further comprises a central plate 304 disposed at the rear end 14*d* of the left side wall 14, between the rear corner plates 14*g*, and extends in a rearward direction. The container 300 further comprises a pair of spaced apart lugs 306 disposed on each of the front and rear ends 12*c*, 12*d* of the right side wall 12. The lugs 306 disposed on the front end 12*c* extend in a forward direction and the lugs 306 disposed on the rear end 12*d* extend in a rearward direction. The container 300 further comprises a central lug 308 disposed on each of the front and rear ends 18*c*, 18*d* of the lower wall 18. The lug 308 disposed on the front end 18*c* extends in a forward direction and the lug 308 disposed on the rear end 18*d* extends in a rearward direction.

Figure 34:
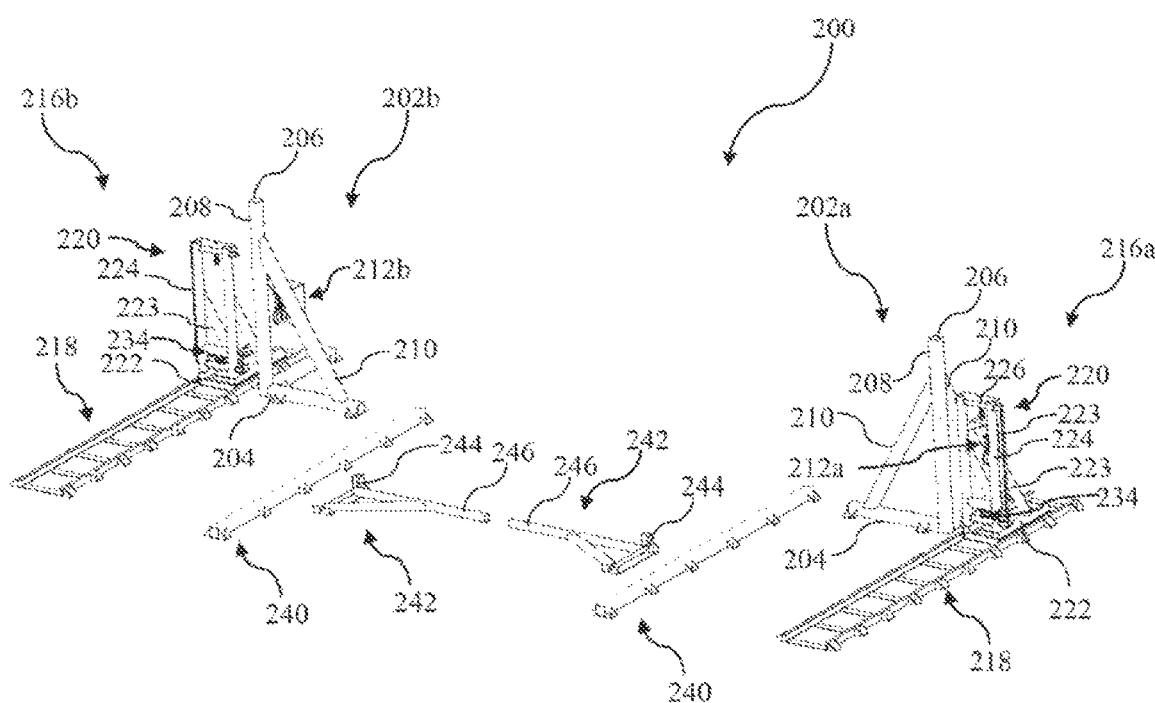
FIG. 34 is a perspective view of an embodiment of a collapsible intermodal container stacker.
Figure 35:
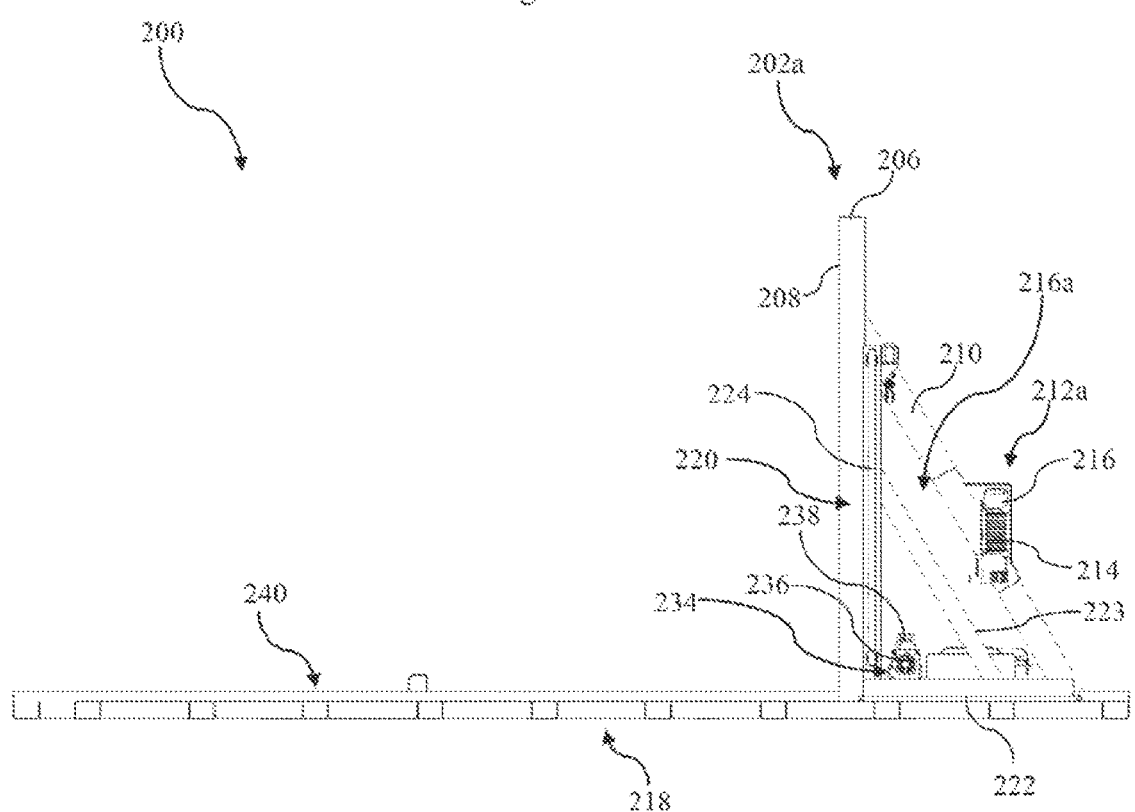
FIG. 35 is an enlarged front view of the collapsible intermodal container stacker of FIG. 34.

Initially, as best seen in FIGS. 34 and 35, the carriages 220 of the movable sections 216*a*, 216*b* are moved along the respective tracks 218 such that the carriages 220 are rightward of the planar face defined by the planar surfaces 208 of the structures 202*a*, 202*b*. Also, the members 246 of the stoppers 242 are pivoted to be substantially horizontal.

Figure 36:
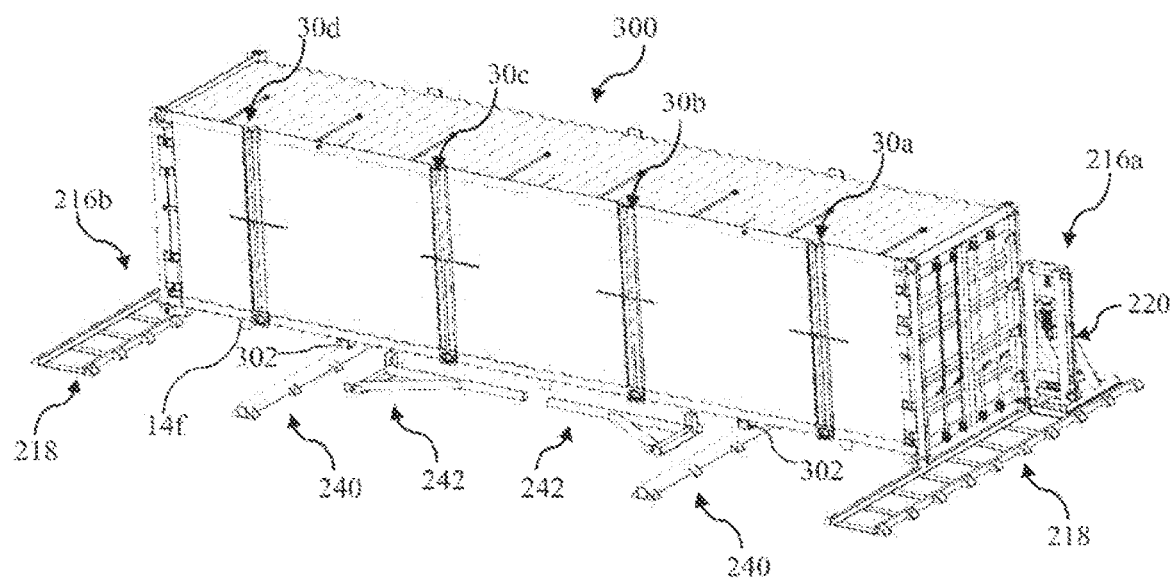
FIG. 36 is a perspective view of the collapsible intermodal container stacker of FIG. 34 interacting with one collapsible intermodal container in a first collapsing step.
Figure 37:
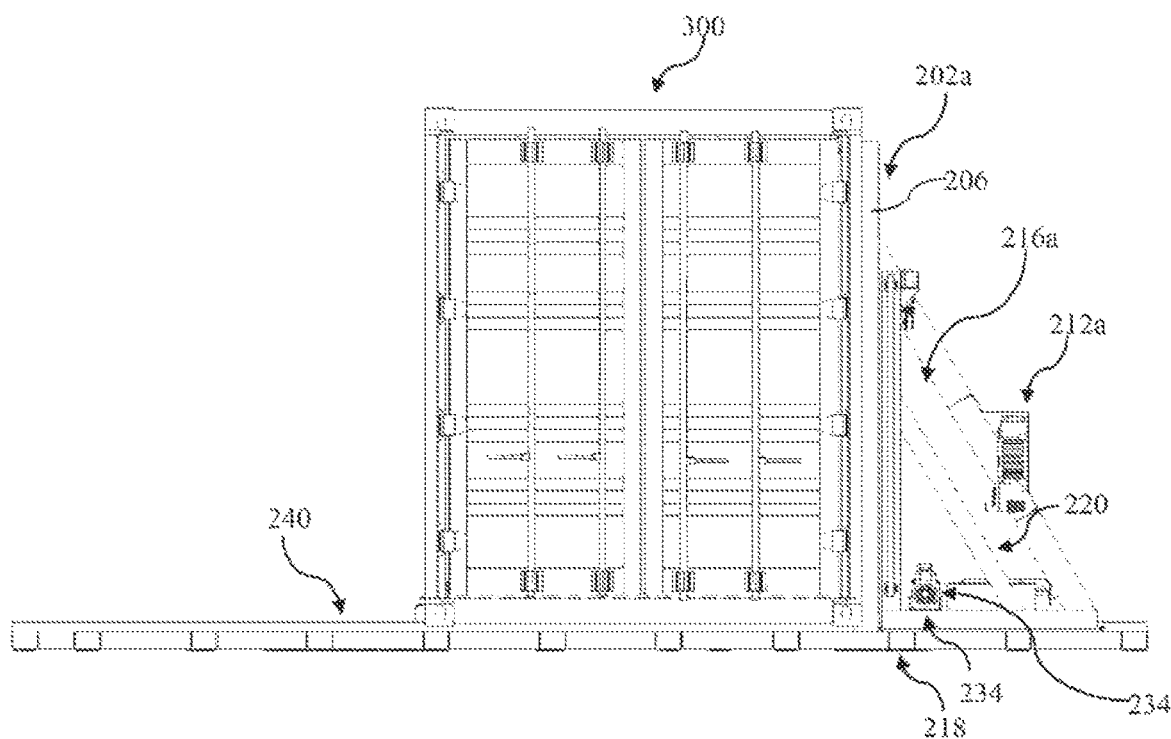
FIG. 37 is an enlarged front view of the collapsible intermodal container stacker of FIG. 36 interacting with the collapsible intermodal container.

In a first collapsing step, as best seen in FIGS. 36 and 37, the collapsible intermodal container 300 is placed on the beams 240 such that the container 300 is elevated from the floor. The collapsible intermodal container 300 is in the erected configuration with door assemblies 24, 26 in the closed positions. Also, the container 300 is locked by the strap systems 30*a*, 30*b*, 30*c*, 30*d* in the erected configuration. The right side wall 12 of the container 300 is abutted against the planar surfaces 208 of the structures 202*a*, 202*b* such that the right side wall 12 is upright. In this depicted embodiment, the rollers 302 of the container 300 are abutted with the upper surface of the beams 240 such that the side walls 12, 14 are able to move along the beams 240.

Figure 38:
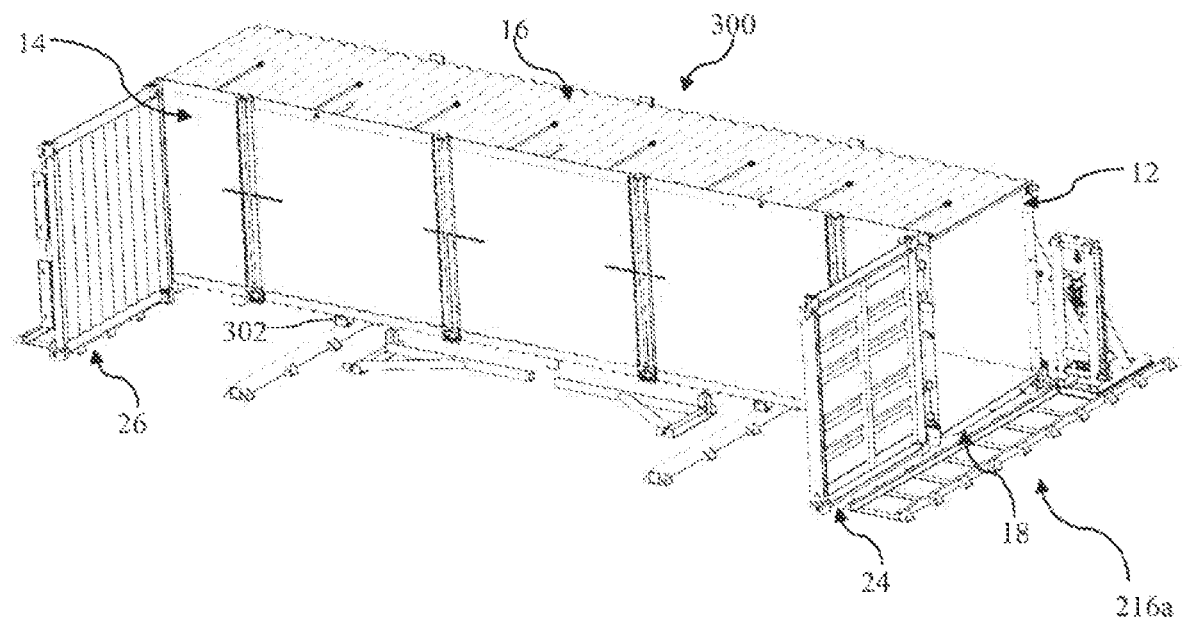
FIG. 38 is a perspective view of the collapsible intermodal container stacker of FIG. 36 interacting with the collapsible intermodal container in a second collapsing step.

In a second collapsing step, as best seen in FIG. 38, the door assemblies 24, 26 are moved to an intermediate position between the closed position and the open position. In the intermediate position, the door assemblies 24, 26 extend leftward of and perpendicular to the left side wall 14 such that the door assemblies 24, 26 are substantially parallel to the tracks 218.

Figure 39:
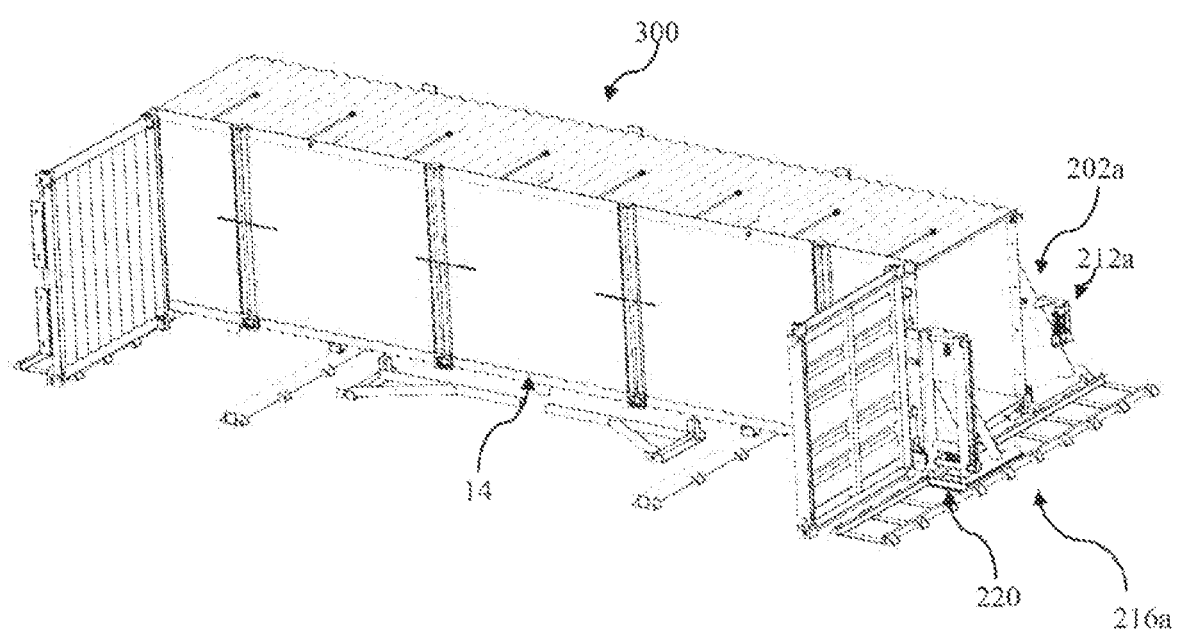
FIG. 39 is a perspective view of the collapsible intermodal container stacker of FIG. 38 interacting with the collapsible intermodal container in a third collapsing step.
Figure 40:
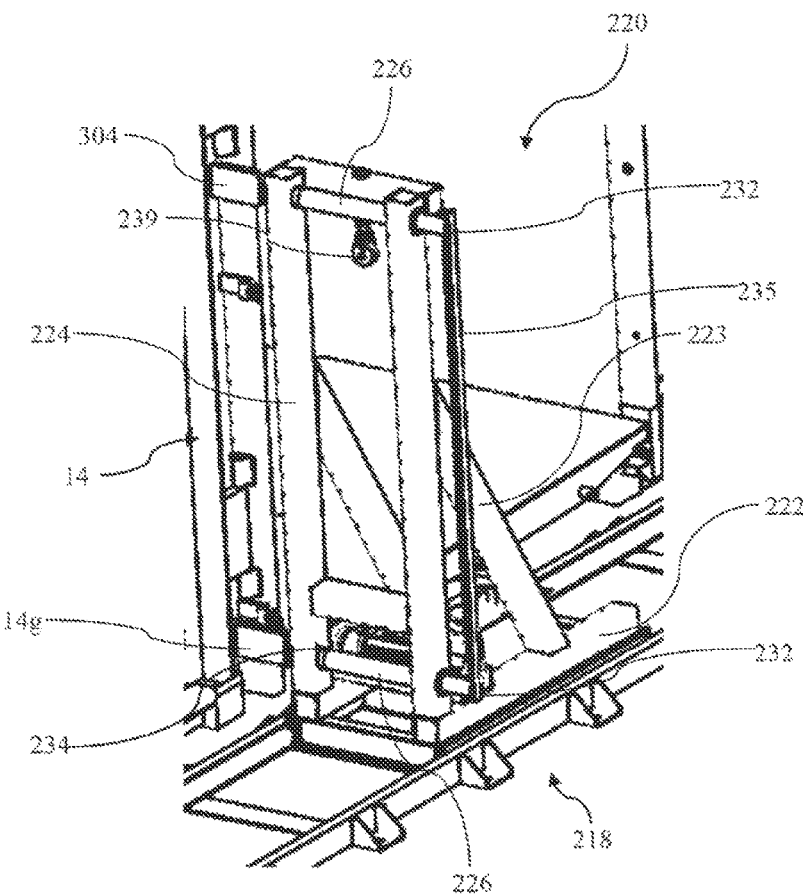
FIG. 40 is an enlarged perspective view of one of the carriages of the collapsible intermodal container stacker of FIG. 39.
Figure 40A:
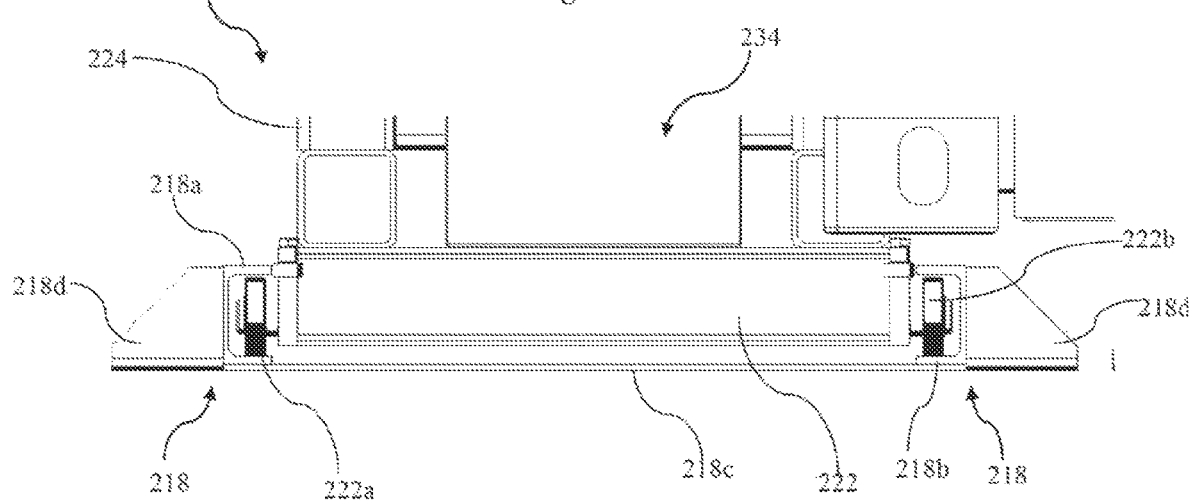
FIG. 40a is an enlarged partial side view of the carriage of FIG. 40.
Figure 41:
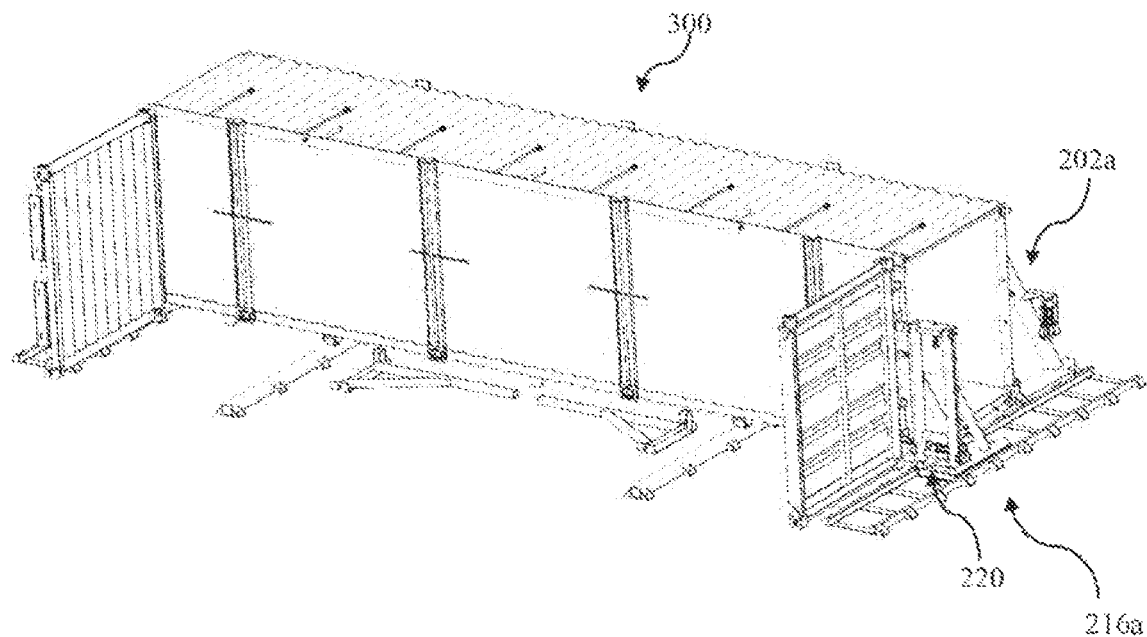
FIG. 41 is a perspective view of the collapsible intermodal container stacker of FIG. 39 interacting with the collapsible intermodal container in a fourth collapsing step.

In a third collapsing step, as best seen in FIGS. 39 and 40, the carriages 220 of the movable sections 216*a*, 216*b* are moved along respective tracks 218 to be adjacent to the left side wall 14 of the container 300.

In a fourth collapsing step, as best seen in FIGS. 41 to 44, the locking members 226 of the movable section 216a are slidably moved in relation to the upright frame 224 such that the engaging ends 228 are moved towards the left side wall 14 of the container 300. Due to such movement, the recess 230 of the engaging end 228 of the lower locking member 226 of the movable section 216a receives the lower corner plate 14g disposed at the front end 14c of the left side wall 14. Also, the recess 230 of the engaging end 228 of the upper locking member 226 of the movable section 216a receives the central plate 304 disposed at the front end 14c of the left side wall 14. Similarly, the locking members 226 of the movable section 216b are slidably moved in relation to the upright frame 224 such that the engaging ends 228 are moved towards the left side wall 14 of the container 300. Due to such movement, the recess 230 of the engaging end 228 of the lower locking member 226 of the movable section 216b receives the lower corner plate 14g disposed at the rear end 14d of the left side wall 14. Also, the recess 230 of the engaging end 228 of the upper locking member 226 of the movable section 216b receives the central plate 304 disposed at the rear end 14d of the left side wall 14. Accordingly, the locking members 226 of the movable sections 216a, 216b cause the carriages 220 of the movable sections 216a, 216b to be fixed relative to the left side wall 14 of the container 300 such that sideward movement of the left side wall 14 causes movement of the carriages 220 along respective tracks 218. Additionally, the engagement between the carriages 220 of the movable sections 216a, 216b and the left side wall 14 causes the left side wall 14 to be maintained upright (i.e., substantially vertical) during any sideward movement.

Figure 42:
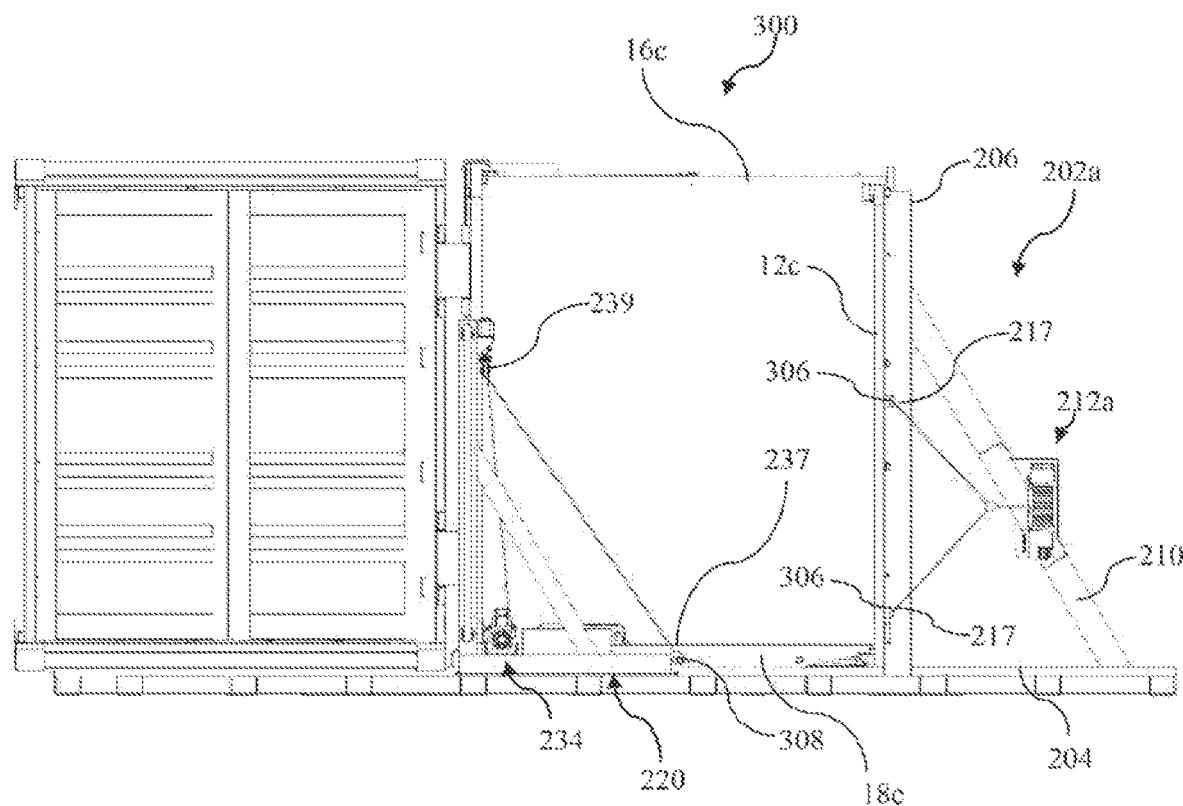
FIG. 42 is an enlarged front view of the collapsible intermodal container stacker of FIG. 41 interacting with the collapsible intermodal container.
Figure 43:
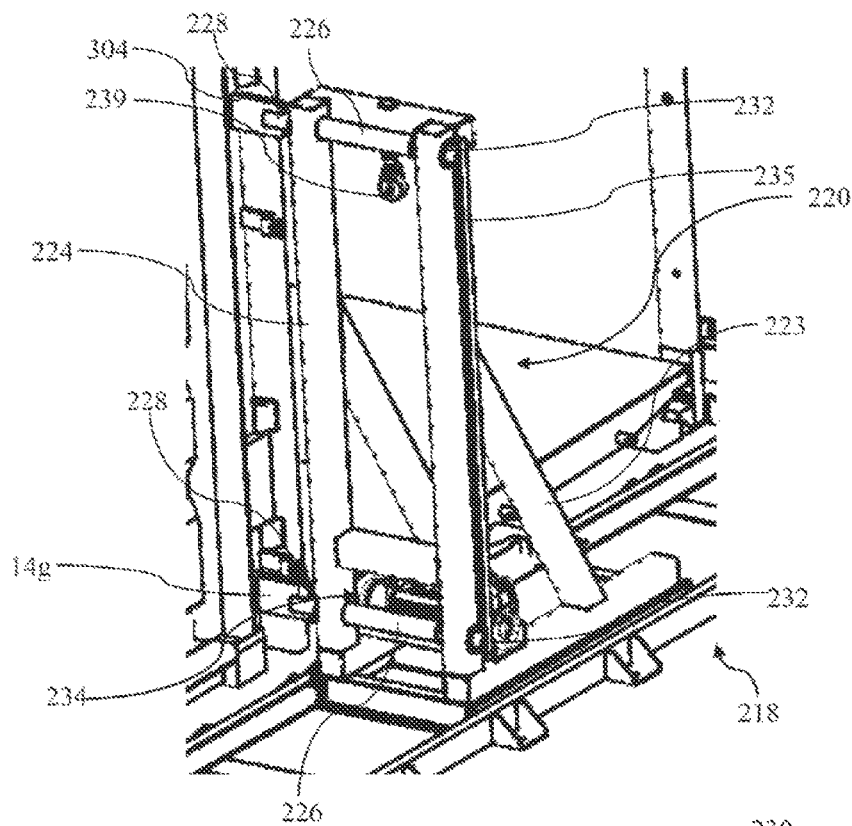
FIG. 43 is an enlarged perspective view of one of the carriages of the collapsible intermodal container stacker of FIG. 41.
Figure 44:
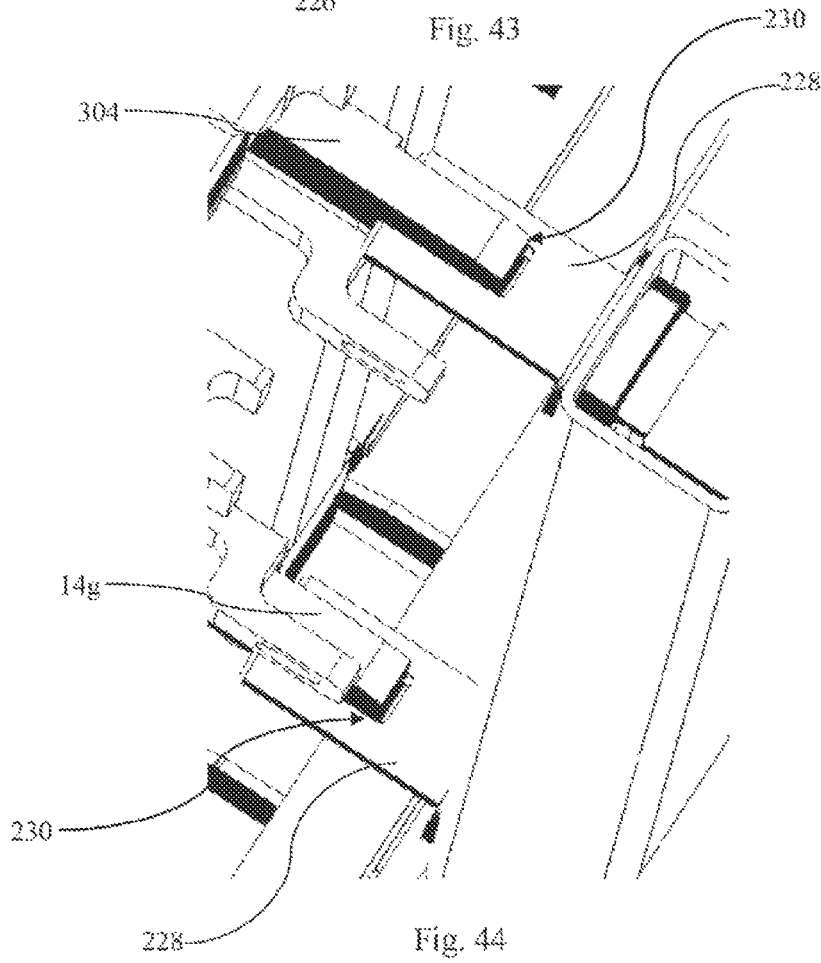
FIG. 44 is an enlarged partial view of locking members of the carriage of FIG. 43.

As best seen in FIG. 42, the free ends 217 of the cable of the side wall pulling device 212a are respectively attached to the lugs 306 disposed on the front end 12c of the right side wall 12. Similarly, the free ends 217 of the cable of the side wall pulling device 212b are respectively attached to the lugs 306 disposed on the rear end 12d of the right side wall 12. The free end 237 of the lower wall pulling device 234 of the movable section 216a is attached to the lug 308 disposed on the front end 18c of the lower wall 18. Similarly, the free end 237 of the lower wall pulling device 234 of the movable section 216b is attached to the lug 308 disposed on the rear end 18d of the lower wall 18. It will be appreciated that each of the free ends 217, 237 may comprise a clip, such as a karabiner, to easily attach to and detach from the respective lugs 306, 308.

After the free ends 217 of the cables of the side wall pulling devices 212a, 212b are attached to the lugs 306, the electric motors 216 of the side wall pulling devices 212a, 212b are activated such that the winch drums 214 are rotated. This causes the cables of the side wall pulling devices 212a, 212b to apply a sideward pulling force to the right side wall 12 of the container 300 such that the right side wall 12 remains fixed and abutted to the planar surfaces 208 of the structures 202a, 202b.

Figure 45:
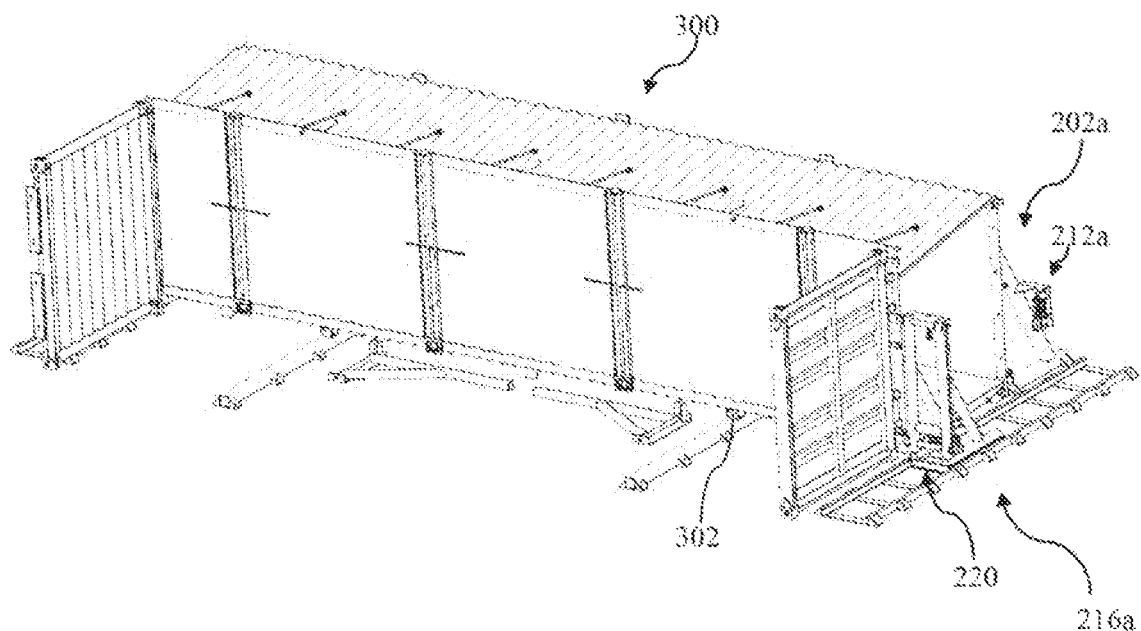
FIG. 45 is a perspective view of the collapsible intermodal container stacker of FIG. 41 interacting with the collapsible intermodal container in a fifth collapsing step.
Figure 46:
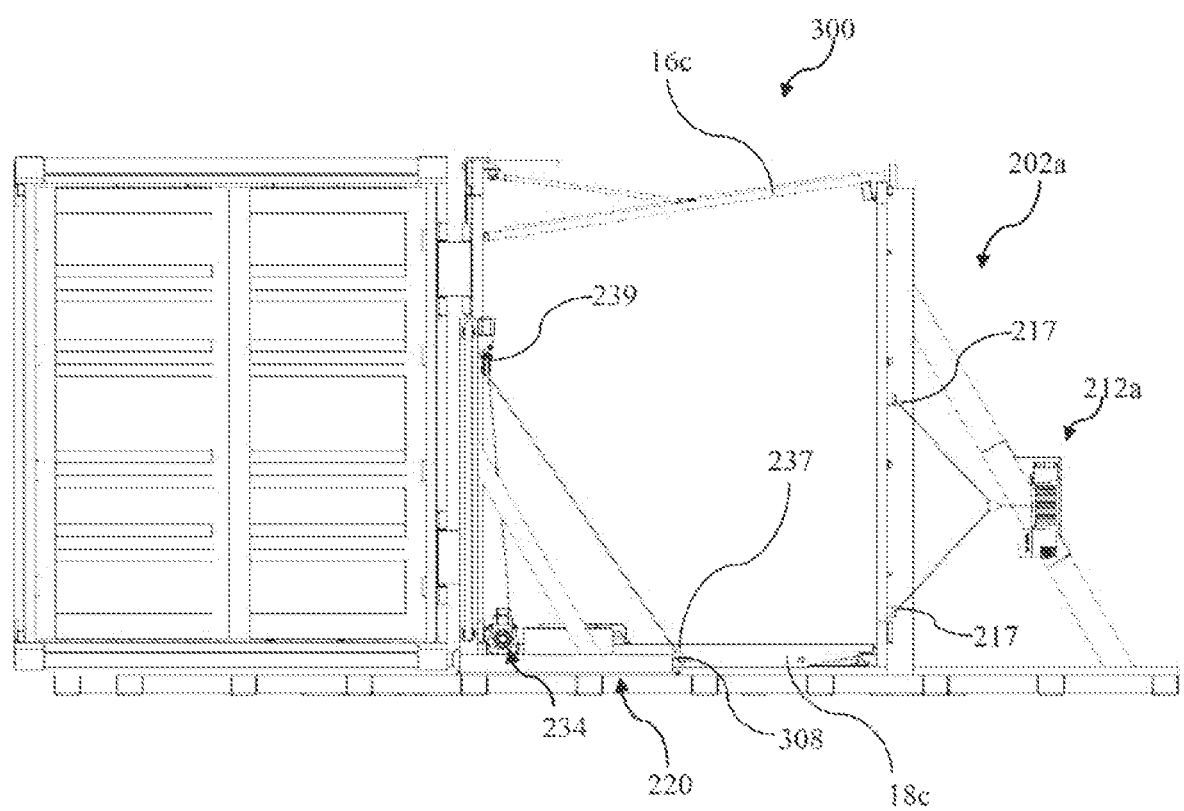
FIG. 46 is an enlarged front view of the collapsible intermodal container stacker of FIG. 45 interacting with the collapsible intermodal container.

In a fifth collapsing step, as best seen in FIGS. 45 and 46, the container 300 is unlocked by releasing the strap systems 30a, 30b, 30c, 30d in a similar manner as described above in relation to the container 10'. This allows the container 300 to be configurable to the collapsed configuration. After releasing the strap systems 30a, 30b, 30c, 30d, the weight of the upper wall 16 of the container 300 will cause it to slightly pivot towards the right side wall 12. It will be appreciated that the door assemblies 24, 26 are purposely in the intermediate positions to allow easy access to the strap systems 30a, 30b, 30c, 30d in this step.

Figure 47:
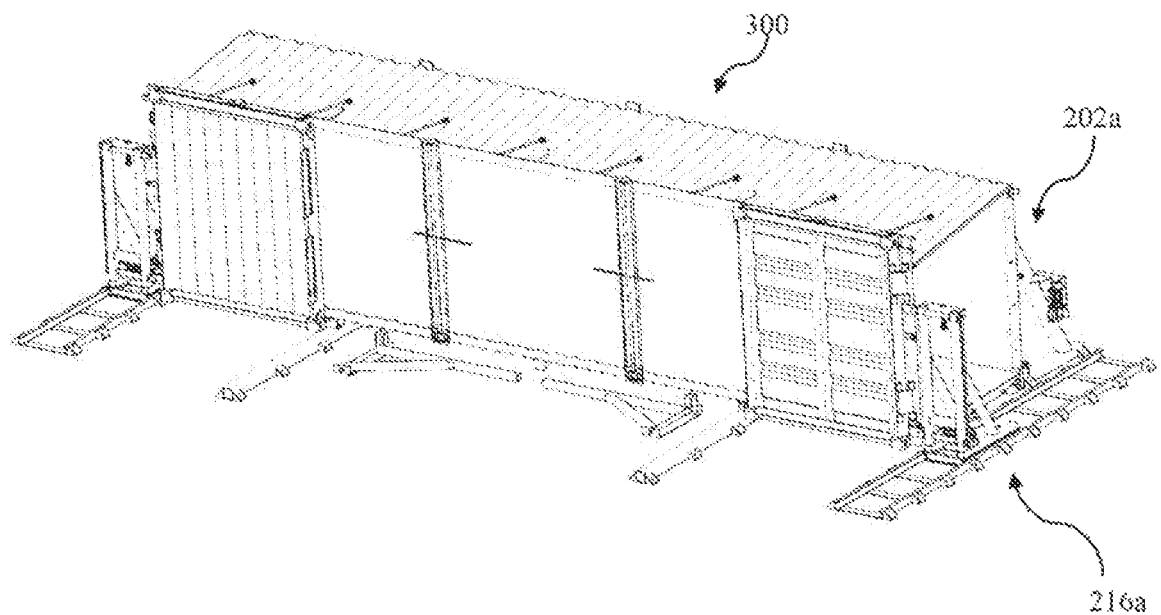
FIG. 47 is a perspective view of the collapsible intermodal container stacker of FIG. 45 interacting with the collapsible intermodal container in a sixth collapsing step.
Figure 48:
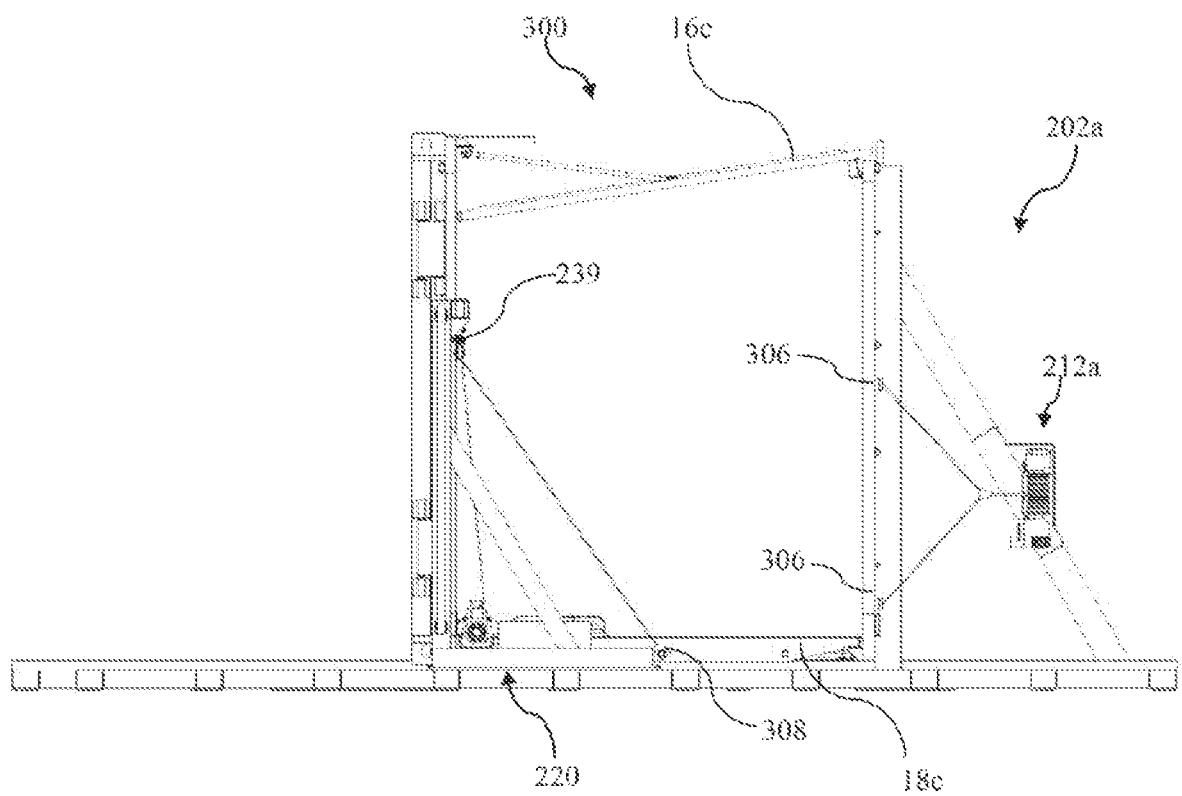
FIG. 48 is an enlarged front view of the collapsible intermodal container stacker of FIG. 47 interacting with the collapsible intermodal container.

In a sixth collapsing steep, as best seen in FIGS. 47 and 48, the door assemblies 24, 26 of the container 300 are moved to the open positions.

Figure 49:
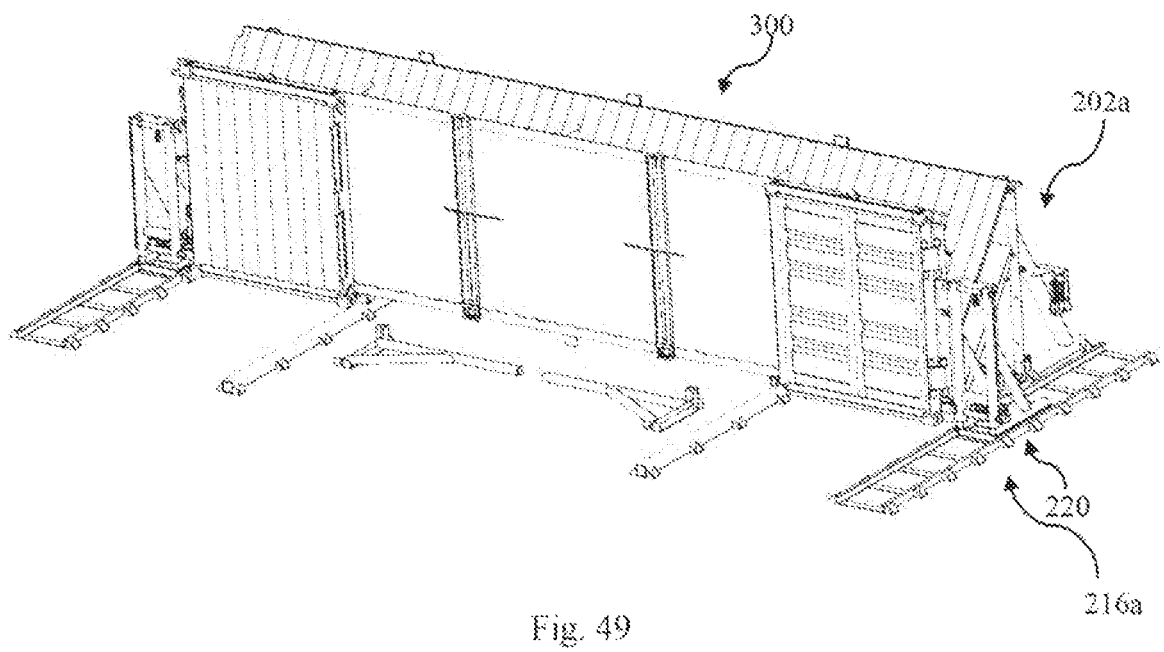
FIG. 49 is a perspective view of the collapsible intermodal container stacker of FIG. 47 interacting with the collapsible intermodal container in a seventh collapsing step.
Figure 50:
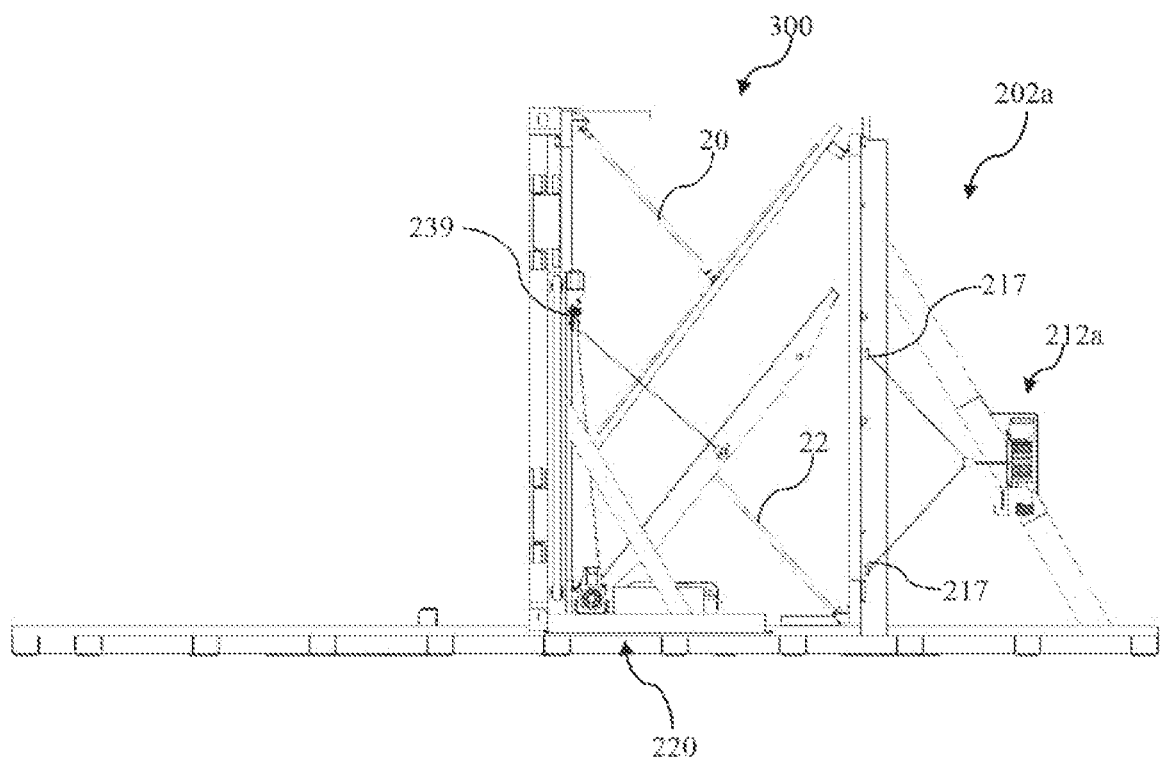
FIG. 50 is an enlarged front view of the collapsible intermodal container stacker of FIG. 49 interacting with the collapsible intermodal container.

In a seventh collapsing step, as best seen in FIGS. 49 and 50, the electric motors 238 of the lower wall pulling devices 234 of the movable sections 216a, 216b are activated such that the winch drums 236 are rotated. Given that the pulley systems 239 are located above the lugs 308 of the lower wall 18, the cables of the lower wall pulling devices 234 of the movable sections 216a, 216b apply an upward pulling force to the lower wall 18 of the container 300 such that the lower wall 18 pivots towards the left side wall 14. Due to the link members 20, 22, as described above, the left side wall 14 will move towards the right side wall 12 which is fixed to the structures 202a, 202b. Consequently, the carriages 220 of the movable sections 216a, 216b will move with the left side wall 14 along the respective tracks 218. Accordingly, the container 300 will start to configure from the erected configuration to the collapsed configuration.

Figure 51:
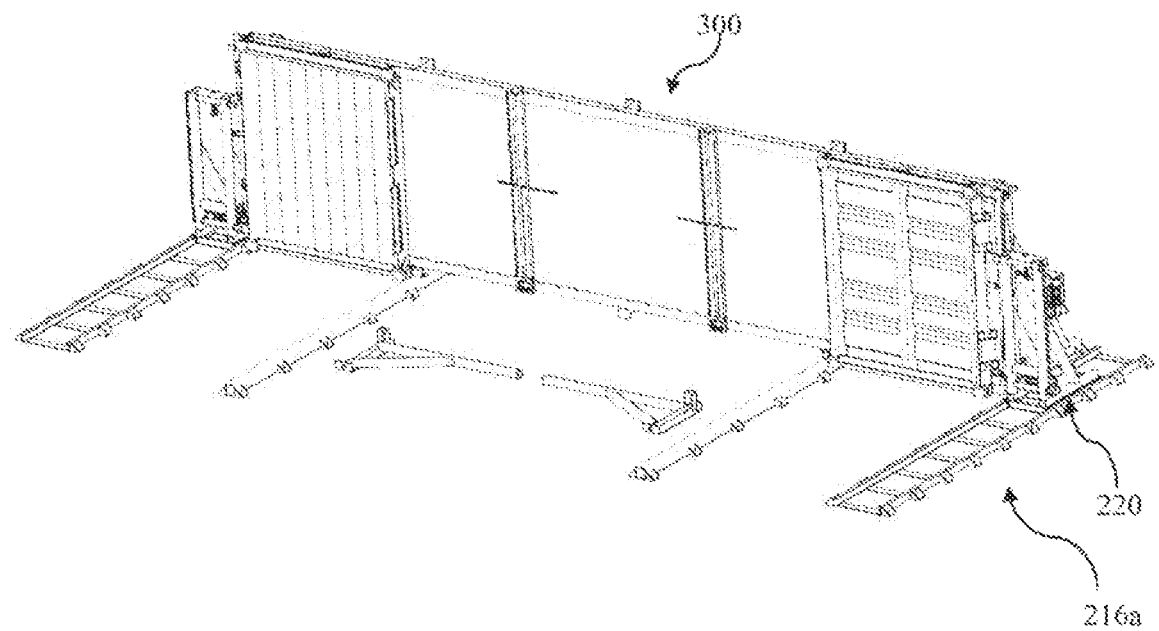
FIG. 51 is a perspective view of the collapsible intermodal container stacker of FIG. 49 interacting with the collapsible intermodal container in an eighth collapsing step.
Figure 52:
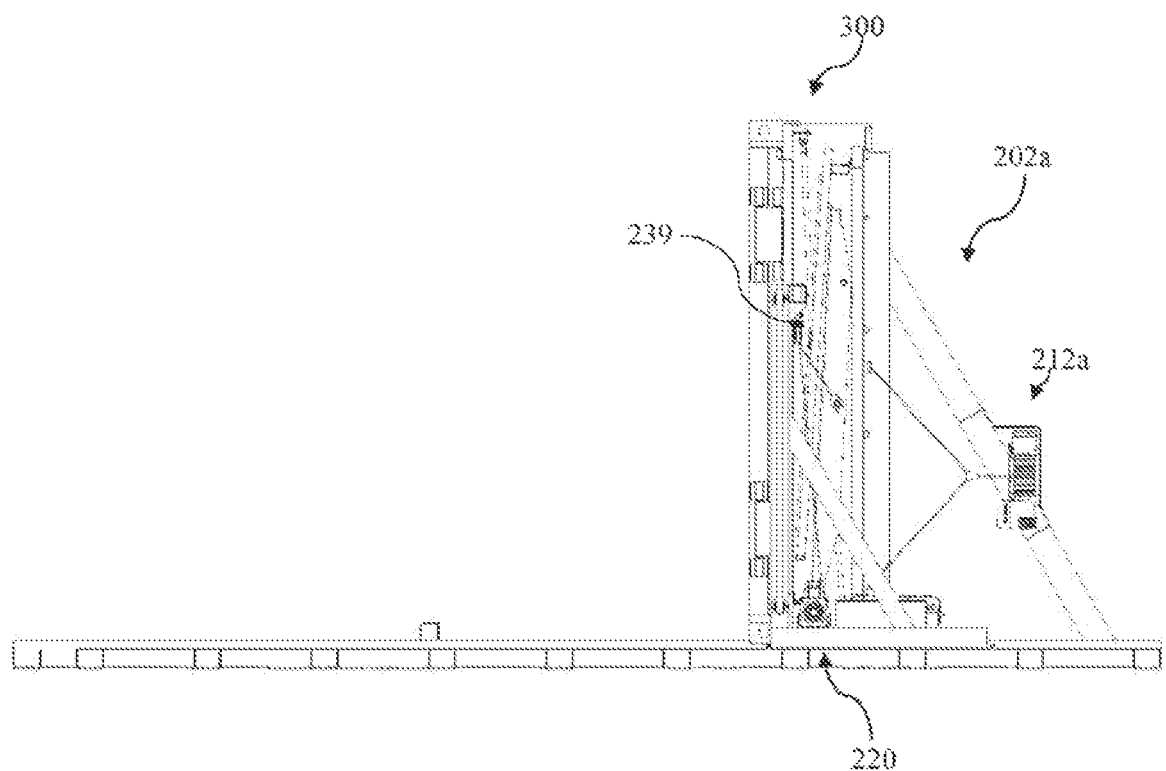
FIG. 52 is an enlarged perspective view of the collapsible intermodal container stacker of FIG. 51 interacting with the collapsible intermodal container.

In an eighth collapsing step, as best seen in FIGS. 51 and 52, the steel rods 14h will abut with the stop members 12f of the right side wall 12 and the steel rods 12h will abut with the stop members 14f of the left side wall 14. Accordingly, the container 300 will be in the collapsed configuration.

Referring to FIGS. 53 to 65, an exemplary use of the stacker 200 to configure and assemble four collapsible intermodal containers 300a, 300b, 300c, 300d to form a collapsible intermodal container assembly 400 will now be described. In the depicted embodiment, each of the four collapsible intermodal containers 300a, 300b, 300c, 300d is identical to the collapsible intermodal container 300 described above. Accordingly, features of the collapsible intermodal containers 300a, 300b, 300c, 300d that are identical to those of the collapsible intermodal container 300 are provided with the same reference numerals.

Figure 53:
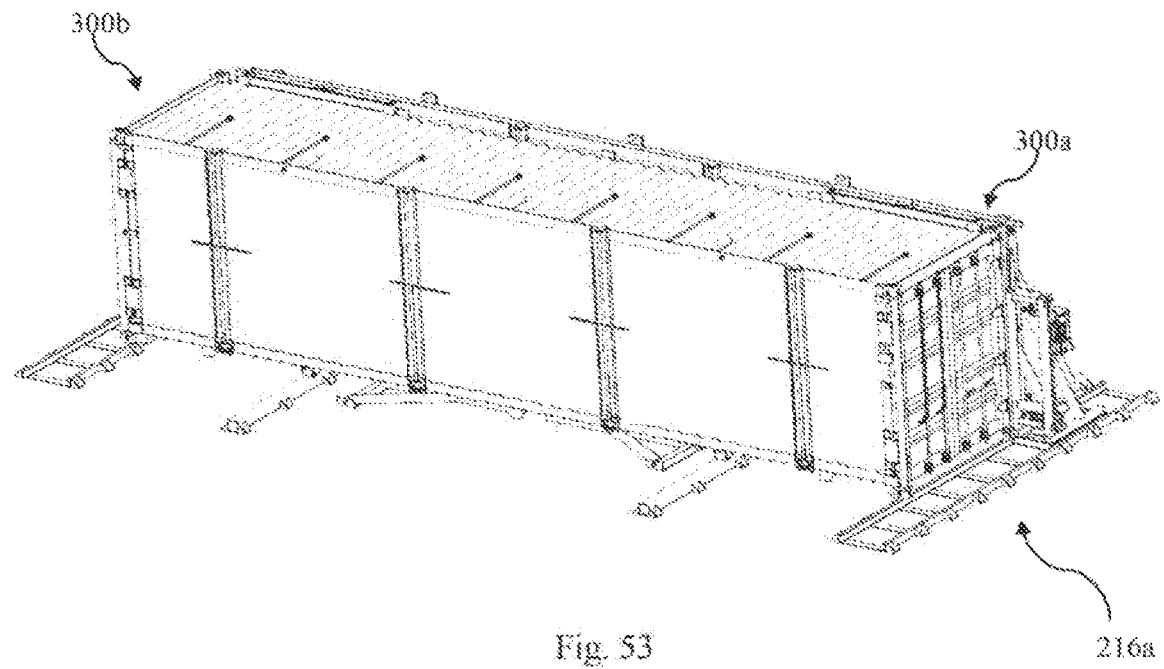
FIG. 53 is a perspective view of the collapsible intermodal container stacker of FIG. 51 interacting with two collapsible intermodal containers, one collapsible intermodal container in the collapsed configuration and the other collapsible intermodal container in the erected configuration.
Figure 54:
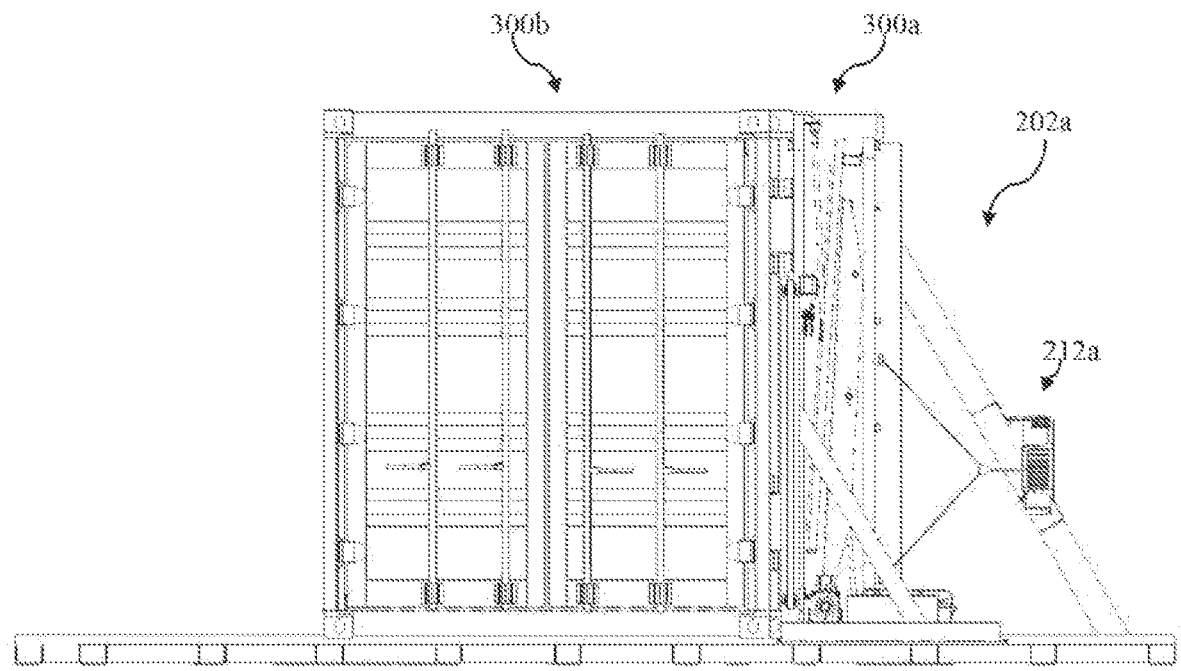
FIG. 54 is an enlarged front view of the collapsible intermodal container stacker of FIG. 53 interacting with the two collapsible intermodal containers.

Initially, as best seen in FIGS. 53 and 54, the stacker 200 is used to configure the container 300a to the collapsed configuration in a similar manner as described above in relation to the container 300. Then, the container 300b is placed on the beams 240 such that the container 300b is elevated from the floor and adjacent the container 300a. The right side wall 12 of the container 300b is abutted with the left side wall 14 of the container 300a.

Figure 55:
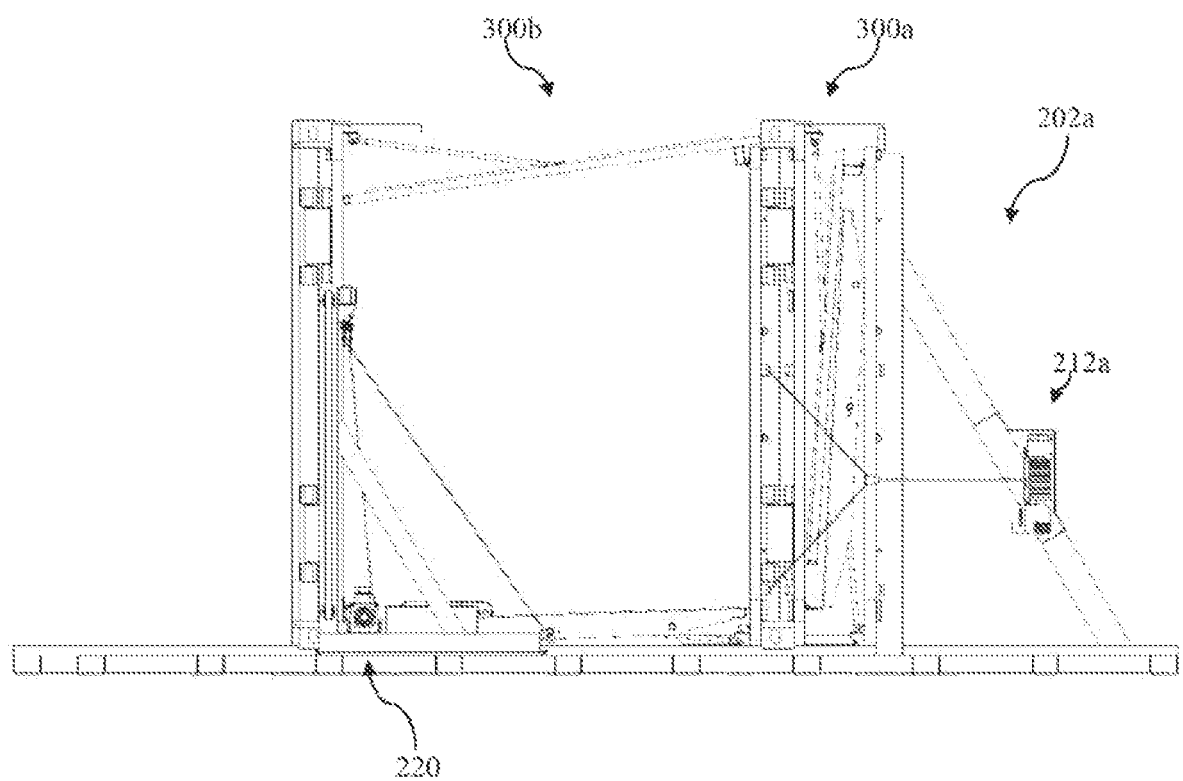
FIG. 55 is an enlarged front view of the collapsible intermodal container stacker of FIG. 53 interacting with the two collapsible intermodal containers, one collapsible intermodal container in the collapsed configuration and the other collapsible intermodal container configuring from the erected configuration to the collapsed configuration.
Figure 56:
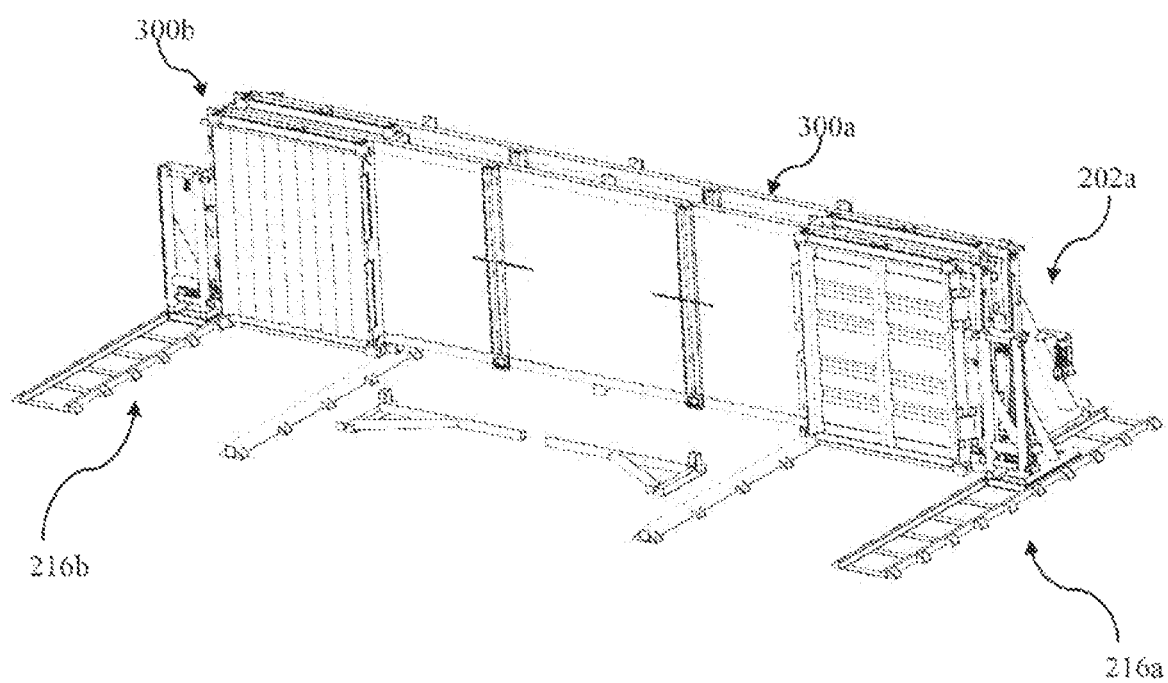
FIG. 56 is a perspective view of the collapsible intermodal container stacker of FIG. 53 interacting with two collapsible intermodal containers in the collapsed configurations.

As best seen in FIGS. 55 and 56, similar to the collapsing steps described above in relation to container 300, the stacker 200 is used to configure the container 300b to the collapsed configuration. However, the carriages 220 of the movable sections 216a, 216b are fixed to the left side wall 14 of the container 300b. Further, the free ends 217 of the cables of the side wall pulling devices 212a, 212b are respectively attached to the lugs 306 of the container 300b such that a sideward pulling force is applied to the right side wall 12 of the container 300b. It will be appreciated that this force will cause the right side wall 12 to be fixed in relation to the structures 202a, 202b and maintain the container 300a, which is jammed between the right side wall 12 of the container 300b and the structures 202a, 202b, in the collapsed configuration. Further, the free end 237 of the lower wall pulling devices 234 of the movable sections 216a, 216b are respectively attached to the lugs 308 of the container 300b such that an upward pulling force is applied to the lower wall 18 of the container 300b.

Figure 57:
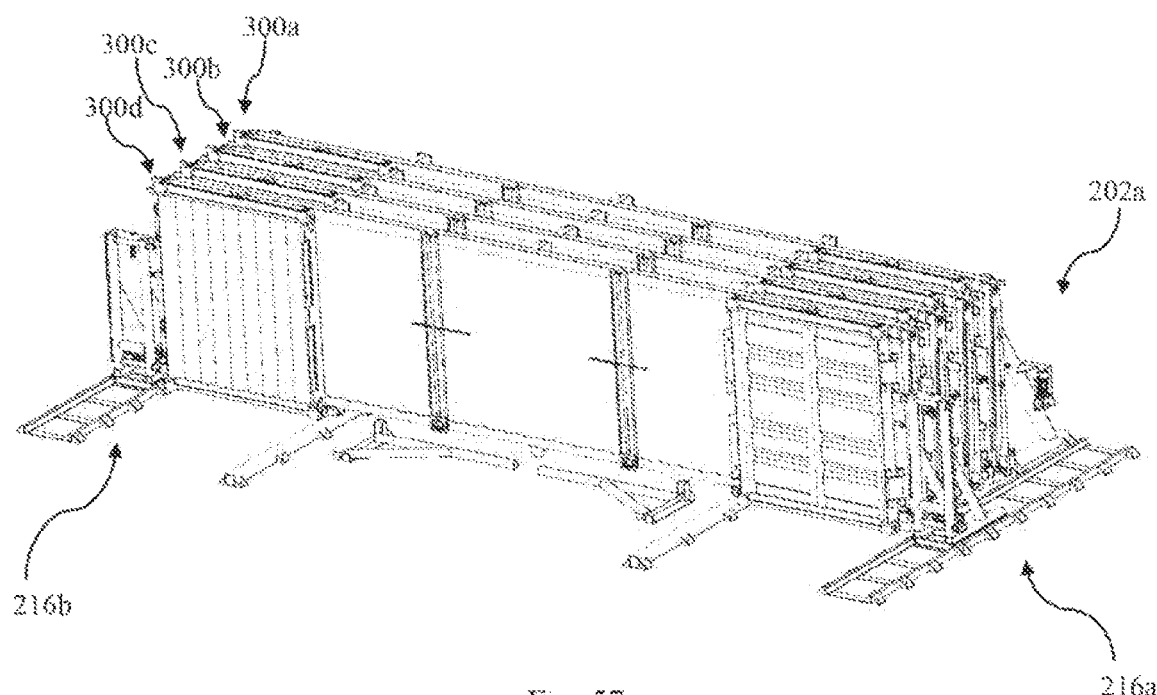
FIG. 57 is a perspective view of the collapsible intermodal container stacker of FIG. 56 interacting with four collapsible intermodal containers in the collapsed configurations.
Figure 58:
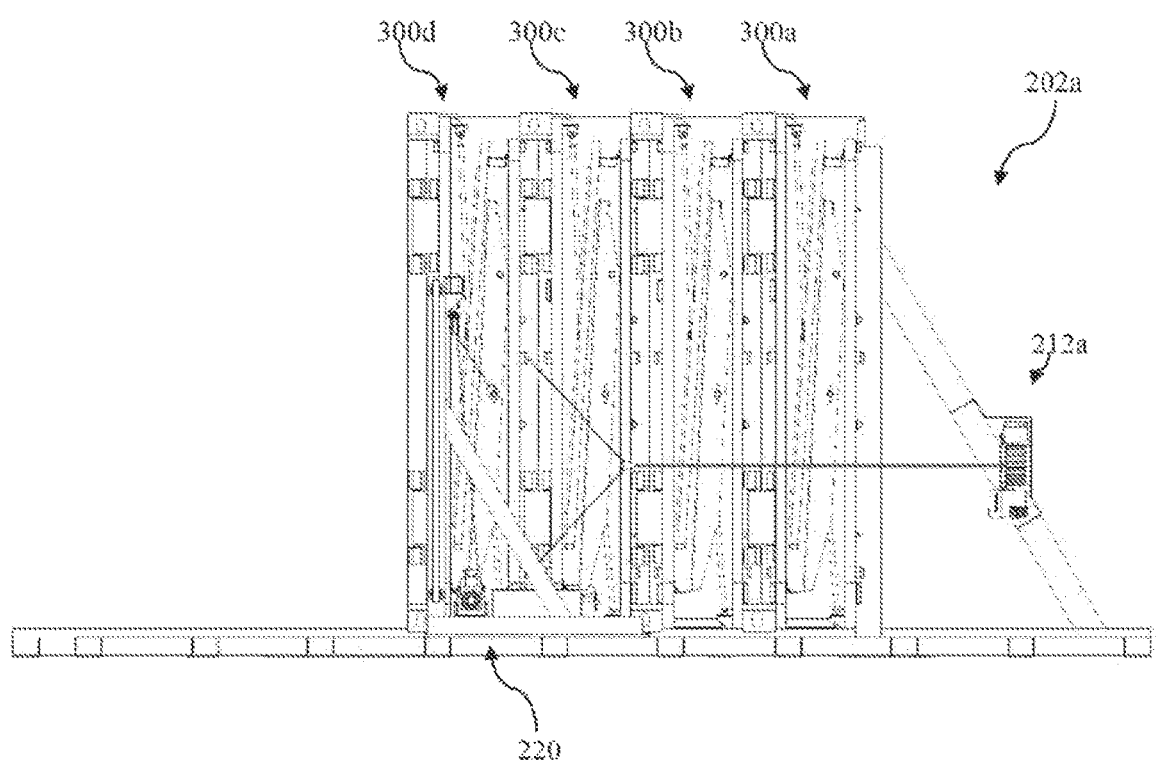
FIG. 58 is an enlarged front view of the collapsible intermodal container stacker of FIG. 57 interacting with four collapsible intermodal containers.
Figure 59:
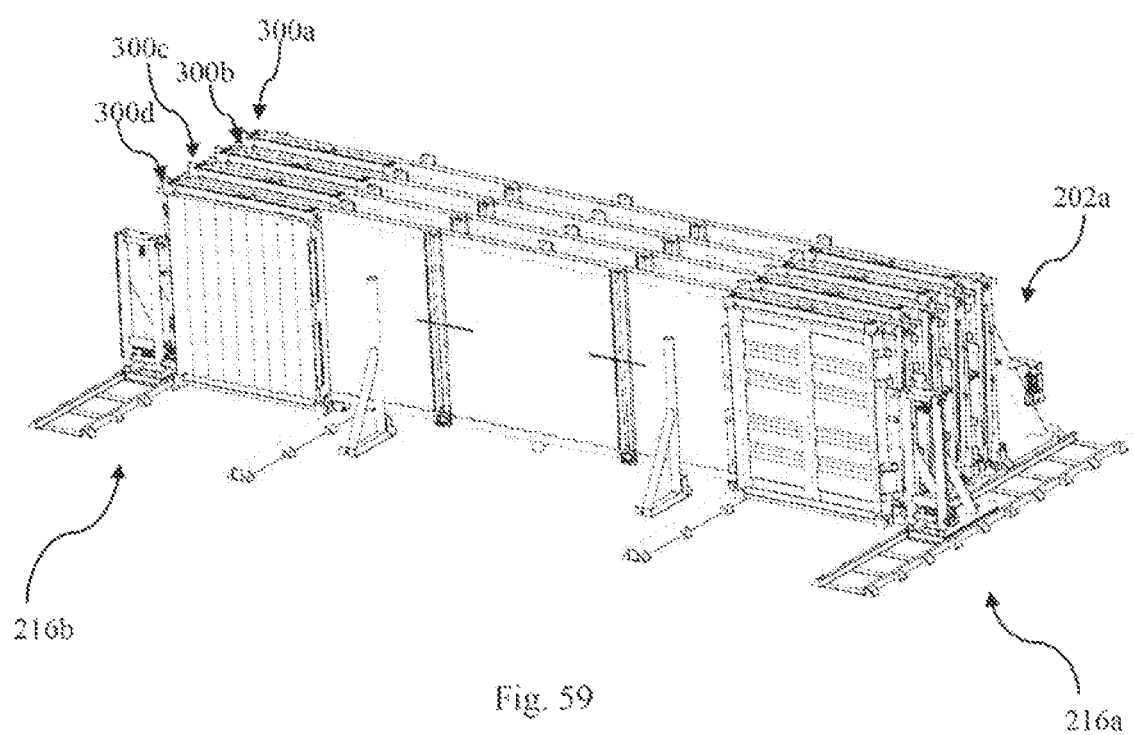
FIG. 59 is a perspective view of the collapsible intermodal container stacker of FIG. 57 interacting with four collapsible intermodal containers in the collapsed configurations and stoppers raised.
Figure 60:
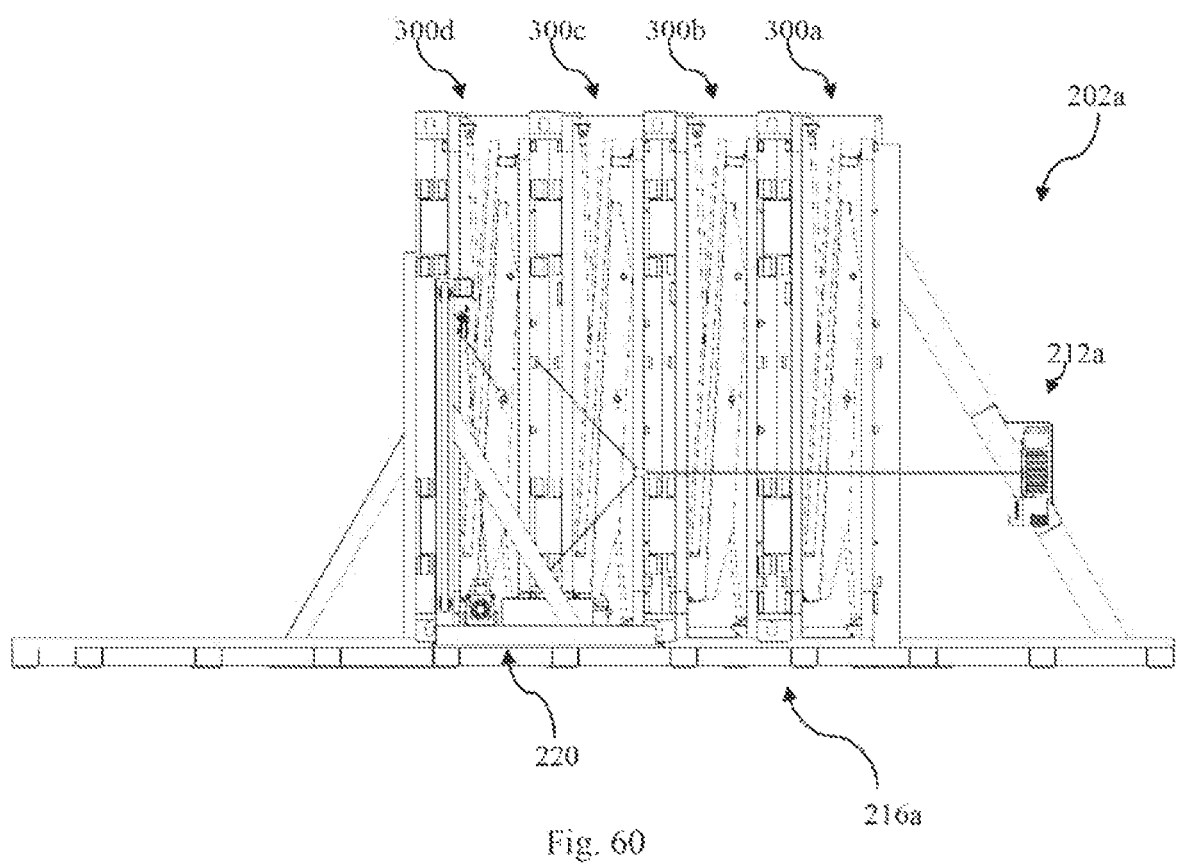
FIG. 60 is an enlarged front view of the collapsible intermodal container stacker of FIG. 59 interacting with four collapsible intermodal containers.

As best seen in FIGS. 57 and 58, similar steps as described above in relation to the container 300b are carried out on the container 300c and then the container 300d such that the containers 300a, 300b, 300c, 300d are assembled in a sidewardly stacked formation. Then, as best seen in FIGS.

59 and 60, the members 246 of the stoppers 242 are pivoted such that the members 246 are substantially vertical. Accordingly, the rightward facing planar surfaces of the members 246 of the stoppers 242 abut the left side wall 14 of the container 300d such that the containers 300a, 300b, 300c, 300d are maintained in the sidewardly stacked formation.

Figure 61:
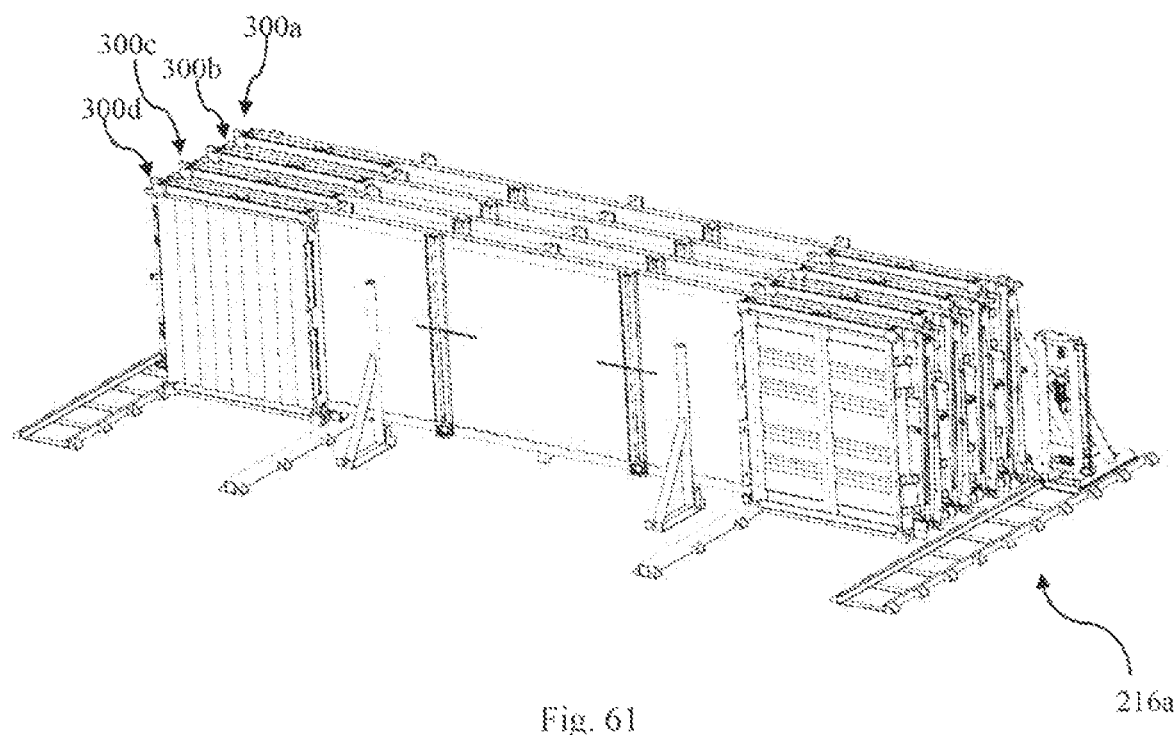
FIG. 61 is a perspective view of the collapsible intermodal container stacker of FIG. 59 interacting with four collapsible intermodal containers in the collapsed configurations and carriages moved adjacent the stationary structure.
Figure 62:
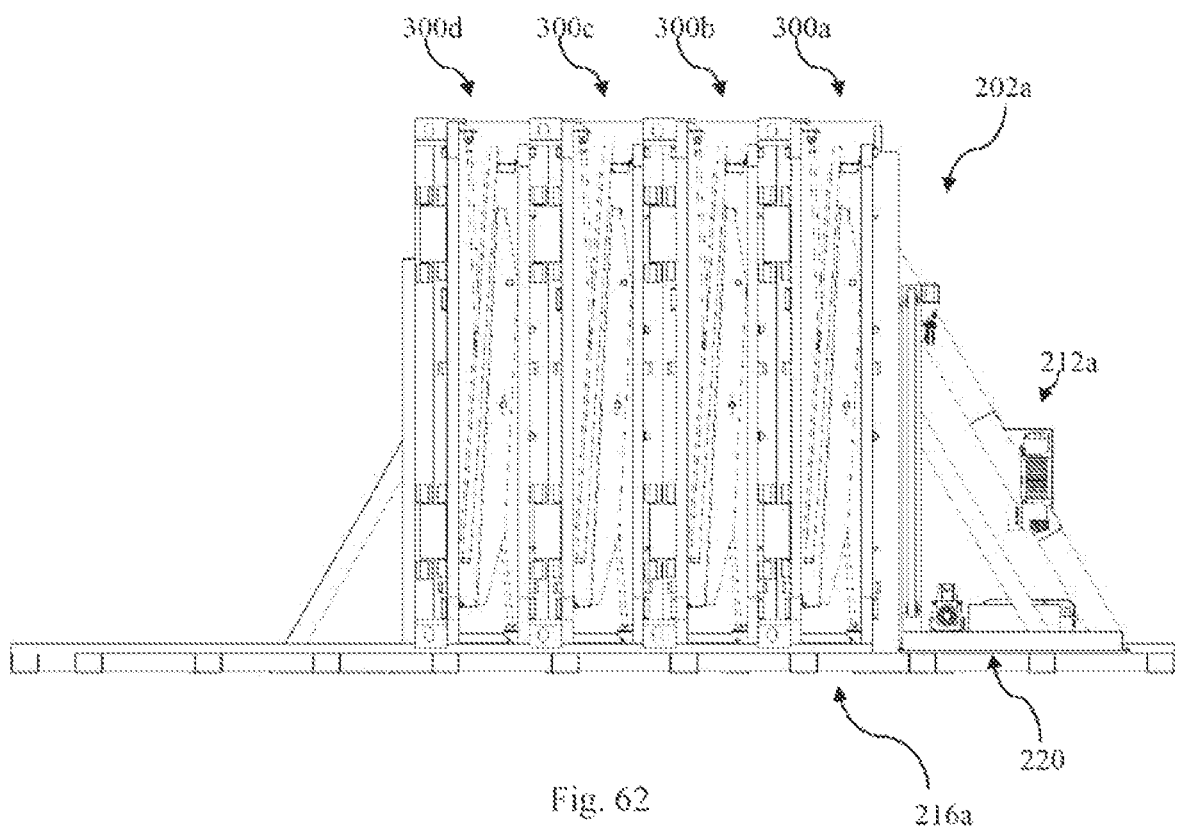
FIG. 62 is an enlarged front view of the collapsible intermodal container stacker of FIG. 61 interacting with four collapsible intermodal containers.

As best seen in FIGS. 61 and 62, the carriages 220 of the movable sections 216a, 216b are moved along the respective tracks 218 such that the carriages 220 are rightward of the planar surfaces 208 of the structures 202a, 202b.

Figure 63:
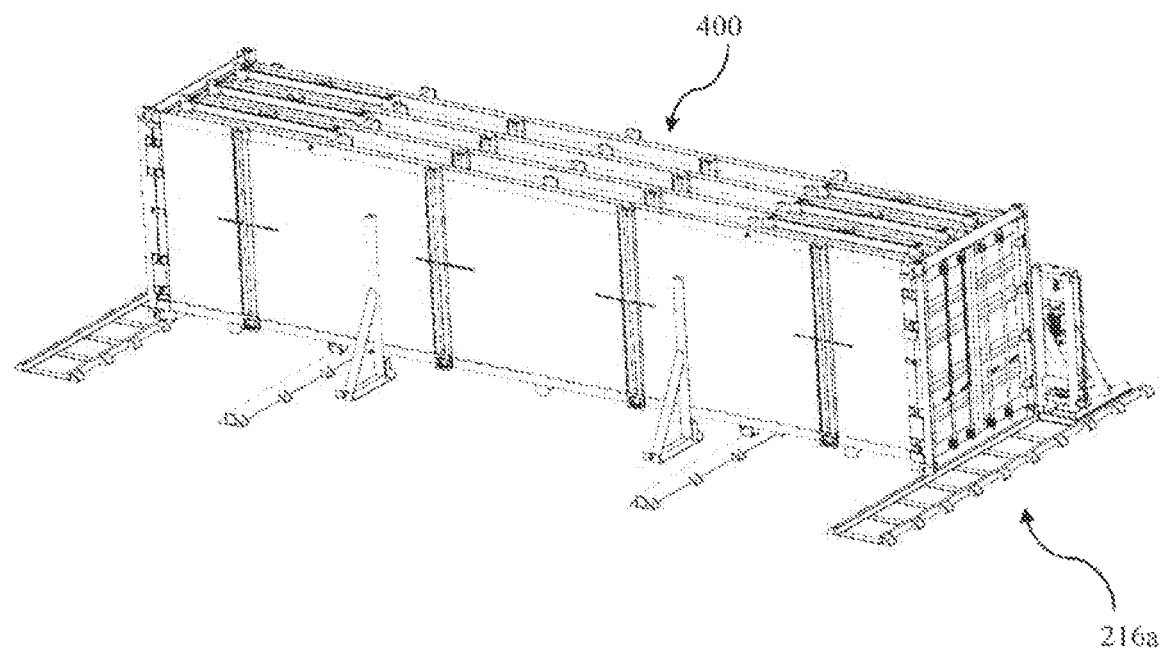
FIG. 63 is a perspective view of the collapsible intermodal container stacker of FIG. 61 interacting with four collapsible intermodal containers in the collapsed configurations and door assemblies of one of the collapsible intermodal containers in the closed configurations to form a collapsible intermodal container assembly.
Figure 64:
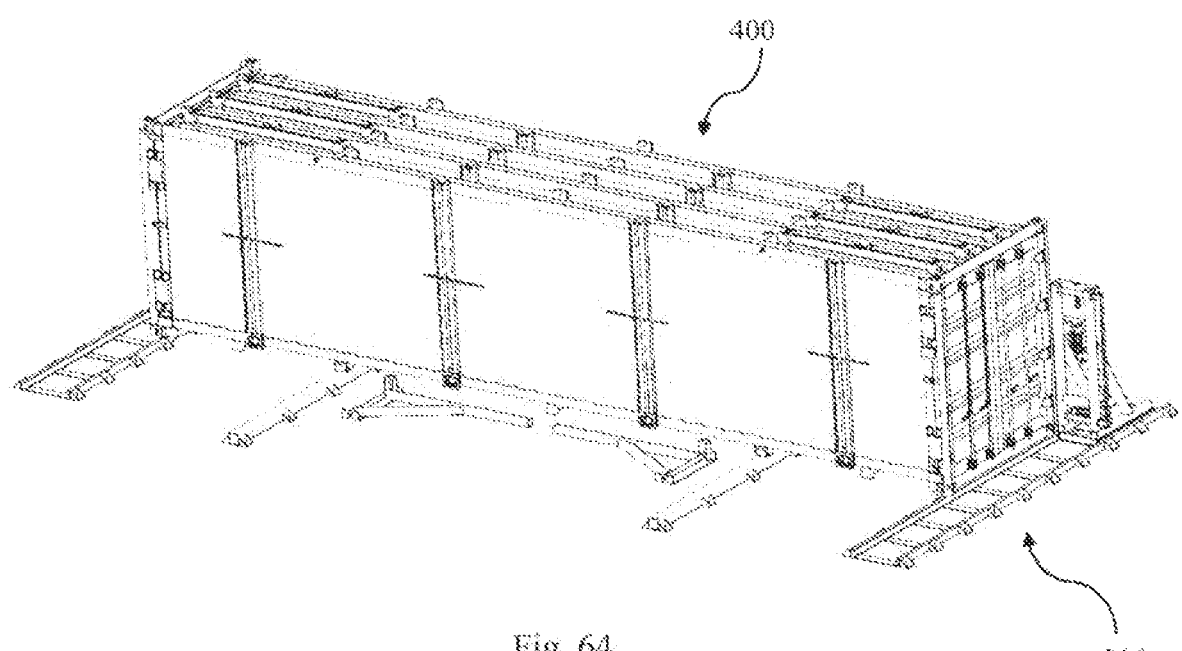
FIG. 64 is a perspective view of the collapsible intermodal container stacker of FIG. 63 interacting with four collapsible intermodal containers and stoppers lowered.
Figure 65:
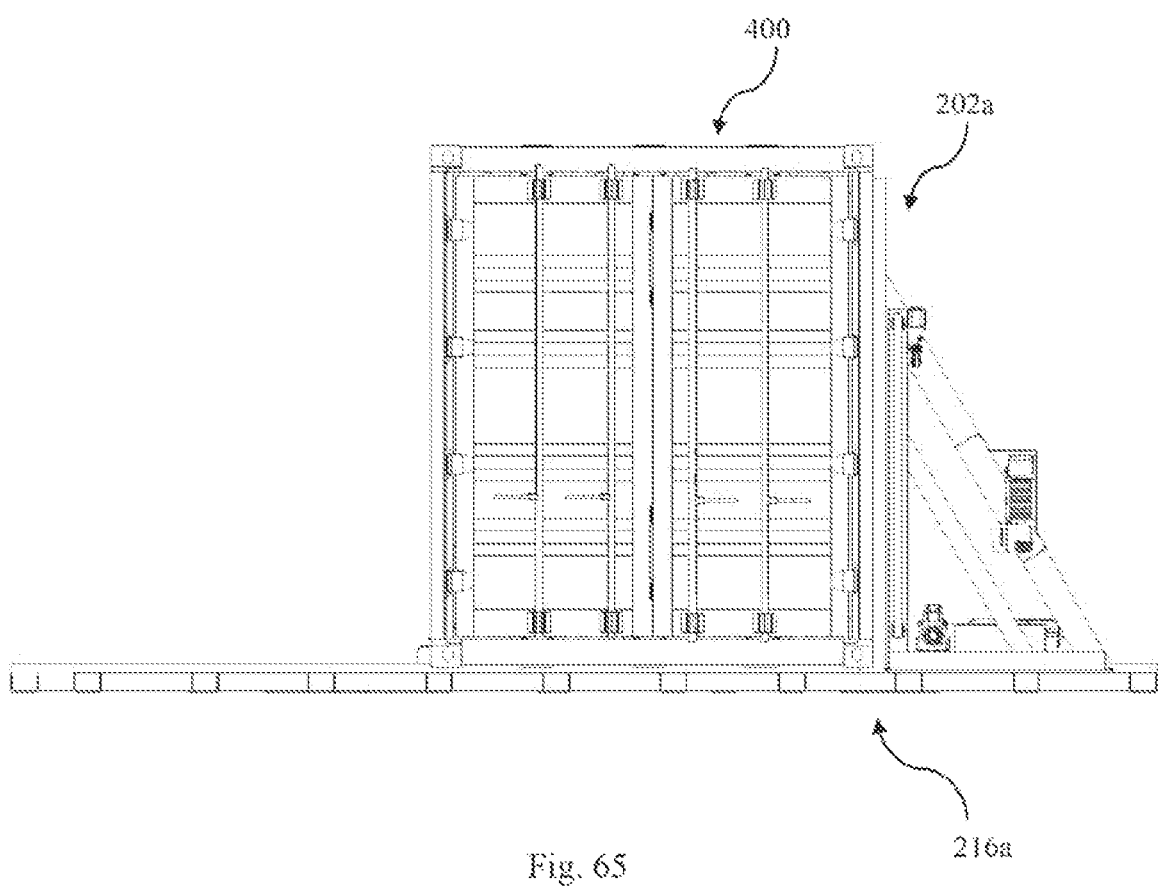
FIG. 65 is an enlarged front view of the collapsible intermodal container stacker of FIG. 64 interacting with four collapsible intermodal containers.

As best seen in FIG. 63, the door assemblies 24, 26 of the container 300d are moved to the closed positions to form the collapsible intermodal container assembly 400 in a similar manner as described above in relation to the assembly 100. As best seen in FIGS. 64 and 65, the members 246 of the stoppers 242 are pivoted such that the members 246 are substantially horizontal to allow the assembly 400 to be moved from the stacker 200.

According to the depicted embodiment, the stacker 200 allows for a collapsible intermodal container to be configured to the collapsed configuration, or the formation of a collapsible intermodal container assembly, in an easy and efficient manner.

Although the invention has been described with reference to preferred embodiments, it will be appreciated by a person skilled in the art that the invention may be embodied in many other forms and that a variety of alternative and/or equivalent implementations exist. It should be appreciated that the exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that any process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects. In addition, it will be noted that terms such as "upper", "lower", "upwards", "horizontal", and "horizontally" as used herein are to be understood with respect to the normal or in-use orientation of the invention and are to be interpreted in that context.

The invention claimed is:

1. A method for forming a collapsible intermodal container assembly from a plurality of intermodal containers, each container having:

a right side wall and a left side wall, the side walls opposing each other and substantially parallel to each other;
an upper wall located between the right side wall and the left side wall;
a lower wall located between the right side wall and the left side wall; and
a front end assembly and a rear end assembly that close front and rear ends of the container when the container is in an erected configuration;
the method comprising the steps of:
(a) moving the front and rear end assemblies of a first container to an open position adjacent the left side wall of the first container and fixing the right side wall of the first container relative to a stationary structure;
(b) moving the left side wall of the first container towards the right side wall until the first container is in a collapsed configuration;
(c) moving a second container such that the right side wall of the second container abuts the front and rear end assemblies of the first container;
(d) repeating steps (a) and (b) in respect of the second container;
(e) moving a third container such that the right side wall of the third container abuts the front and rear end assemblies of the second container;
(f) repeating steps (a) and (b) in respect of the third container;
(g) moving a fourth container such that the right side wall of the fourth container abuts the front and rear end assemblies of the third container;
(h) repeating steps (a) and (b) in respect of the fourth container; and
(i) moving the front and rear end assemblies of the fourth container to a closed position such that a front end of the first, second, third, and fourth container abuts the front end assembly and a rear end of the first, second, third, and fourth container abuts the rear end assembly.

2. The method of claim 1, wherein, in the erected configuration of each container:
the upper wall extends from an upper longitudinal end of the right side wall to an upper longitudinal end of the left side wall;
the lower wall extends from the lower longitudinal end of the left side wall to the lower longitudinal end of the right side wall; and
the upper wall is spaced apart from the lower wall by a first normal distance and the upper wall extends parallel to the lower wall such that an inner surface of the upper wall is generally parallel to an inner surface of the lower wall.

3. The method of claim 2, wherein the first normal distance is between 201 centimeters to 226 centimeters.

4. The method of claim 1, wherein the front and rear end assemblies comprise a door assembly, the door assembly comprising a flap member having an opening, and the right side wall has a protrusion adapted to be received by a respective opening for removable attachment of the door assembly to the side wall.

5. The method of claim 4, wherein the protrusion is fixable to the flap member by bolting to locate the front and rear door assemblies with respect to the side walls.

6. The method of claim 4, wherein, during step (a), the protrusion is removed from the opening of the flap member by pivoting the flap member away from the right side wall and each side wall has a corner plate that is slidingly removed from an opening defined by a bracket of the respective door assembly, as the door assembly is pivoted to the open position.

7. The method of claim 1, wherein, during step (b) the upper wall pivots towards the right side wall and the lower wall pivots towards the left side wall.

8. The method of claim 1, wherein each container includes a stop member on the right or left side wall and a rod on the opposing side wall, wherein the stop member and the rod are located such that, at the end of the movement of the left side wall toward the right side wall, the rod abuts with the stop member preventing further movement of the left side wall toward the right side wall.

9. The method of claim 1, wherein, in a collapsed configuration of each container:
the upper wall is adjacent to or abutted with the lower wall and extends substantially parallel to the lower wall such that the inner surface of the upper wall is substantially parallel to the inner surface of the lower wall such that the right side wall and the left side wall are spaced apart by a second normal distance.

10. The method of claim 9, wherein the second normal distance is between 23 centimeters and 98 centimeters.

11. The method of claim 1, wherein, during step (b), the left side wall is moved toward the right side wall by a hydraulic actuator.

12. A method for disassembling a collapsible intermodal container assembly into a first, a second, a third, and a fourth intermodal container, each container having:
a right side wall and a left side wall, the side walls opposing each other and substantially parallel to each other;
an upper wall located between the right side wall and the left side wall;
a lower wall located between the right side wall and the left side wall; and
a front end assembly and a rear end assembly that close front and rear ends of the container when the container is in an erected configuration;
the method comprising the steps of:
(a) moving the front and rear end assemblies of the fourth container from a closed position wherein a front end of the first, second, third, and fourth container abuts the front end assembly and a rear end of the first, second, third, and fourth container abuts the rear end assembly, to an open position;
(b) fixing the right side wall of the fourth container relative to a stationary structure and moving the left side wall of the fourth container away from the right side wall until the fourth container is in an erected configuration;
(c) moving the front and rear end assemblies of the fourth container to the closed position between the left side wall and the right side wall to close the front and rear ends of the fourth container such that the fourth container is in the erected configuration;
(d) moving the fourth container away from the collapsible intermodal container assembly;
(e) repeating steps (b) to (d) in respect of the third container;
(f) repeating steps (b) to (d) in respect of the second container; and
(g) repeating steps (b) and (c) in respect of the first container.

* * * * *